United States Patent [19]

Vittorelli

[11] 4,028,681

[45] June 7, 1977

[54] SYSTEM FOR AUTOMATICALLY PROCESSING AND PRINTING THE CONTENTS AND THE FORMAT OF A TEXT

[75] Inventor: Vittore Vittorelli, Ivrea (Turin), Italy

[73] Assignee: Ing. C. Olivetti & C., S.p.A., Ivrea (Turin), Italy

[22] Filed: May 14, 1975

[21] Appl. No.: 577,520

Related U.S. Application Data

[63] Continuation of Ser. No. 494,641, Aug. 5, 1974, which is a continuation of Ser. No. 291,145, Sept. 5, 1972, abandoned.

[30] Foreign Application Priority Data

Sept. 29, 1971 Italy .................................. 70186/71
Apr. 19, 1972 Italy .................................. 68214/72
July 14, 1972 Italy .................................. 69276/72

[52] U.S. Cl. ............................. 340/172.5; 197/20
[51] Int. Cl.² ..................... B41J 5/46; B41J 19/00; G06F 9/16
[58] Field of Search .................. 340/172.5; 445/1; 197/19, 113, 117, 114, 84, 20

[56] References Cited

UNITED STATES PATENTS

| 3,630,336 | 12/1971 | Johnson et al. | 197/113 |
| 3,823,805 | 7/1974 | Richards | 197/113 |
| 3,894,623 | 7/1975 | Miyawaki | 197/113 |

*Primary Examiner*—Mark E. Nusbaum
*Attorney, Agent, or Firm*—Schuyler, Birch, Swindler, McKie & Beckett

[57] ABSTRACT

An automatic text processing system, wherein a text is printed by a typewriter and simultaneously recorded line by line in corresponding blocks of a magnetic tape. The system automatically prints the address of the block in which each line is stored, whereby an operator can cause the system to print selected lines of the text by posting the corresponding address on the typewriter. The lines or paragraphs of a text can be cancelled or added and their succession can be changed, by posting the addresses of the lines which are to be cancelled, added or shifted in the text. The fair copy is then automatically printed with the lines justified according to a format selected by the operator. According to another embodiment the system can be used to automatically search the information recorded on the magnetic tape.

9 Claims, 31 Drawing Figures

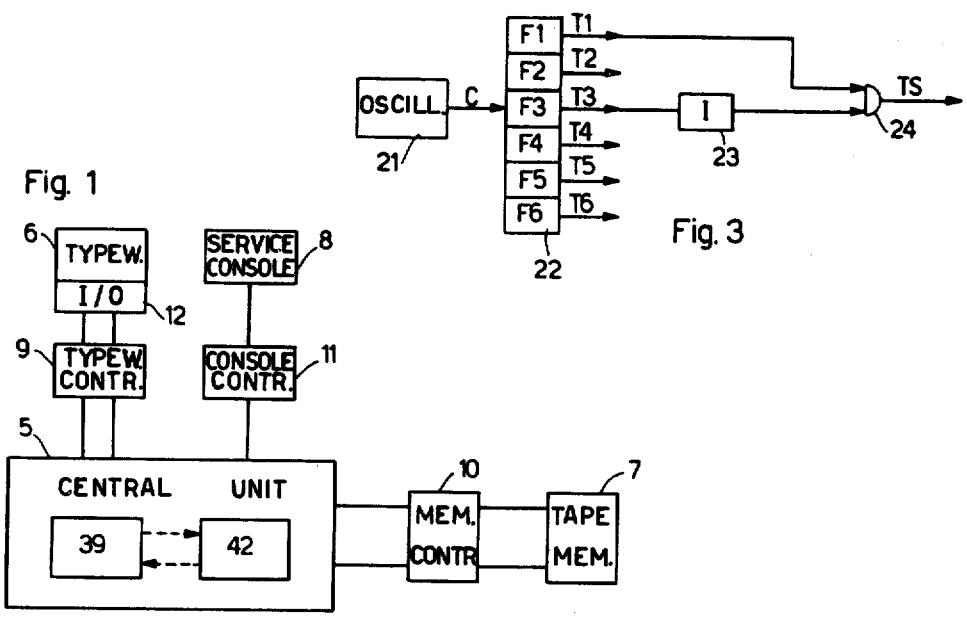
Fig. 1
Fig. 3
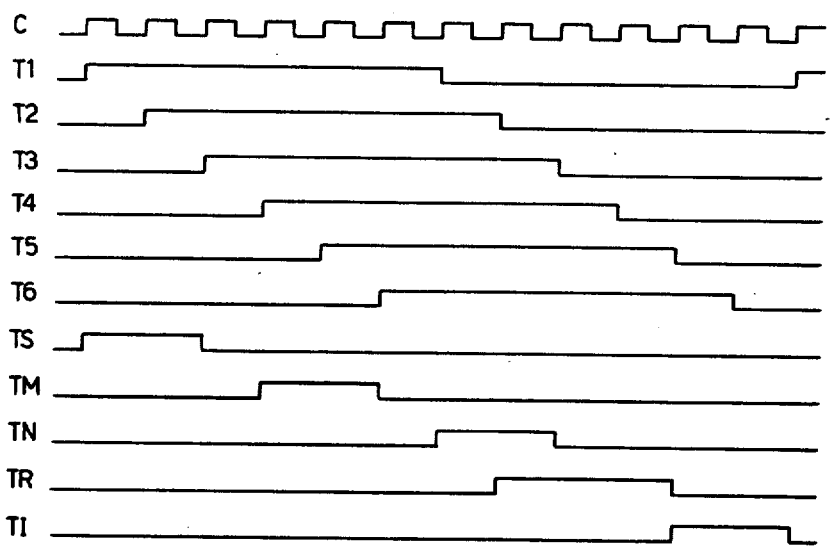
Fig. 4

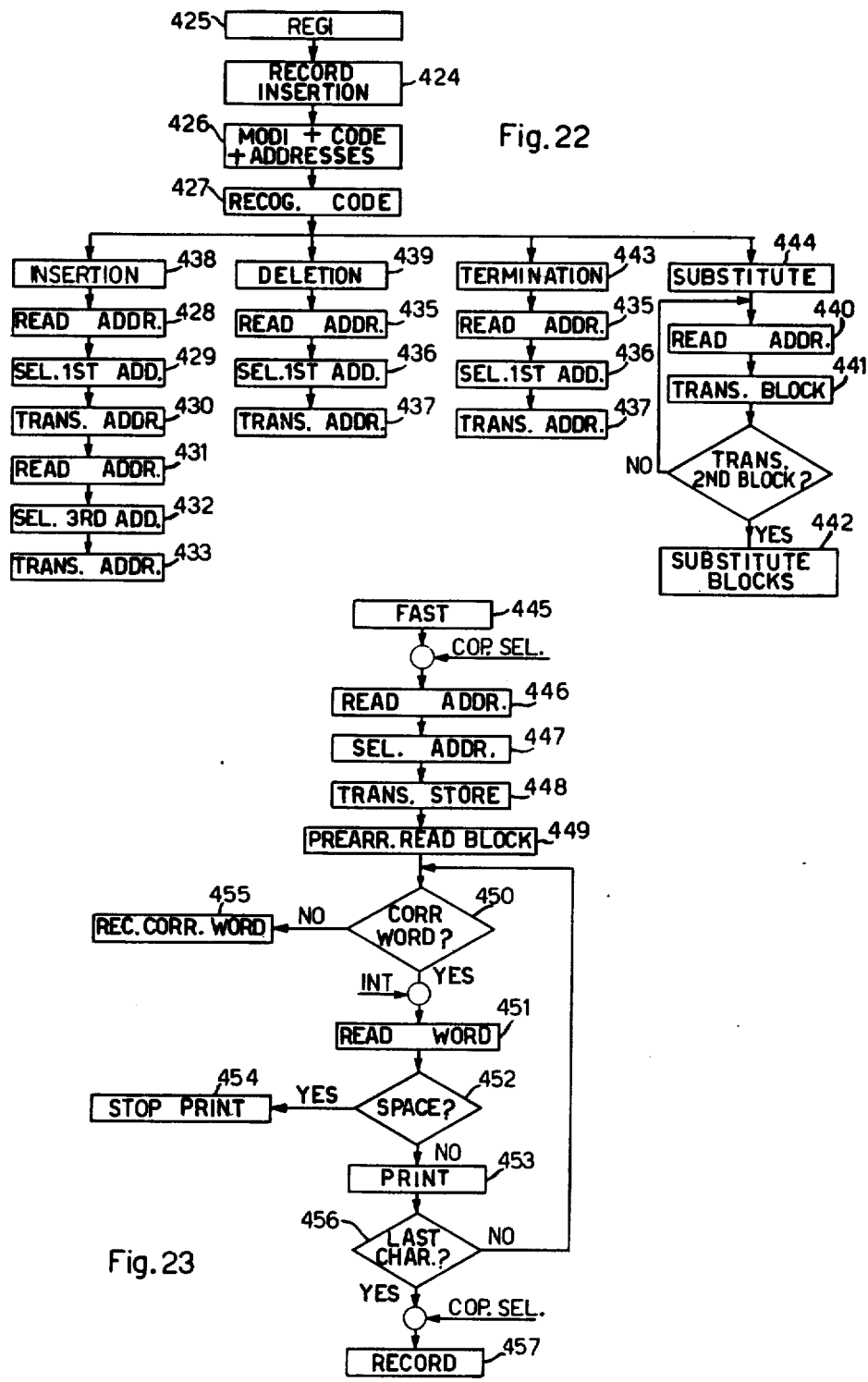

SYSTEM FOR AUTOMATICALLY PROCESSING AND PRINTING THE CONTENTS AND THE FORMAT OF A TEXT

This is a continuation, of application Ser. No. 494,641 filed Aug. 5, 1974 which is a continuation of application Ser. No. 291,145 filed Sept. 5, 1972 and now abandoned.

BACKGROUND OF THE INVENTION

The present invention relates to a system for automatically processing and printing the contents and the format of a text, comprising an input device for entering characters to be printed, a printing apparatus for printing the said characters in different printing lines, a storage unit for recording the said characters on a magnetic tape, the said tape being subdivided into a plurality of blocks, each block being identified by an address and being adapted to contain one line of print or writing.

In a secretarial office the need is keenly felt for an automatic printing system which will enable typewritten texts to be recorded so as then to be able to print them at high speed without mistakes and suitably processed, so that the printed text is made up perfectly into a page or pages with the headings centred and the lines of print justified.

In fact, an automatic printing system of this kind shortens the time required for typing a text several times, for example for personalized standard letters, since it does away with the time needed for turning out the same text several times. Moreover, since it is very frequently necessary in an office to send standard letters or circular letters which differ from one another only as regards the address or a few lines of writing, the need arises for an automatic printing system which will compose the various previously recorded parts of the text in the desired sequence.

Various automatic printing systems are known in which a text is printed in the form of a draft or proof and at the same time recorded on a punched tape. In one of these known systems, the text is corrected after the printing and the corrections are entered in the draft or proof so that the operator can identify them. To correct the text recorded on the tape, the operator commands the reading of the text from the punched tape and simultaneous printing on a printing sheet. He then stops the printing of the draft at the points where the various corrections are inserted; in this way, the text is re-recorded in the correct form on the punched tape, to be then printed.

An automatic printing system of this kind has the drawback that the operator cannot gain access to any point of the text to make a correction, since it is necessary to reprint the whole text each time up to the point at which the error appears. In this way, correction is very laborious and lengthy.

Another automatic printing system is known in which the data are introduced through the medium of a keyboard into the store of a central processor located at a certain distance and are visually displayed on a cathode ray screen. The operator can amend the visually displayed text by actuating suitable keys of the keyboard; in this way, the contents of the store of the central processor are altered. When the text is then to be printed, the processor supplies the coded characters of the correct text to the typewriter.

This printing system, however, has the disadvantage of being costly owing to the necessity for being connected to a processor. Moreover, the length of the lines of print, the margins, the insertions and cancellations or erasures are difficult for the operator to control inasmuch as they are linked to the programme of the central processor.

Finally, there is known another automatic printing system, also connected to a processor, comprising a keyboard, a cathode ray screen for visual display of the data, and a working store. The printed text is visually displayed and recorded in the working store. The operator then makes the corrections on the spot and when the text is complete it is transferred to the central processor, which retransmits it at the operator's request for printing.

This printing system also has the disadvantage of being costly in practice, owing to the difficulty of access to the correction points. Moreover, in this system there is the drawback of not being able to change easily the extent of the amendments to be made in the text inasmuch as they are recorded in the programme of the processor.

One technical problem that the automatic printing system according to the invention proposes to solve is that of creating an independently functioning printing system in which it is possible to gain access easily to any point whatsoever of a text for the purpose of inserting one or more amendments and in which these amendments can easily be selected and varied.

In a secretarial office the need very frequently arises to be able to have available a record which can be consulted easily and rapidly, for the purpose of avoiding waste of time due to manual searching for documents. Moreover, the need arises for socalled "cross-indexing", that is the recording or filing of the documents under different key words according to circumstances. For example, documents may be filed under three key words such as: "serial number", "date of issue of the document" and "number of matter". During the search, if it is necessary to retrieve all the documents issued on one and the same day, the key word "date of issue" is used, whereas if it is necessary to retrieve all the documents relating to one and the same matter the key word "number of matter" is used. Of course, it must be possible for the various key words to be chosen by the user in relation to his own document filing and search requirements; for example, the filing or indexing key words will be different if the system according to the invention is used in a personnel office or in an accounts office.

a document filing and search system as known which comprises a central processor connected to a series of terminal units. The key words relating to the individual documents are recorded by the operator in a programme contained in a store of the central processor. When the operator wishes to search for a document, he transmits the data relating to the document to the central processor through the medium of a terminal unit connected thereto. The central processor then carries out the search and transmits the result to the terminal unit, which arranges visual display of the result of the search on a screen or on a sheet of paper. A system of the type described has, however, the disadvantage of not being independent, since it requires the use of a central processor, and of being very costly because of the cost of purchasing or renting the central processor itself. This system moreover has the disadvantage that the key words relating to a given file are recorded in a given programme of the computer and therefore if the user desires to obtain another file he must change the computer programme, so that it is necessary to employ a skilled technician for recording the data relating to the new file.

There is moreover known another information search system in which the information is recorded on microfilms. When the operator desires to search for a document, he communicates to the central processor the key words relating to the desired document; the processor carries out the search and transmits the number of the document, so that the operator can access the microfilm. A system of the type described has, in addition to the disadvantage of requiring the use of a processor, also that of requiring an apparatus for projecting microfilms, as a result of which it is uneconomic.

Another technical problem that the present invention proposes to solve is that of providing an automatic information filing and search system which is independent and not connected to a central processor, in which a file and the key words relating thereto can be amended easily by an unskilled operator by means of the use of a typewriter, and in which the result of the search appears directly printed on a sheet of paper at the end of the search itself.

SUMMARY OF THE INVENTION

These technical problems are solved by the processing and printing system according to the invention, which is characterized by selection means adapted to select an address associated with one of the said blocks which is free from characters to condition the said printing apparatus to print in clear the said address identifying the said free block and the said storage unit to record in the said free block the characters entered on the said input device.

It is obvious that the printing of the address makes it easy for the operator to gain access to any point of the text for effecting the desired changes.

According to another feature, the present invention is characterized in that the said input device is adapted to be operated selectively to control recording means adapted to record in a predetermined block of the said store at least one combination of charactes adapted to classify the said information, and to command the said printing apparatus for printing the said combinations of characters.

BRIEF DESCRIPTION OF THE DRAWINGS

These characteristics and other characteristics of the invention will become clearer from the following description of a preferred embodiment given by way of example, but without restriction, with reference to the accompanying drawings, in which:

FIG. 1 is a block diagram of a printing system according to the invention;

FIG. 3 is a block diagram of a timing circuit of the central unit of FIG. 2;

FIG. 4 is a diagram of the timing signals generated by the circuit of FIG. 3;

FIG. 22 is a flowchart relating to the modifications of format of a text;

FIG. 23 is a flowchart relating to the correction of a line of the text;

Figure 2:
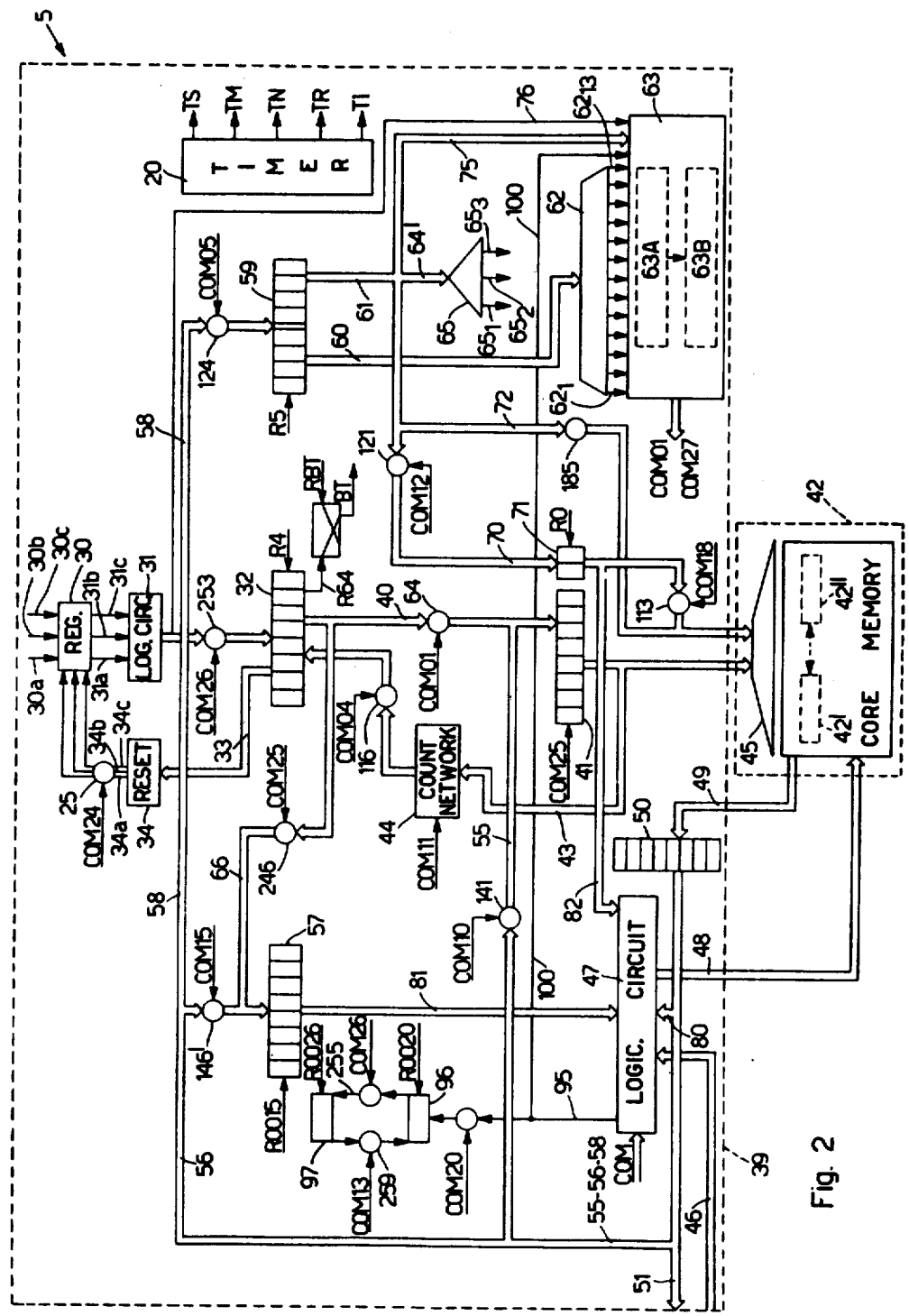
FIG. 2 is a block diagram of the central unit of the system of FIG. 1.

| INDEX TO THE DESCRIPTION | | |
|---|---|---|
| INTRODUCTION | PAGE | 9 |
| CENTRAL UNIT | '' | 10 |
| EXECUTION OF INSTRUCTIONS | '' | 26 |
|    1st Group of Instructions | '' | 27 |
|    2nd Group of Instructions | '' | 36 |
|    3rd Group of Instructions | '' | 39 |
|    4th Group of Instructions | '' | 45 |
| INTERRUPT | '' | 49 |
| TYPEWRITER CONTROL UNIT | '' | 54 |
| COMMAND KEYBOARD CONTROL UNIT | '' | 58 |
| MAGNETIC TAPE STORE CONTROL UNIT | '' | 59 |
| INTRODUCTION OF THE INSTRUCTIONS INTO THE CENTRAL UNIT | '' | 67 |
| RECORDING A TEXT | '' | 73 |
| AMENDING A TEXT | '' | 85 |
| CORRECTION OF WORDS | '' | 90 |
| PRINTING OF A CORRECTED TEXT | '' | 93 |
| 1st EXAMPLE OF OPERATION | '' | 101 |
| RECORDING THE FORMAT OF A FILE | '' | 105 |
| RECORDING A FILE | '' | 109 |
| AMENDING A FILE | '' | 113 |
| SEARCHING FOR DOCUMENTS | '' | 115 |
| 2nd EXAMPLE OF OPERATION | '' | 121 |
| SECOND EMBODIMENT | '' | 128 |

DESCRIPTION OF A PREFERRED EMBODIMENT

INTRODUCTION

The automatic printing system according to the invention comprises a central unit 5 (FIG. 1) having a processing unit 39 and a core store 42. The unit 5 is connected to a group of peripheral units including a typewriter 6, a magnetic tape store 7 and a command keyboard 8. The typewriter 6 is connected to the central unit 5 through a control unit 9, which controls the transmission of the commands and data between the typewriter 6 and the central unit 5

The typewriter 6 is of known type and comprises an input/output device 12 adapted to encode and decode the characters coming from the central unit 5 and to transmit the relevant commands to the typewriter 6, which may be of any known type.

The typewriter 6 is the input/output agency of the central unit 5. In fact, by means of the typewriter 6 it is possible both to enter texts and transmit them to the store 42 of the central unit 5, and to select the processing operations to be carried out by means of the automatic printing system, and to print the processed texts in their final form, as will be seen hereinafter.

The magnetic tape store 7 is also connected to the central unit 5 throug a control unit 10. The store 7 contains all the instructions for controlling the printing system, which from time to time are selected and tranferred to the store 42 of the central unit 5, and moreover contains the magnetic recording of the texts which are entered by means of the typewriter 6. These texts can be retrieved from time to time by the operator and placed in the central unit 5 for the purpose of being printed by the typewriter 6.

The command keyboard 8 is connected to the central unit 5 through the another control unit 11 and comprises a plurality of keys each associated with a particular group of instructions of the system. By means of these keys it is therefore possible to select the corresponding group of instructions without making use of the typewriter 6.

Firstly, the text to be processed is entered on the typewriter 6, which at the same time prints the text itself and transmits the latter, through the input/output device 12 and the control unit 9, to the store 42 of the central unit 5. From here the text is transferred through the control unit 10 to the tape store 7 to be recorded. The operator can now amend or modify this text both by adding or removing lines or paragraphs, and by modifying the length of the lines and by correcting typing errors. To effect these operations, the operator selects through the typewriter or of the command keyborad 8 that group of instructions which corresponds to the change he intends to make.

Each group of instructions is identified by a label, consisting for example of four letters, so that it can be easily picked out. In consequence of this operation the selected group of instructions is transferred from the tape store 7 to the store 42 of the central unit 5 to become operative. The central unit 5, carrying out the selected instructions, therefore processes the text and then transfers it to the tape store 7. The text is thus recorded in the desired form to be then printed by the typewriter.

The operations described hereinbefore are carried out by means of execution of a set of instructions which are recorded in the tape store 7.

CENTRAL UNIT

The central unit 5 includes a timing circuit or timer 20 (FIG. 2) for generating the timing signals necessary for the flow of the data within the central unit 5 itself. The timer 20 an oscillator 21 (FIG. 3) which supplies a signal C of frequency 6 MHz (FIG. 4). This signal acts on a shift register 22 (FIG. 3) formed by six flip-flops F1 – F6, which performs its entire cycle in 12 periods each with a duration of 2 $\mu$s. The output signals of the six flip-flops F1 – F6 are shown in FIG. 4 and are indicated by the references T1 – T6, respectively. To obtain the signals required for timing, the outputs of the six flip-flops F1 – F6, are coupled to one another through the medium of gate circuits the outputs of which constitute the timing signals of the central unit 5.

For example, for the purpose of obtaining a signal TS, the flip-flop F1 is coupled with the flip-flop F3. More precisely, through an inverter 23 (FIG. 3) the direct output of the flip-flop F3 is applied to one input of an AND gate circuit 24, while on the other hand the output of the flip-flop F1 is applied to the other input of the circuit 24. The output TS of the circuit 24 will therefore be at level "1" when the outputs of the flip-flops F1 and F3 have the values 1 and 0, respectively. It will be at level "0" in the other cases. It is therefore clear that by suitably coupling the outputs of the other flip-flops F1 – F6 all the other timing signals shown in FIG. 4 can be obtained.

The central unit 5 moreover comprises a register 30 (FIG. 2) with a capacity of three bits and composed of three flip-flops. The register 30 is provided with three inputs 30a, 30b and 30c which are respectively connected to the typewriter 6 (FIG. 1), to the external store 7 and to the operative keyboard 8. The register 30 (FIG. 2) is moreover provided with three outputs 31a, 31b and 31c which constitute an equal number of inputs for a logic circuit 31 adapted to force into a register 32 with a capacity of eight bits the code of an eight-bit character indicating the peripheral unit which has activated the corresponding input 30a, 30b or 30c of the register 30.

More precisely, during the execution of an instruction by the central unit 5, a peripheral unit 6, 7 or 8 can interrupt this execution to transmit data or instructions to the central unit 5. To this end, the peripheral unit 6, 7 or 8 then activates the corresponding input 30a, 30b or 30c of the register 30, and therefore the input 31a, 31b or 31c of the logic circuit 31, which supplies the corresponding eight-bit character.

Moreover, in the event of two peripheral units activating the respective inputs 31a, 31b and 31c at the same time, the logic circuit 31 is adapted to select from the two peripheral units the one which has precedence over the other and supplies as output a configuration of eight bits corresponding to this unit in accordance with a given priority order. To this end, the logic circuit 31 is constituted substantially by a combinatory network with three inputs and eight outputs. The voltage values of the eight outputs selectively constitute the configuration of eight bits corresponding to each of the inputs 30a, 30b and 30c.

The three inputs 31a, 31b and 31c are moreover connected to the logic circuit 31 in such manner that each of them can condition the corresponding combination of eight bits only if the input of higher order of priority is at zero level, in a manner known per se. For example, the input 31b can activate as output from the logic circuit 31 the combination of eight bits associated therewith only if the input 31a is at level 0. This obviously entails the input 31a having precedence over the input 31b. The same also applies to the input 31c compared with the input 31b.

As has been said, the outputs of the logic circuit 31 constitute as many inputs for the register 32. The outputs of the register 32 are connected through a channel 33 to a reset logic circuit 34. This last-mentioned circuit has three outputs 34a, 34b, 34c each associated with a combination of eight bits transmitted to the circuit through the channel 33 from the register 32, so that the reset logic circuit 34 actuates the output corresponding to the combination of eight bits present on the channel 33.

Each of the outputs 34a, 34b and 34c is connected to a corresponding reset circuit for the three flip-flops forming the register 30, so that when one of these outputs is activated the corresponding flip-flop of the register 30 is zeroized. In this way, if two signals are present at the same time as input to the register 30, for example at the inputs 30a and 30b, the logic circuit 31 forces into the register 32 and eight-bit character corresponding to the peripheral unit of a higher order of priority, that is to the typewriter 6, which is associated with the input 31a. Consequently, this character is transmitted through the channel 33 to the logic circuit 34, which activates only the output 34a corresponding to the typewriter 6. The flip-flop of the register 30 corresponding to the peripheral unit of higher order of priority is therefore zeroized, that is the flip-flop connected to the input 30a. In this way, after the operations connected with the peripheral of higher order have been effected, the flip-flop of the register 30 corresponding to the peripheral of less high order of priority remains activated, that is the flip-flop connected to the input 30b. There is therefore forced into the register 32 the eight-bit character corresponding thereto, after which the operations previously described are repeated, so that the peripheral units are taken into consideration by the central unit 5 always in accordance with the predetermined order of priority.

The outputs of the register 32 are moveover connected through a channel 40 to another register 41 completely identical to the register 32 and forming an input register of the core store 42. The character stored in the register 41 is transferred through a channel 43 to a counting network 44, the operation of which is known and which is adpated to increment by one unit the character introduced into it through the channel 43.

The outputs of the counting network 44 are connected in turn in the inputs of the register 32. In this way, the contents of the register 41 are incremented by one unit whenever a configuration of eight bits is forced into it through the channel 40. As will be better explained hereinafter, this enables the cells of the store 42 in which the data or the instructions of the programme in process of development are contained to be accessed sequentially.

The bits contained in the input register 41 are also transferred to an address decoding network 45 of the store 42. On the basis of the configuration of the eight bits present in the register 41, the decoding network 45 is adapted to select one of the cores of the store 42. The core store 42 has a capacity of 1024 eight-bit characters and is divided into four zones, called pages, each with a capacity of 256 characters. Each page is identified by a code number, these being 0, 1, 2 and 3, repectively. For identifying a cell of the store 42, ten bits are therefore necessary, that is two for identifying the page and eight for identifying a cell in the compass of the identified page.

The store 42 comprises eight like core matrices disposed in eight planes. Each core matrice is formed of 32 rows and 32 columns for a total of 1024 cores, so that each matrix has a capacity of 1024 bits. As is known, each core of the store 42 is traversed by four conductors: a write or inhibit conductor, a read or sense conductor and two addressing conductors. More particularly, each inhibit or sense conductor passes serially through all the cores in each plane and there are therefore eight sense and eight inhibit conductors. The two addressing conductors, on the other hand, are disposed at right angles and intersect in a corresponding core. Each addressing conductor passes serially through all the cores disposed in the same row and the same column of the eight matrices. More precisely, the addressing conductors associated with the first row and the first column of a core matrix pass serially through all the cores of the eight planes disposed in the first row and in the first column of each matrix. There are therefore in all 32 pairs of addressing conductors.

The decoding network 45 may be a combinatory network of any known kind and is therefore not described in detail. More particularly, the decoding network 45 has eight input conductors, to which the signals present in the register 41 are applied, and 32 outputs which are connected in order to the 32 pairs of addressing conductors. Each core is selected when the two addressing conductors which intersect in it are activated at the same time. Each pair of addressing conductors is energized in correspondence with a particular configuration of the signals present on the eight input conductors of the decoding network 45, thus selecting a corresponding group of eight cores which are brought to the 0 state. In order to introduce the information coming from one of the peripheral units 6, 7, 8 into a core of the store 42 which is selected in this way, these peripherals are connected through a channel 46 formed by eight conductors to the input of a store input logic circuit 47 hereinafter described. The output of this logic circuit 47 is formed by eight conductors forming a transmission channel 48. These conductors are connected to the corresponding inhibit conductors of each of the eight matrices of the store 42.

Over the inhibit conductors corresponding to those cores in which it is desired to write a 0 there is sent a current such as not to cause the switching or change of state of the selected core, whereas on the conductors corresponding to those cores in which it is desired to write a 1 the change of state is effected in known manner.

Similarly, in order to read the information recorded in the cores, the logic circuit 47 sends to the pair of addressing conductors a current opposite to that sent during the writing, so that there will be change-over only in the cores in which a 0 was recorded. There will therefore be an induced voltage only in the sense conductors passing through a core in which a 0 was recorded. The eight sense conductors are connected through the medium of an output channel 49 of the store 42 to an output register 50. The information read in the store 42 and recorded in the output register 50 may have different significances. In fact, it may relate to data which are to be transmitted to the peripheral units 6, 7, 8 or to store addresses which are to be used thereafter, or to data which are to be temporarily stored to be then compared with other data read in the store 42 or transferred to other addresses in the store 42, or to codes of the instructions which are to be executed by the central unit 5 during the carrying out of a set of instructions.

To this end, the register 50 is connected through a channel 51 to the peripheral units to transmit to them the data read in the store 42. The register 50 is moreover connected through a channel 55 to the register 41 to force into the same the store address which is to be used next. The register 50 is moveover connected through a channel 56 to an eight-bit register 57 to force into the same the data which are to be temporarily stored. Finally, the register 50 is connected through a channel 58 to another eight-bit register 59 for forcing into the same the codes of the instructions. The data which are to be temporarily stored in the register 57 may come, apart from the register 50, also from the register 32. To this end, the output of the register 32 is connected through a channel 66 to the input of the register 57.

The register 59 is connected through an output channel 60 to a decoding network 62 which has thirteen outputs $62_1$ to $62_{13}$, each one associated to an instruction used by the central unit 5. The decoding network 62 is a combinatory network of the type described in regard to the circuit 31.

As will be better explained hererinafter, each instruction is identified by an eight-bit code. The first four bits of the code distinguish an instruction from the remaining twelve, the second four bits consitute the so-called "address modifier", the significance of which will be seen hereinafter.

The network 62 activates from among the thirteen output conductors the one corresponding to the instruction expressed by the four-bit code present on the channel 60. The outputs $62_1$ to $62_{13}$ of the decoding network 62 command a command logic unit 63 which supplies, in the manner to be described a series of commands indicated hereinafter by the symbols COMO1 . . . . COM27, which control the transfer of the data within the central unit 5. More particularly, these commands actuate the gate circuits indicted in FIG. 2 by a circle, therefore permitting the transfer of the information along the transmission channel in which these circuits are inserted, from one register to the other or from the store 42 (FIG. 2) to one of the registers 50, 57, 59 connected to it, thus executing the respective instructions.

In FIG. 2, near each gate circuit there is indicated its particular actuating command. For example, the command COMO1 actuates a gate circuit 64 which allows the transfer of the contents of the register 32 through the channel 40 to the register 41.

The register 59 is divided into two parts each formed of four flip-flops. To the first four flip-flops there are sent the first four bits of the code of the instructions which define the type of instruction. The outputs of these flip-flops are grouped together in the channel 60. To the second four flip-flops of the register 59 there are sent the bits constituting the modifier. The outputs of these flip-flops are grouped together in another channel 61.

The bits of the modifier have a different significance according to the type of instruction. More precisely, the bits of the modifier can identify one of the peripheral units 6, 7, 8, to which is directed a message, or a command expressed by the instruction, or the store page to which a given address belongs. Moreover, the bits of the modifier can indicate that an address or a datum is to be incremented by one unit.

In the first case, the bits of the modifier are present on a channel 64' and are used by a decoding network 65 of the same type as the network 62, which selects the peripheral unit on the basis of the contents of the modifier activating one of its three outputs $65_1$, $65_2$, $65_3$. In this way, through the channel 51, the decoding network connects the register 50 with the selected peripheral unit for the transfer of the data between the central unit 5 and the selected peripheral unit.

When the bits of the modifier indicate a store page, the gate circuit 121 is activated by the command logic unit 63, as a result of which the first two bits of the modifier are sent through a channel 70 to a register 71 with a capacity of two bits, which thus stores the address of the page of the store 42. The contents of the register 71 and those of the register 41 form a complete store address which, as already seen, is formed by ten bits which define the 1024 cells of the store 42. The contents of the registers 71 and 41 may be varied or statiticized independently of one another, since the bits forced separately into the two registers 59 and 32 are sent to them through the respective channels 70 and 40. This possibility, for example, enables the data to be addressed by keeping the contents of the register 71 constant. The number of the page can also be directly introduced into the decoding logic network 45 through a channel 72, as will be seen hereinafter. The command logic unit 63 is also adapted to be conditioned by the bits of the modifier which are staticized in the register 59 and transmitted to it by means of a channel 75. A conductor 76 moreover connects the logic circuit 31 to the command logic unit 65. In this way, every time a peripheral unit 6, 7, 8 causes an interruption, activating one of the flip-flops of the register 30, the logic circuit 31 transmits a signal on the conductor 76. This signal is then used by the command logic unit 63 for generating the commands appertaining to the interruption itself.

The operative condition in which the central unit 5 is during the carrying out of an instruction is given the name of "machine state". Each machine state has a duration of 2 $\mu$s and is defined by the time signal TS, the course of which is shown in FIG. 4. In each machine state defined in this way, a series of commands is generated by the command logic unit 63 (FIG. 2) as a function of the signals present at its inputs, which, as has been said, are significative of the individual instructions. More precisely, the instructions are executed by the central unit 5 by means of the succession of a plurality of machine states. In each state there are defined univocally the operations to be carried out by the central unit 5. To this end, the command logic unit 63 comprises two blocks 63A and 63B. The block 63A, shown in detail in FIG. 5, determines the sequence of machine states through which the selected instruction is to be carried out on the basis of the input signals transmitted by the function decoding network 62. The block 63B, shown in FIGS. 6 to 12 for each machine state, generates a sequence of operative commands COMO1 – COM27 relating to the selected instruction.

More particularly, the block 63A has as inputs the conductors $62_1 - 62_{13}$ (FIG. 2) coming from the decoding network 62, each of the conductors $62_1 - 62_{13}$ being associated with one of the thirteen instructions. Moreover, the block 63A has an input the conductor 75 and 76 coming respectively from the second series of four flip-flops of the register 59 and from the register 31, and a conductor 100 coming from the store input logic circuit 47. Each machine state is defined by the energization of a corresponding output MA – MG of a series of flip-flops FA – FG included in the block 63A. Since each machine state has a duration of 2 μs, each of the flip-flops FA – FG must remain activated for an interval of time equal to 2 μs. To achieve this, there is introduced into the block 63A the timing signal TS, which acitivates the inputs of the flip-flips FA – FG through the AND circuits DA – DG. The outputs MA – MG of the flip-flops FA – FG condition the block 63B, so that in each state there are generated the commands associated with the individual instructions. More particularly, each circuit shown in FIGS. 60 to 12, of which the block 63B is composed, is activated by a corresponding signal MA – MG and is conditioned furthermore by the same input signals to the block 63A.

Since the need arises for timing a number of the commands COMO1 – COM27 in the compass of a machine state, timing signals TR, TI and TM (FIG. 4) generated by the timing circuit 20 (FIG. 3) are also located as input to the circuits of the block 63B.

The command COMO1 – COM27 generated by the block 63B of the logic unit 63 moreover act on the input logic circuit 47 (FIG. 2) of the store 42. This logic circuit 47 also has as inputs two channels 80 and 81, each with a capacity of eight bits. The channel 80 comes from the register 50, while the channel 81 comes from the register 57. The logic circuit 47 moreover has as input a channel 82 with a capacity of two bits and coming from the register 71. The channels 80, 81 and 82 transfer the contents of the registers 50, 57 and 71 to the input logic circuit 47, so that they may be processed therein in accordance with the corresponding commands COMO1 – COM27 generated by the command logic unit 63. The results of these processing operations, represented by a combination of eight bits, are sent through the output channel 48 to the cell of the store 42 identified by the address contained in the addressing register 41.

Figure 13:
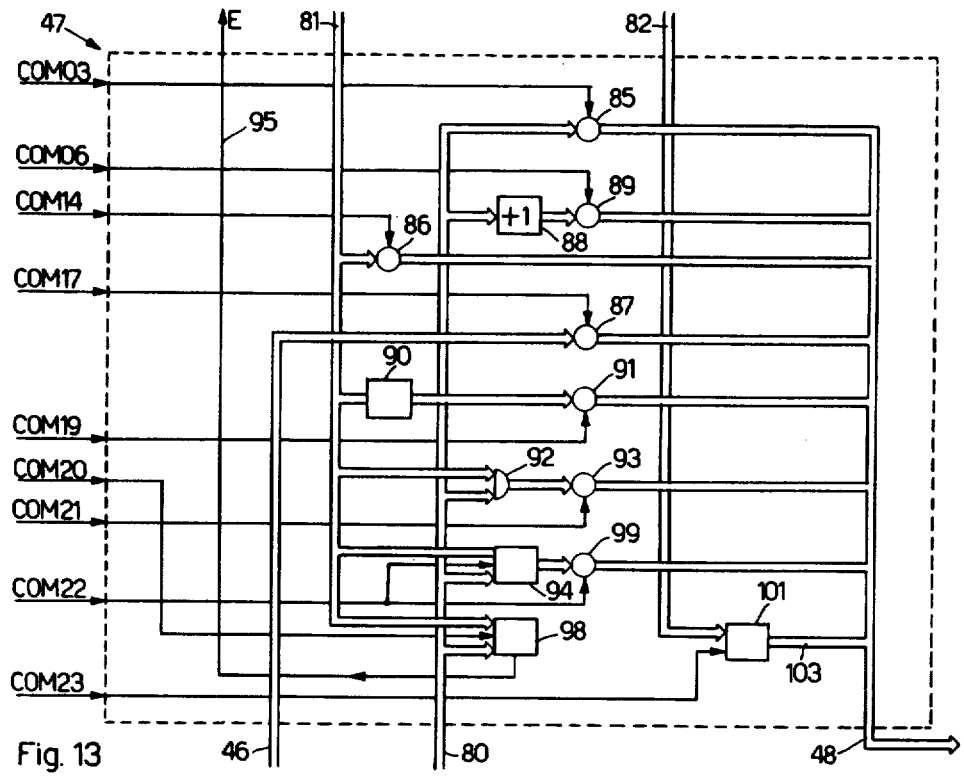
FIG. 13 shows an input circuit of the central unit of FIG. 2.

More precisely, the logic circuit 47 simply transfers the data present at its inputs on the output channel 48 when one of the commands COMO3, COM14 and COM17 acts on it. In fact, the command COMO3 acts on a gate circuit 85 (FIG. 13), as a result of which the bits present on the channel 80 coming from the register 50 are transferred on the channel 48. The commands COM14 and COM17, acting on two gate circuits 86 and 87, respectively, cause the transfer of the bits present on the channels 81 and 46, respectively, to the output channel 48. In this way, the characters present in the register 57 (FIG. 2) and the characters coming from one of the peripheral units 6, 7, 8 are introduced into the store 42 without being processed.

On the other hand, when the command COMO6 acts on the logic circuit 47, the character present on the input channel 80 is incremented by one unit from counting network 88 (FIG. 13) and is then transferred through a gate circuit 89 to the output channel 48. When the command COM19 is generated, the eight bits present on the input channel 81 are introduced into an interchange network 90, which interchanges the first four bits with the second four in a manner known per se. The new character obtained in this way is transferred through a gate circuit 91 on the output channel 48.

The logic circuit 47 (FIG. 2) can moveover compare the contents of the register 50 with the contents of the register 57. More precisely, if the command COM20 is present, a comparison circuit 98 known per se is actuated and compares the contents of the two registers 50 and 57 coming from them through the channels 80 and 81. The comparison effected by the comparison circuit 98 is significative of likeness or dissimilarity of the characters present in the two registers 50 and 57. The result of this comparison is represented by a bit E generated by the comparison circuit 98 and sent over a conductor 95. This bit is equal to 1 if the characters present in the two registers 50 and 57 are alike and equal to 0 if they are different.

The bit E is forced through the conductor 95 into a register 96 (FIG. 2) having a capacity of one bit. The contents of the register 96 can be forced into another register 97 identical to the register 96 when the command COM26 is generated. Conversely, the command COM13 produces the reverse transfer. Through the conductor 100, the bit E can moreover condition the operation of the command logic unit 63 during the carrying out of particular instructions.

Moreover, if the command COM21 is present, an AND circuit 92 (FIG. 13) effects the logical AND between the eitht bits respectively present on the input channels 80 and 81. The result of this operation is an eight-bit character which is transferred through a gate circuit 93 on the output channel 48. If, on the other hand, the command COM22 is present, a circuit 94 effects the logical exclusiveOR between the bits respectively present on the input channels 80 and 81. As is known, the result of this logical operation is equal to 1 if the two bits are different and is equal to 0 if the bits are alike. This result is then transferred through a gate circuit 99 on the output channel 48.

As has been said, all the groups of instructions which condition the operation of the central unit 5 are recorded, in a configuration described hereinafter, in the magnetic tape store 7 (FIG. 1). So that these groups of instructions may be executed by the central unit 5, they must be transferred one at a time from this store 7 to the core store 42 (FIG.2). After this, the instructions making up the selected group are executed in sequence by the central unit 5. For transferring the groups of instructions from the tape store 7 to the core store 42, a particular group of instructions called the "group of initial instructions" is used. This group of instructions is composed of 64 characters and is also recorded in the external store 7, in two positions predetermined by the magnetic tape.

The control unit 10 of the store 7 is adpated to recognize, in a manner which will be described hereinafter, the two store addresses in which the group of initial instructions is recorded. When these addresses are recognized, it initiates the transfer of the "group of initial instructions" in the following manner. Normally, the central unit 5 is in an inoperative condition, so that all its registers are zeroized. When the timer 20 (FIG. 2) generates the signal TS, through the AND circuit DA (FIG. 5) the output MA of the flip-flop FA is brought to level 1, so that the central unit 5 is put into the state A.

Then, an AND circuit 112 (FIG. 6) of the block 63B activated at the time TS, generating the command COMO1 which opens the gate circuit 64 (FIG. 2), causes the transfer of the contents of the register 32 to the register 41 and therefore to the decoding network 45. Moreover, the output MA directly generates the command COM18 (FIG. 6) which, opening a gate circuit 113 (FIG. 2), transfers the contents of the register 71 to the circuit 45. The address 000000000 of the store 42 — since all the registers of the central unit 5 are zeroized — is then forced into the decoding network 45. The contents of the corresponding cell are now transferred to the output register 50.

The control unit 10 of the tape store 7 has meanwhile already selected the character to be transmitted to the central unit 5 and has put this character into the input channel 46 in a manner which will be described hereinafter.

An AND circuit 114 (FIG. 6) of the block 63B generates in turn a command COM17, which opens the gate 87 (FIG. 13) of the circuit 47 and causes the transfer of the first character present on the channel 46 from the tape store 7 to the cell of the core store 42 the address of which is indicated by the decoding network 45.

At the instant TR (FIG. 4) following the time interval TS, an AND circuit 115 (FIG. 6) of the block 63B generates the command COM04, which opens a gate circuit 116 (FIG. 2) and transfers to the register 32 the contents of the register 41 incremented by one unit from the counting network 44. In this way, into the register 32 there is forced the configuration 00000001, therefore incrementing the address of the store 42.

The central unit 5 then controls the operation of the control unit 10 of the store 7 so that it selects and puts into the channel 46 the following character to be introduced into the store 42. The same operations as are described hereinbefore are then repeated, so that the succeeding information is recorded in the cell 00000001 of the store 42. In this way, the 64 characters of the group of initial instructions are recorded in the first 64 cells of the store 42. Since each machine state has a duration of 2 µs, the entire transfer of the group of initial instructions has a duration of 128 µs.

When the contents of the register 32 reach the binary value 64, the flip-flop of weight 64 of the register 32 assumes the value 1, therefore generating a signal R64 which activates an AND circuit 120 (FIG. 6) of the block 63B. The AND circuit 120 now generates a signal RBT which resets a flip-flop 35 (FIG. 2), so that the output BT of the latter assumes the value 0. At the same time, the register 32 is zeroized by a signal R4 generated by an AND circuit 121 (FIG. 6) of the block 63B, since the output signal BT of the flip-flop 35 is zero. At this instant, therefore, all the registers of the central unit 5 (FIG. 2) are zeroized and that the group of initial instructions is recorded in the core store 42. This group contains the instructions adapted to load the following instructions into the store 42.

All the following instructions begin with the state A. For these instructions, however, the flip-flop 35 is reset, that is its output BT has the value 0. When the commands COM01 and COM18 (FIG. 6) are now generated again, the address of the cell of the store 42 recorded in the registers 32 and 71 is transferred to the decoding network 45 (FIG. 2). The contents of this cells are therefore read and are then transferred to the output register 50. Therefore, when BT = 0, the reading of the store 42 takes place.

Since, as is known, the reading of the core store 42 is destructive, it is necessary to re-write the information read in the selected store cell. To this end, an AND circuit 123 of the block 63B (FIG. 6) activated by the signal BT generates the command COM03, which closes the gate circuit 85 (FIG. 13) of the logic circuit 47 and now transfers the contents of the register 50 (FIG. 2) to the same cell of the store 42 in which they were stored at the instant TR. The command COM04, in turn, transfers to the register 32 the contents of the register 41 incremented by one unit.

An AND circuit 122 of the block 63B (FIG. 6) being controlled by the signal BT through an inverter, now generates the commond COM05 at the instant TR (FIG. 4) following the instant TS. This command, opening a gate 124 (FIG. 2), transfers to the register 59 the contents of the register 50 which represents the first character of the instruction, so that during the state A the first character of the instruction is read.

An AND circuit 124 of the block 63A which is also controlled by the signal BT through an inverter (FIG. 5) now activates the flip-flop FB at the instant TS, through the AND circuit DB, so that the output MB of this flip-flop is brought to the level 1. At the same time, the flip-flop FA is reset, as a result of which the central unit 5 passes from the state A to the state B.

During the state B there are generated the commands COM01, COM18 and COM03 common to all the instructions, which commands, as has been seen, cause the transfer to the output register 50 of the contents of the cell of the store 42 identified by the contents of the register 32 and the subsequent writing of these contents in the same cell of the store 42. These operations during the state B produce the reading of the second character of the instruction, since the address staticized in the register 32 has been incremented by one unit during the state A.

During the state B there are moreover generated by the block 63B commands relating to the individual instructions, on the basis of the contents of the register 59, which still contains the code of the instruction. The first four bits of this code are transferred through the channel 60 to the decoding network 62, which activates the output corresponding to the instruction expressed by the four bits that are input. As will be seen hereinafter, this output remains activated throughout the interval necessary for the execution of the instruction itself and therefore conditions the generation of the commands by the logic unit 63 during the various machine states which are generated by the block 63A.

EXECUTION OF INSTRUCTIONS

There will now be described the execution of the individual instructions by the central unit 5. There are thirteen instructions provided for the execution of any programme and they may be formed by two or three characters, each character comprising eight bits. The first character of each instruction is used to characterize the instruction itself and it has the format:

$b_0\ b_1\ b_2\ b_3\ b_4\ b_5\ b_6\ b_7$

The first four bits $b_0 - b_3$ represent the code of the instruction, while the second four $b_4 - b_7$ represent the modifier. The instructions are substantially of two types in relation to the number of characters of which they are formed.

The instructions of the first type are composed of three characters, the first of which defines the instruction, while the second and third characters respectively define the addresses of the cells of the core store 42 on the contents of which the instruction itself is to operate. The contents of these cells will be called the operand. More particularly, the operand of which the address is defined by the second character of the instruction will be called the 1st operand, and the operand the address of which is defined by the third character of the instruction will be called the 2nd operand.

The instructions of the second type are composed of two characters, the first of which defines the instruction, while the second character defines the address of the cell of the operand in the store 42. The instructions of the second type are called external instructions, since, as will be explained hereinafter, they permit the transfer of commands or information from the central unit 5 to one of the peripheral units 6, 7, 8 connected thereto or vice versa.

The thirteen instructions are divided in relation to the machine states necessary for their execution into four groups, which will now be described in detail.

1ST GROUP OF INSTRUCTIONS

To the 1st Group of Instructions there belong the instructions which are executed by the central unit 5 by means of the sequence of the five states A, B, C, D, E. The time necessary for their execution is therefore 10 $\mu s$.

These instructions are: Transfer (TRA), Interchange (SCA), Comparison (CFR), Logical product (AND), Exclusive-OR (EX OR), Free Transfer (TRL) and are described individually in detail hereinafter with reference to Tables I and II on pages 47 and 48.

1. Transfer (TRA)

The transfer instruction identified by the code 1000 effects the transfer of the 1st operand from the address defined by the second character of the instruction to the address defined by the third character. As has been said, the address of the cells of the store 42 is such that every store cell is identified by the number of the page and the number of the cell in that page. However, the instructions are organized in such manner that all the addresses of the operands relating to the instructions of a single programme are located in the same page of the store, called precisely the "current page". Moreover, during the execution of a programme, as will be seen hereinafter, reference may be made to operands or to instructions the address of which belongs to page 0. An operand or an instruction may therefore belong either to the "current page" or to "page 0".

The code relating to the store page to which the operands of the instructions belong is supplied with the bits $b4$ and $b6$ of the modifier in the following manner. If the bit $b4 = 1$, the store cell defined by the second character of the instruction (address of the 1st operand) belongs to the current page, if the bit $b4 = 0$ it belongs to the page 0. If the bit $b6 = 1$, the store cell defined by the third character (address of the second operand) belongs to the current page, if $b6 = 0$ it belongs to the page 0.

During the execution of a programme, moreover, it may become necessary, after the execution of an instruction, for the store address of the two operands to be incremented or not by one unit. This eventuality is expressed by the value assumed by the bits $b5$ and $b7$. If the bit $b5 = 1$, the address of the 1st operand is incremented by one unit after the execution of the instruction, if $b5 = 0$ it remains unchanged. The same occurs in the case of the address of the 2nd operand if $b7 = 1$ or $b7 = 0$, respectively.

As has been said, the code of the instruction TRA is read during the state A and is sent through the register 59 (FIG. 2) to the decoding network 62. During the state B, this network effects the decoding of the code of the instruction while the commands COM01, COM18 and COM03 are generated, which cause the reading of the second character of the instruction, that is the address of the 1st operand. In correspondence with the code of this instruction, the decoding network 62 activates the output $62_1$ (FIGS. 2 and 7) and, therefore, the output of an OR circuit 130 (FIG. 7) of the block 63B.

If the bit $b5$ of the modifier of the instruction has the value 1, the second character of the instruction, which is staticized in the register 50 (FIG. 2), must be re-written in the store 42 incremented by one unit. In this case, the inputs of an AND circuit 131 (FIG. 7) of the block 63B are all at the level 4, so that the circuit 131 generates the command COM06. This command opens the gate 89 (FIG. 13) of the circuit 47, whereby the character contained in the register 50 is carried through the input channel 80 to the circuit 98, which increments it by one unit; it is then transferred through the output channel 48 to the store 42.

If, on the other hand, the bit $b5$ of the modifier is zero, the output of the AND circuit 131 (FIG. 7) is at zero level, whereby the command COM06 is not generated. During the state B, an AND circuit 300 of the block 63B being now activated, the command COM04 is now generated at the instant TR and opens the gate circuit 116 (FIG. 2), causing, as has been seen, the transfer to the register 32 of the address staticized in the register 41 and incremented by one unit by the counting network 44. At the same instant TR (FIG. 4) there is activated the output of another AND circuit 132 (FIG. 7) of the block 63B, whereby the command COM15 is generated. This command causes the activation of a gate circuit 146 (FIG. 2), which causes the transfer of the contents of the register 50 to the register 57.

During the state B, there has therefore been carried out the reading of the second character of the instruction which represents the address of the first operand and this has then been transferred to the register 57. If the bit $b5$ is equal to 1, this address has moreover been re-written in store incremented by one unit.

The passage of the central unit 5 to the state C now takes place. To this end, during the state B, the outputs $62_7$, $62_{10}$, $62_{11}$ and $62_{13}$ (FIG. 5) of the decoding circuit 62 are all at the level 0, since only the output $62_1$ corresponding to the instruction TRA is activated. Through the inverter circuits 134, these outputs activate the corresponding inputs of an AND circuit 133 of the block 63A. Moreover, since also the output $62_6$ of the circuit 62 is at zero level, through an inverter 135 the input 136 of an OR circuit 137 of the block 63A is activated. In this way, an AND circuit 133 of the block 63A is actuated and in turn actuates the input 138 of another AND circuit 139 of the block 63A. Since the other input of this AND circuit 139 is connected to the output MB of the flip-flop FB, the AND circuit DC is activated at the instant TS, as a result of which the flip-flop FC places the output MC at the level 1. At the same time, the AND circuit DC resets the flip-flop FB, as a result of which the central unit 5 therefore passes from the state B to the state C.

The state C is used for the reading of the 1st operand. In fact, an AND circuit 140 (FIG. 8) of the block 63B generates the command COM10 at the instant TS. This command, opening a gate circuit 141 (FIG. 2) of the channel 55, causes the transfer of the address of the first operand from the register 50 to the addressing register 41.

If the address of the 1st operand belongs to the current page, since the bit $b4$ of the modifier of the instruction TRA has the value 1, the input 142 of an AND circuit 143 (FIG. 8) is activated. The input 144 of the circuit 143 is moreover activated through an inverter, since the output $62_6$ of the decoding circuit 62 is at the level 0. The AND circuit 143 therefore generates the command COM18 which, as has been seen, controls the transfer of the contents of the page register 71 (FIG. 2) to the address decoding circuit 45.

If, on the other hand, the bit $b4$ is at the level 0, the command COM18 is not generated and no bit is forced into the address decoding circuit 45, so that the store page selected is the page 0.

At the same time there takes place the reading of the contents of the store cell selected by the address of the 1st operand and the transfer of the contents to the output register 50. At the instant TR (FIG. 4) an AND circuit 145 (FIG. 8) is moreover enabled, so that the command COM15 is generated. This command, opening a gate circuit 146 (FIG. 2), causes the transfer of the first operand from the register 50 to the register 57. Finally, the command COM03 is generated by another AND circuit 146 (FIG. 8) and commands the writing in the cell of the store 42 of the same information that has been read. Thus, in the state C, there is carried out the reading of the 1st operand, which is re-written in the cell in which it was located and transferred to the register 57.

The passage of the central unit 5 to the state D is then effected. In fact, since the output $62_1$ of the decoding circuit 62 has the value 1, an OR circuit 147 (FIG. 5) of the block 63A is now activated and, consequently, the input 148 of an AND circuit 149. Since the other input 150 of the AND circuit 149 is activated by the flip-flop FC, the flip-flop FD is activated at the instant TS through the AND circuit DD; at the same time, the AND circuit DD resets the flip-flop FB, as a result of which the central unit 5 passes from the state C to the state D.

The state D is used for reading the address of the cell to which the first operand is to be transferred. In fact, at the time (FIG. 4), an AND circuit 155 (FIG. 9) of the block 63B generates the command COM01 which, opening the gate circuit 64 (FIG. 2), transfers the contents of the register 32 to the register 41. The contents of the register 32 have been incremented by one unit during the state C, so that into the addressing register 41 there is forced the address of the store cell following that in which the contents were read during the state C.

If the bit $b6$ of the modifier is 1, the current page is selected by an AND circuit 156 (FIG. 9) through the command COM18. In fact, in this case, the outputs $62_{12}$ and $62_{13}$ of the decoding circuit 62 are at aero level and through two inverters energize, together with the bit $b6$, the AND circuit 156. Through the medium of the circuit 113 (FIG. 2), the command COM18 now transfers the contents of the page register 71 to the addressing circuit 45. Since the contents of the register 71 have not been changed during the preceding states, they define the current page.

If the bit $b6$ is 0, the command COM18 is not generated by the AND circuit 156 (FIG. 9), so that no bit is forced into the addressing circuit 45, causing the selection of the page 0.

At the same time there takes place the reading of the store cell selected by the third character of the instruction, that is by the address of the cell to which the first operand is to be transferred. These contents are then transferred to the output register 50. The command COM03 (FIG. 9) is moreover generated directly by the flip-flop FD and causes the address read to be re-written in the cell selected.

Figure 9:
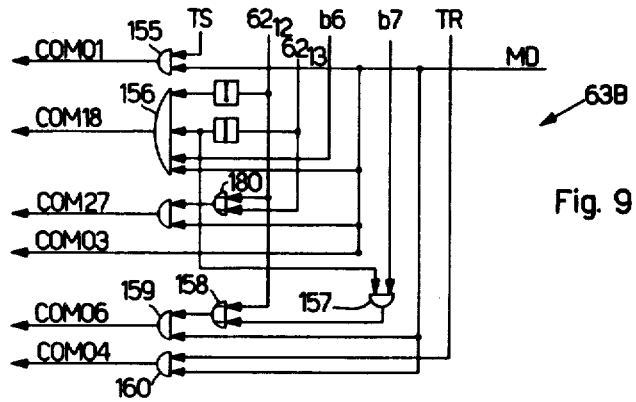
Figure 10:
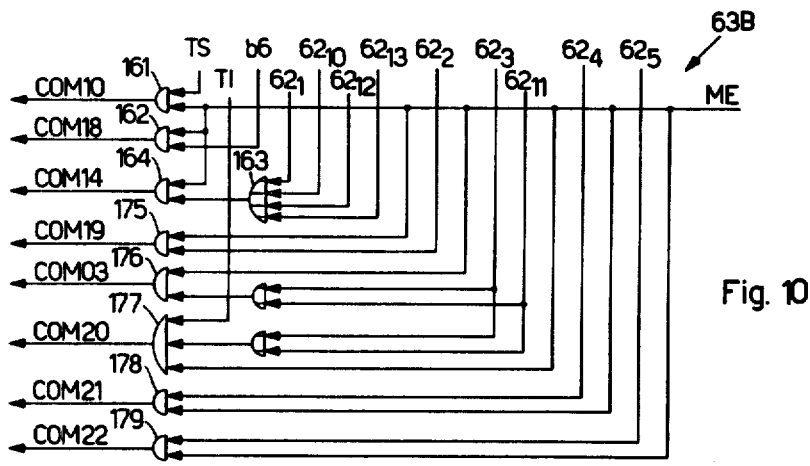
Figure 11:
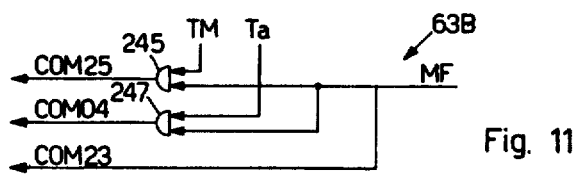
Figure 12:
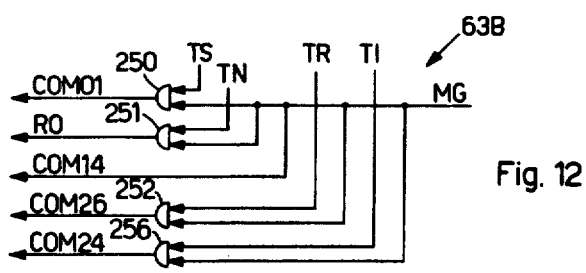

If the bit $b7$ of the modifier is 1, it activates an input of an AND circuit 157 (FIG. 9). Since the output $62_{12}$ is at the level 0, the other input is also activated, as a result of which the AND circuit 157 activates in turn an OR circuit 158 and therefore an AND circuit 159. The last-mentioned circuit then generates the command COM06 which, as has been seen hereinbefore, conditions the store input circuit 47 (FIG. 2) in such manner as to re-write in the selected store cell the address read therein incremented by one unit. During the state D, an AND circuit 160 generates at the instant TR the commond COM04 which, as has been seen before, causes the contents of the register 32 (FIG. 2) to be incremented by one unit.

Finally, at the instant TS (FIG. 2) there is activated the AND circuit DE (FIG. 5), which in turn activates directly the flip-flop FE, as a result of which the output ME is brought to the level 1. The AND circuit DE moreover resets the flip-flop FD, as a result of which the central unit passes from the state D to the state E.

The state E is used to transfer the 1st operand, which has been staticized during the state C in the register 57 (FIG. 2), to the cell of the store 42 the address of which has been read during the state D. In fact, at the instant TS, the command COM10 is generated by an AND circuit 161 (FIG. 10) of the block 63B and, acting on the gate circuit 141 (FIG. 2), causes the transfer to the register 41 of the address read during the state D and forced into the register 50.

If the bit $b6$ is 1, an AND circuit 162 (FIG. 10) generates the command COM18 which, causes the transfer of the contents of the page register 71 (FIG. 2) to the addressing circuit 45. Since the output $62_1$ of the circuit 62 corresponding to the transfer instruction is at level 1, an OR circuit 163 (FIG. 10) is activated and, therefore, an AND circuit 164. In this way there is generated the command COM14 which, by means of the store input circuit 47 (FIG. 13), causes the transfer of the 1st operand contained in the register 57 to the store cell selected by the decoding network 45. Therefore, during the state E, the 1st operand is transferred from the cell corresponding to the address identified by the second character of the instruction read during the state B to the cell corresponding to the address identified by the third character read during the state D.

At the instant TS (FIG. 4) following the operations described, if any of the peripheral units 6, 7, 8 do not interrupts, the flip-flop FE (FIG. 5) activates the input 166 of an AND circuit 167. The other input 168 is activated through an inverter 169 by a signal INT indicating the interrupt, since it has the value O. The output 204 of the AND circuit 167 activates in turn, through the AND circuit DA, the flip-flop FA, as a result of which the central unit passes from the state E to the state A and the execution of the following instruction can be initiated.

2. Interchange (SCA)

The interchange instruction (SCA) is identified by the code 1010 and effects the transfer of the 1st operand read in the cell defined by the second character to the cell defined by the third character, interchanging the first four bits with the second four bits of the 1st operand. The modifier of this instruction has the same significance as the modifier of the instruction TRA.

The instruction SCA is recognized by the decoding circuit 62, which then generates as output a signal $62_2$.

The instruction is executed in a manner entirely identical to that in which the instruction TRA discussed above is executed. The only difference consists in the fact that during the state E an AND circuit 175 (FIG. 10) activated by the output $62_2$ generates the command COM19. This command, acting on the store input circuit 47, in the manner hereinbefore described, causes the transfer of the contents of the register 57 (FIG. 2) to the selected store cell, interchanging the two groups of bits.

3. Comparison (CFR)

The comparison instruction (CFR) is identified by the code 1001 and effects the comparison bit by bit between the 1st operand and the 2nd operand, the result of which is expressed by the bit E forced into the register 96 (FIG. 2) of the central unit 5. The modifier of this instruction has the same significance as the modifier of the preceding instructions.

The instruction CFR is recognized by the circuit 62, which then generates a signal at the output $62_3$. The instruction CFR is executed in a similar manner to the instruction TRA. The sole difference consists in the fact that during the state E the commands COM03 and COM20 are generated. In fact, the command COM03 is now generated by an AND circuit 176 (FIG. 10) and causes the writing of the contents of the register 50, that is the writing of the 2nd operand, in the selected store cell. The command COM20 is generated at the instant TI (FIG. 4) by an AND circuit 177 (FIG. 10) and, as has been seen, conditions the store input circuit 47 (FIG. 2) so that a comparison is made between the contents of the registers 50 and 57 and the bit E = 1 is forced into the register 96 if the two contents are the same.

4. Logical product (AND)

The instruction AND is identified by the code 1111 and effects the logical AND bit by bit between the 1st operand and the 2nd operand. The modifier of this instruction has the same significance as the modifier of the preceding instructions.

The instruction AND is recognized by the circuit 62, which then generates as output a signal $62_4$. This instruction ia executed in an entirely similar manner to the instruction CFR. The sole difference consists in the fact that during the state E the output $62_4$ activates an AND circuit 178 (FIG. 10) which generates in turn the command COM21. This, as has been said, acts on the store input circuit 47 so that the logical AND is effected between the contents of the registers 50 and 57. The result of this comparison, represented by an eight-bit character, is in turn transferred to the store cell in which the 2nd operand was located. This is made possible by the fact that during the state E the address of the 2nd operand is present in the register 41.

5. Exclusive-OR (ORE)

The instruction ORE is identified by the code 1110 and effects the exclusive-OR bit by bit between the 1st operand and the 2nd operand. The result of this operation is stored in the cell of the 2nd operand in the store 42. As regards this instruction also, the modifier has the same significance as the modifier of the preceding instructions.

The instruction ORE is recognized by the circuit 62, which then generates as output a signal $62_5$ and operates like the instruction AND. The sole difference consists in the fact that during the state E the ouput $62_5$ activates an AND circuit 179 (FIG. 10), which in turn generates the command COM22. As has been seen, this command acts on the store input circuit 47 so that the exclusive-OR operation is carried out.

6. Free transfer (TRL)

The free transfer instruction (TRL) is defined by the code 1011 and effects the transfer of the 1st operand from the cell defined by the second character to the cell defined by the third character, in any page of the store 42, in contrast to the instruction TRA. The page in which the transfer takes place is identified by the bits $b6$ and $b7$ of the modifier. If $b6 = b7 = 0$, the address defined by the third character belongs to page 0, if $b6 = 0$ and $b7 = 1$ it belongs to page 1, if $b6 = 1$ and $b7 = 0$ it belongs to page 2, if $b6 = b7 = 1$ it belongs to page 3. The bits $b4$ and $b5$ of the modifier have the same significance as the bits $b4$ and $b5$ of the modifier of the instruction TRA.

The instruction TRL is recognized by the circuit 62, which then generates as output a signal $62_{12}$, and is executed in the same way as the instruction TRA. except that, in the state D, the output $62_{12}$ activates an OR circuit 180 (FIG. 9) which in turn generates the command COM27. This command, acting on a gate circuit 185 (FIG. 2), transfers to the decoding network 45 the bits $b6$ and $b7$ of the modifier, that is the address of the store page to which the 1st operand is to be transferred.

2nd Group of Instructions

To this group there belong the instructions concerning a constant which represents the 1st operand and is expressed by the second character of the instruction. These instructions are: transfer of constant (TRC), free transfer of constant (TLC) and comparison of constant (CDC). The said instructions are executed by the central unit 5 by means of the sequence of the states A, B, D, E. The time required for their execution is therefore 8 μs. These instructions are respectively associated with the outputs $62_{10}$, $62_{13}$ and $62_{11}$ of the decoding circuit 62.

They are executed substantially in the same way as the instructions (TRA), (TRL) and (CRF) except for the fact that the state C is not carried out. In fact, the operations carried out in the states A and B are entirely identical to the operations executed by the corresponding instructions of the 1st Group. More precisely, during the state A the code of the instruction is read and during the state B the second character, which now represents the constant, is read. Since the constant is now read during the state B, it is not necessary to carry out the state C, which is used by the corresponding instructions of the 1st Group to read the 1st operand in the store 42.

Since one of the ouputs $62_{10}$, $62_{13}$, $62_{11}$ is now always at level 1, the OR circuit 186 (FIG. 5) is activated. This circuit activates the input 187 of an AND circuit 188, while the other input 189 is activated by the flip-flop FB, as a result of which the AND circuit 188 activates the flip-flop FD through the AND circuit DD at the time TS (FIG. 4). The AND circuit DD moreover resets the flip-flop FB, acting on the corresponding reset circuit, so that there is a change directly from the state B to the state D.

1. Transfer of constant (TRC)

The transfer-of-constant instruction (TRC) is identified by the code 1100 and effects the transfer of the constant expressed by the second character of the instruction to the cell identified by the third character of the instruction. The constant may also be incremented or not by one unit after the execution of the instruction under the control of the bit $b5$ of the modifier. If $b5 = 0$, the constant remains unchanged, if the bit $b5 = 1$ the constant is incremented by one unit. The store address defined by the third character may also be incremented or not by one unit under the control of the bit $b7$ of the modifier. If $b7 = 0$, the address remains unchanged, if $b7 = 1$ the address is incremented by one unit.

It is to be noted that the bit $b4$ of the modifier is always zero and is not used. Therefore, to define the store page to which the address expressed by the third character belongs, the bit $b6$ of the modifier is used. If $b6 = 0$, the address belongs to page 0, if $b6 = $ the address belongs to the current page.

The instruction TRC is recognized by the circuit 62, which then generates as output a signal $62_{10}$. As has been said, tis signal directly causes the passage of the central unit 5 to the state D. During this state, the same operations as have been described for the instruction TRA are performed, that is the reading of the third character of the instruction. During the state E there then takes place the transfer of the constant to the address defined by the third character, as for the instruction TRA.

2. Free transfer of constant (TLC)

The instruction for free transfer of constant (TLC) is defined by the code 0100 and effects the transfer of the constant defined by the second character to the address defined by the third character. The modifier of this instruction has the same significance as the modifier of the instruction TRL. During the states A and B there are exeated the same operations as have been described for the instruction TRC, that is the reading of the code of the instruction and of the constant.

The instruction is recognized by the circuit 62, which then generates as output a signal $62_{13}$. As has been said, this signal directly causes the passage of the central unit 5 from the state B to the state D. During this state there is effected the reading of the third character of the instruction, as in the case of the instruction TRL. During the state E there then is carried out the transfer of the constant to the adddress defined by the third character as for the instruction TRA.

3. Comparison of constant (CDC)

The instruction for comparison of a constant (CDC) is identified by the code 1101 and effects the comparison bit by bit between the constant expressed by the 1st operand and the 2 operand. The result of this comparison is expressed by the bit $E = 1$ if the two operands are alike and by the bit $E = 0$ is they are different. This bit is placed in the register 96 of the central unit 5 (FIG. 2).

The modifier of the instruction CDC has the same significance as the modifier of the instruction TRC. The instruction CDC is recognized by the circuit 62, which then generates as output a signal $62_{11}$, as a result of which the passage of the central unit 5 from the state B to the state D takes place. During this state, the reading of the second operand is effected as in the case of the instruction CFR. Finally, during the state E comparison takes place between the constant and the 2nd operand.

3rd Group of Instructions

To this group there belong the instructions which are executed by the central unit 5 (FIG. 2) by means of the sequence of the states A, B and C. The time required for their execution is therefore 6 $\mu s$. These instructions are: the character-from-peripheral instruction (CDP), the character- to-peripheral instruction (CAP) and the jump instruction (SAL).

These instructions have a single address and are therefore formed by two characters. The first character contains the code which characterizes the type of instruction within the limits of the group and the relevant modifier. The second character contains the store address of the operand.

1. Character from peripheral (CDP)

The character-from-peripheral instruction (CDP) is defined by the code 0110 and effects the transfer of the operand from the peripheral unit defined by the bits $b6$ and $b7$ of the modifier to the store address defined by the second character. The bit $b4$ of the modifier defines the store page to which the address defined by the second character belongs. If $b4 = 0$, the address belongs to page 0, if $b4 = 1$ it belongs to the current page. If, moreover, the bit $b5 = 0$, the address remains unchanged after the execution of the instruction, if the bit $b5 = 1$ the address is incremented by one unit.

During the state A, the instruction CDP is recognized by the circuit 62, which then generates as output a signal $62_8$. During the state B, the second character of the instruction is read, as for the instructions of the lst and 2nd Groups. The second character of the instruction identifies the cell of the store 42 in which is to be recorded the character transmitted by the peripheral unit 6, 7 or 8 defined by the bits $b6$ and $b7$ of the modifier.

From the state B the central unit then passes to the state C, since the AND circuit 139 of the block 63A (FIG. 5) is activated by the OR circuit 133, the ouputs $62_6, 62_7, 62_{10}, 62_{11}$ and $62_{13}$ of the circuit 63 being zero. During the state C, the output $62_8$ activates an AND circuit 197 (FIG. 8) which in turn generates the command COM17, which causes in the store input circuit 47 the transfer of the character present on the channel 46 (FIG. 2) to the cell of the store 42 the address of which has been read during the state B.

After these operations, the central unit 5 returns to the state A. In fact, since the output $62_8$ is at level 1, an OR circuit 198 (FIG. 5) is always activated. Consequently, there is activated an input 199 of an AND circuit 200, the other input 201 of which is activated through an inverter 169. In this case, the AND circuit 200 activates an AND circuit 202 enabled by the output 203 of the flip-flop FC. The output 204 of the AND circuit 202 activates in turn at the instant TS (FIG. 4) the flip-flop FA, as a result of which the central unit passes from the state C to the state A.

2. Character to peripheral (CAP)

The character-to-peripheral instruction (CAP) is identified by the code 0111 and effects the transfer of the operand the address of which is defined by the second character to the peripheral defined by the bits $b6$ and $b7$ of the modifier. These bits have the same significance as the corresponding bits of the instruction CDP. During the state A, this instruction is recognized by the circuit 62, which then generates as output a signal $62_9$.

The second character of the instruction read in the state B now identifies the address of the character which is to be transmitted to the peripheral unit defined by the bits $b6$ and $b7$ of the modifier. As regards this instruction also, the central unit passes from the state B to the state C owing to the fact that the OR circuit 133 of the block 63A (FIG. 2) is activated. During the state C there takes place the reading of the character the address of which has been selected during the state B and simultaneous staticization in the register 50 (FIG. 2). Moreover, the output $62_9$ activates the AND circuit 195 (FIG. 8), which in turn generates the command COM08. This command is transmitted to the selected peripheral unit to prepare it to receive the character transmitted from the central unit 5. After these operations, the central unit 5 returns to the state A, as in the case of the instruction CDP.

3. Jump (SAL)

The jump instruction (SAL) is identified by the code 0010 and makes it possible to pass from one instruction to another, even if these instructions are not consecutive in the course of the programme being executed. The second character of the instruction SAL indicates the address in store of the next instruction which is to be carried out by the central unit 5.

The same operations as have been described for the preceding instructions are also carried out for the instruction SAL during the states A and B. The bits $b6$ and $b7$ of the modifier defined, on the other hand, the page to which the cell defined by the second character of the instruction belongs, as for the instructions TRL and TLC. In this store cell there is now contained the first character of the instruction which is to be executed thereafter.

The jump may be conditional or unconditional. For example, in a comparison effected by the instruction CDC, the result is expressed by the bit E forced into the register 96 (FIG. 2) of the central unit 5. The instruction SAL may then be conditioned either by the bit $E = 0$ or by the bit $E = 1$, in dependence upon the particular arrangement of the programme in process of execution.

The value of the bit E which conditions the execution of the jump instruction is identified by the bits $b4$ and $b5$ of the modifier of the instruction. More precisely, we have the following two cases: $b4 = b5 = 0$ for the instruction SAL conditioned by the value $E = 0$, that is effected if $E = 0$, $b4 = 0$ and $b5 = 1$ for the jump instruction conditioned by the value $E = 1$.

The second character, read during the state B and recorded in the register 50, now represents the store address to which the jump is to take place.

The block 63A comprises a logic circuit 105 (FIG. 5) adapted to emit in known manner an output signal CV which represents the following logical function:

$$Cv = b4 + b5 \cdot E + \overline{b5} \cdot \overline{E}$$

Therefore, CV is 1 if $b4 = b5 = E = 0$ or $b4 = 0$ and $b5 = E = 1$.

If the jump condition is not verified, that is if in the said two cases we have respectively $E = 1$ and $= 0$, the signal $CV = O$. An AND circuit 210 of the block 63A is then activated, since the two inputs 211 and 212 are at level 1, the output $62_6$ of the circuit 62 being activated. In consequence, through an OR circuit 213, the AND circuit 210 activates the input 214 of an AND circuit 215, the other input 216 of which is then activated by the inverter 169. In this case, the AND circuit 215 activates the input 217 of an AND circuit 218, the other input 219 of which is connected to the output 220 of the flip-flop FB. Consequently, the output 221 of the AND circuit 218 activates the flip-flop FA at the instant TS through a conductor 204. Therefore, when the jump condition is not verified, the central unit 5 returns from the state B to the state A, as a result of which the jump instruction is not executed.

If, on the other hand, the jump condition is verified, that is, referring to the two preceding cases, if the bit E has the values 0 and 1, respectively, the signal CV is at level 1. This signal therefore activates an OR circuit 137 and, through the AND circuit 133, also the input 138 of the AND circuit 139. The other input of this circuit is activated by the flip-flop FB, inasmuch as the central unit 5 is in the state B. consequently, the flip-flop FC is activated at the instant TS through the AND circuit DC.

The central unit then passes from the state B to the state C, wherein which the command COM10 is generated by the AND circuit 140 (FIG. 8) and commands the transfer of the contents of the register 50 (FIG. 2) to the addressing register 41. In this way, the store address to which the jump is to be made is staticized in the register 41. At the instant TI, an AND circuit 225 (FIG. 8) generates the command COM12 which, opening a gate circuit 221 (FIG. 2), transfers to the page register 71 the bits $b6$ and $b7$ indicating the page to which the address belongs.

Another AND circuit 226 moreover generates the command COM11, which is adapted to inhibit the counting network 44 (FIG. 2). In this way, when an AND circuit 227 generates the command COM04 at the instant TR, the same address which is staticized in the register 41 is forced into the register 32, that is the second character of the instruction which indicates the address from which the following instruction will be carried out.

The operations carried out in the state C having been completed, the central unit 5 passes to the state A, as seen in the case of the instructions CDP and CAP. During the state A which follows there will then be forced into the addressing registers 41 and 71 the address defined by the second character of the instruction and by the bits $b6$ and $b7$ of the modifier.

The unconditional jump is effected, for example, when any peripheral unit interrupts a programme which is in course of execution. For example, the interrupt may be caused when a peripheral unit has carried out the operation indicated by an instruction CAP sent to it by the central unit 5, or when a peripheral unit introduces a character into the central unit 5 by means of an instruction CDP. Owing to this interrupt, it is necessary for the central unit 5 to store in a store cell a jump instruction which will make it possible to return to the last address taken into consideration by the programme before the interrupt. This jump instruction is therefore not conditioned by the value of the bit E. It is indentified by the bits $b4$ and $b5$ of the modifier, which assume in this case the values 1 and 0, respectively. The output signal CV of the circuit 105 (FIG. 5) is then always at level 1, whatever the value of the bit E. In this case, the same operations as have been described for the conditional jump instruction with the condition verified are performed by the central unit 5.

Moreover, there is an unconditional jump instruction called the "re-entry" jump instruction the significance of which will be explained hereinafter. This instruction is identified by the bits $b4$ and $b5$ of the modifier, which both assume the value 1. The signal CV is also always at level 1 in this case, as a result of which the same operations as have been described for the conditional jump instruction with the condition verified are performed by the central unit 5.

4th Group of Instructions

To the 4th Group of Instructions there belong the instructions which are executed by the central unit 5 by means of the sequence of the states A and B. To this group there also belongs the conditional jump instruction when the jump condition is not verifed, as already described.

To this group there moreover belongs the command-to- peripheral instruction (COP), which is identified by the code 0101 and effects the transfer of the command, the code of which is defined by the second character, to the peripheral defined by the bits $b6$ and $b7$ of the modifier in the manner described with reference to the instructions CDP and CAP. It is to be noted that the bits $b4$ and $b5$ of the modifier are not used by this instruction and are therefore always at level 0.

During the state A there now is carried out the decoding of the instruction by the circuit 62, which activates the output $62_7$. During the state B there takes place the reading of the second character of the instruction which represents the command to be transmitted to the selected peripheral unit, and the transfer thereof to the register 50.

Two AND circuits 230 and 231 (FIG. 7) activated by the output $62_7$ now generate the commands COM08 and COM09, respectively. The command COM08 causes the transfer of the contents of the register 50 to the peripheral unit, while the command COM09 is transmitted directly to the peripheral unit to specify that the character coming from the central unit is a command and not a character.

After the execution of these operations, the circuit 213 (FIG. 5) activated at the instant TS, by the output $62_7$ of the circuit 62 causes the activation of the flip-flop FA in the same way as has been described for the jump instruction with the condition not verified, as a result of which the central unit therefore passes from the state B to the state A.

The above-mentioned instructions are synthetized in the following recapitulatory Tables, there being given in Table I the symbol for each instruction, the corresponding name, the code associated with the instruction, the corresponding ouput of the circuit 62, the bits $b4$ and $b5$ and their significance. In Table II there are given machine states in which each instruction is executed by the central unit 5, the group to which the instruction belongs, the value of the bits $b6$ and $b7$ and their significance.

TABLE I

| Symbol | Instruction | Code b0-b3 | Output | b4 and b5 | Significance |
|---|---|---|---|---|---|
| TRA | Transfer | 1000 | $62_1$ | | |
| SCA | Interchange | 1010 | $62_2$ | $b4 = 0$ | 1st operand is on page 0 |
| CFR | Comparison | 1001 | $62_3$ | | |
| AND | AND | 1111 | $62_4$ | $b4 = 1$ | 1st operand is on current page |
| ORE | Exclusive-OR | 1110 | $62_5$ | | |
| TRC | Transfer of constant | 1100 | $62_{10}$ | | |
| CDC | Comparison of constant | 1101 | $62_{11}$ | $b5 = 0$ | 1st operand unchanged |
| TRL | Free transfer | 1011 | $62_{12}$ | | |
| TLC | Free transfer of constant | 0100 | $62_{13}$ | $b5 = 1$ | 1st operand + 1 |
| CDP | Character from peripheral | 0110 | $62_8$ | | |
| CAP | Character to peripheral | 0111 | $62_9$ | | |
| COP | Command to peripheral | 0101 | $62_7$ | $b4 = b5 = 0$ | not used |
| | | | | $b4 = 0$ $b5 = 0$ | jump conditioned by $E = 0$ |
| | | | | $b4 = 0$ $b5 = 1$ | jump conditioned by $E = 1$ |
| SAL | JUMP | 0010 | $62_6$ | $b4 = 1$ $b5 = 1$ | unconditional jump |
| | | | | $b4 = 1$ $b5 = 0$ | re-entry jump |

TABLE II

| Symbol | Machine states | Group | b6 and b7 | Significance |
|---|---|---|---|---|
| TRA SCA | A, B, C, D, E | I | $b6=0$ | 2nd operand is on page 0 |
| CFR AND | | | $b6=1$ | 2nd operand is on current page |
| ORE | | | $b7=0$ | 2nd address unchanged |
| TRC COC | A, B, D, E | II | $b7=1$ | 2nd address + 1 |
| TRL | A, B, C, D, E | I | $b6=$ $b7=0$ $b6=0$ $b7=1$ $b6=1$ $b7=0$ | as for jump instruction |
| TLC | A, B, D, E | II | $b6=1$ $b7=1$ | |
| CDP | A, B, C | III | $b6=0$ $b7=1$ | tape store |
| | | | $b6=1$ $b7=0$ | typewriter |
| CAP COP | A, B | IV | $b6=1$ $b7=1$ | console |
| SAL | A, B, C | III | $b6=0$ $b7=0$ | 2nd operand is on page 0 |
| | | | $b6=0$ $b7=1$ | 2nd operand is on page 1 |
| | | | $b6=1$ $b7=0$ | 2nd operand is on page 2 |
| | | | $b6=1$ $b7=1$ | 2nd operand is on page 3 |

INTERRUPT

As has already been said, during the carrying out of one of the instructions hereinbefore described an interrupt command may reach the central unit 5 (FIG. 2)

from any one of the peripheral units connected to it. For the purpose of executing the current instruction, the execution of the programme in process of execution is then interrupted and another series of instructions is carried out. The machine states used for carrying out the interrupt are the states F and G, so that the interrupt is carried out in 4 µs.

Figure 5:
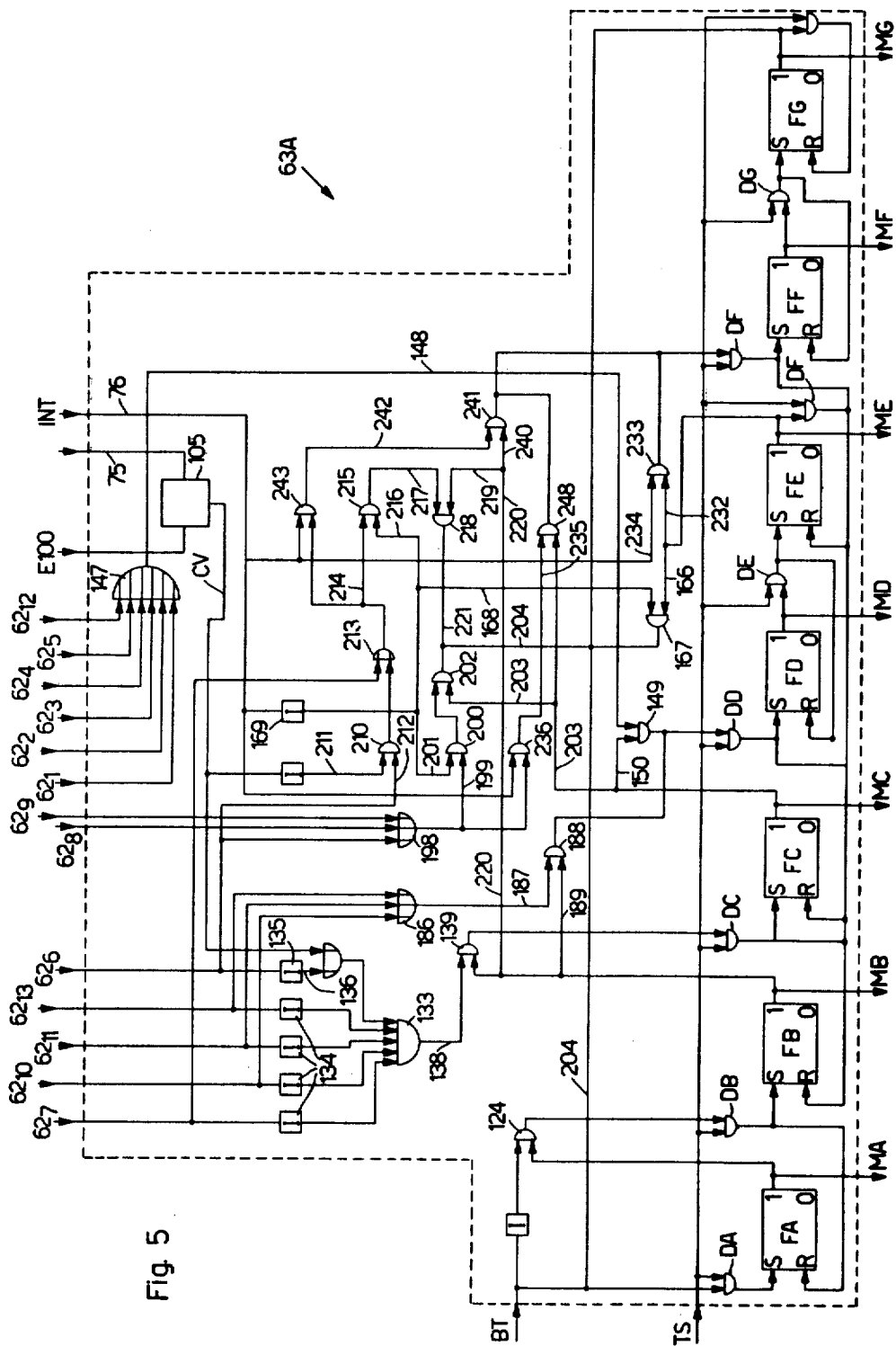
FIG. 5 shows a circuit for generating the working states of the central unit of FIG. 2.
Figure 6:
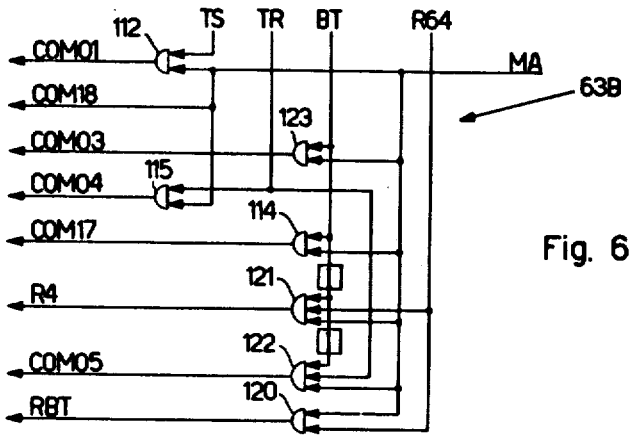
FIGS. 6–12 show the command circuits corresponding to an equal number of working states of the unit of FIG. 2.

When one of the peripheral units 6, 7 and 8 sends an interrupt signal INT, the logic circuit 31 (FIG. 2) activates the conductor 76, which introduces the signal INT into the block 63A (FIG. 5). If, at the instant when the signal INT is sent, an instruction of the 1st or 2nd group, which terminates with the state E, is in process of execution, the central unit 5 continues to execute the instruction until this state has been reached. Then, as has been said, the output ME of the flip-flop FE is activated and the input 232 of an AND circuit 233 is activated, the other output 234 of which circuit is activated by the signal INT. Through the AND circuit DF, the circuit 233 therefore activates the flip-flop FF at the instant TS, so that the central unit passes from the state E to the state F.

If, at the instant when the signal INT is sent, an instruction of the 3rd group, the execution of which terminates with the state C, is in process of execution, the interrupt begins to be carried out only when this state is reached. In fact, the output MC of the flip-flop FC is activated and, consequently, the input 203 of an AND circuit 248 is activated. The other input 235 of this circuit is activated only when an AND circuit 236 is activated. This occurs only when both the conductor 76 and the output of the OR circuit 198 are at level 1. This OR circuit is activated when an instruction terminating with the state C is in process of execution, inasmuch as its inputs are connected to the outputs $62_8$, $62_8$, $62_9$ corresponding to the instructions SAL, CAP and CDP. In this way, it can never happen that the execution of an instruction which does not terminate with the state C can be interrupted in the state C by the signal INT. When the AND circuit 248 is activated through the AND circuit DF, the central unit passes from the state C to the state F.

Similarly, when an instruction of the 4th group, which terminates with the state B, is in process of execution, the signal INT acts only when this state is reached. In fact, the output 220 of the flip-flop FB activates the input 240 of an AND circuit 241, the other input 242 of which is activated by another AND circuit 243. This last-mentioned circuit is activated only when both the signal INT and the output of the OR circuit 213 are at level 1. This occurs only when the instruction COP or the jump instruction with condition not verified is in process of execution. In this way, the possibility of the execution of an instruction which does not terminate with the state B being interrupted in the state B by the signal INT is prevented. When the AND circuit 241 is activated, the central unit therefore passes from the state B to the state F.

In each case, during the state F there is carried out in known manner the reading of the store cell selected during the preceding state, as if the central unit 5 had returned to the state A. The contents of this cell are transferred to the output register 50 in the manner seen hereinbefore.

An AND circuit 245 (FIG. 11) then generates at the instant TM (FIG. 4) the command COM25, which, acting on a gate circuit 246 (FIG. 2), transfers the contents of the register 32 to the register 57. These contents corresponds to the store address of the last instruction in process of execution. At the same time, the command COM25 puts all the flip-flops of the register 41 at level 1, acting on the respective set circuits. In this way, the cell 255 is selected, since the configuration 11111111 of the register 41 corresponds precisely to this cell.

The page to which this cell belongs is page 0, since the contents of the register 71 are not transmitted to the addressing circuit 45, the gate circuit 113 being closed. In fact, during the state F, the command COM18 which opens the gate circuit 113 is not generated, as a result of which the configuration 00 is present in the register 71.

The output MF of the flip-flop FF then generates directly the command COM23 (FIG. 11) which, acting on the store input circuit 47 (FIG. 2), forces into the output channel 48 the character 001011, followed by the bits contained in the register 71. To this end, the logic circuit 47 comprises a circuit 101 (FIG. 13) formed, for example, by six flip-flops which are conditioned by the command COM23 in such manner that the bit configuration 001011 is obtained at their outputs. To this configuration the circuit 101 moreover adds the two bits coming from the register 71 through the input channel 82. The configuration of eight bits is then transferred on the output channel 48. The output channel 48 constitutes the input of the store 42 (FIG. 2), so that the configuration of eight bits is written into the cell of the store 42 selected by the address contained in the register 41. This address, as has been seen, corresponds to the cell 255 of page 0. As has been said, the character 001011 defines the "re-entry jump" instruction, the bits in the register 71, on the other hand, define the current page. At the instant TR (FIG. 4), an AND circuit 247 (FIG. 11) generates the command COM04, which causes the forcing into the register 32 of the contents of the register 41 incremented by one unit, that is the character 00000000 corresponding to cell 0 of page 0.

It is therefore clear that during the state F there is written into the cell 255 of page 0 the re-entry jump instruction and there is forced into the addressing register 32 the address 00000000.

At the instant TS (FIG. 4) following these operations, the central unit passes to the state G, since the AND circuit DG (FIG. 5) is activated. During the state G, another AND circuit 250 (FIG. 12) generates at the instant TS the command COM01 which commands the transfer to the register 41 of the contents of the register 32, that is the address corresponding to cell 0 of page 0.

At the instant TN (FIG. 4) following the instand TS, an AND circuit 251 (FIG. 12) moreover generates a signal RO which resets the flip-flops of the register 71 (FIG. 2) in known manner, selecting in this way the page 0. The output MG of the flip-flop FG moreover generates directly the command COM14 (FIG. 12) which, acting on the circuit 47 in the manner already seen, transfers the address in store of the last instruction in process of execution, this address being contained in the register 57 (FIG. 2), to cell 0 of page 0 of the store 42.

By means of the operations which have just been described there has therefore been compiled in the cell 255 of page 0 an instruction for a re-entry jump to the page to which belongs the address of the instruction in process of execution at the moment when the interrupt occurred. This address has moreover been stored in cell 0 of page 0.

After these operations, another AND cirucit 252 (FIG. 12) generates at the instant TR following the instant TM (FIG. 4) the command COM26. This command, acting on a gate circuit 253 (FIG. 2), transfers the contents of the logic circuit 31 to the register 32, that is forces into the register 32 the address corresponding to the peripheral 6, 7 or 8 which has caused the interrupt. Through the channel 33 the contents of the register 32 are at the same time forced into the reset logic circuit 34. Moreover, the command COM26, acting on a gate circuit 255, transfers the possible comparison bit E from the register 96 to the register 97, where it is stored for the entire duration of the interrupt. In fact, the register 96 would be used during the interrupt itself if, for example, the interrupt contains the instruction CFR or CDC.

If the signal INT is generated in the course of an instruction by more than one of the peripherals 6, 7, 8 at the instant TI following the instant TR (FIG. 4), and AND circuit 256 (FIG. 12) generates the command COM24 and opens a gate circuit 257 (FIG. 2). This therefore causes the resetting of the flip-flop of the register 30 corresponding to the peripheral unit of higher order of priority which has caused the interrupt. In this way, after the execution of the programme corresponding to the interrupt introduced by this peripheral, there can once more be introduced another possible interrupt corresponding to a peripheral unit of less high order of priority.

After these operations, the central unit 5 returns to the state A at the instant TS following the instant TI, inasmuch as at this instant the AND circuit DA (FIG. 5) activated by the output MG of the flip-flop FG is enabled. There is begun, therefore, the execution of the first instruction of the series of instructions relating to the interrupt, the address of which has been staticized in the register 32. Consequently, during the state A in which the central unit 5 is at the end of the interrupt, there is generated inter alia the command COM01, which permits the transfer of the address corresponding to the first instruction which is to be executed, from the register 32 to the register 41. This instruction, together with the others of the series relating to the interrupt, is then carried out under the same conditions which have been seen hereinbefore in accordance with the type of the instruction itself.

For the purpose of resuming the execution of the interrupted instructions by the central unit 5, the last instruction of the series relating to the interrupt is always an instruction for an unconditional jump to the address of cell 255 of page 0. In this cell, as has been said, there has been stored the first character of an instruction for a re-entry jump to the address defined by the second character of the instruction stored in cell 0 of page 0 following cell 255.

Figure 7:
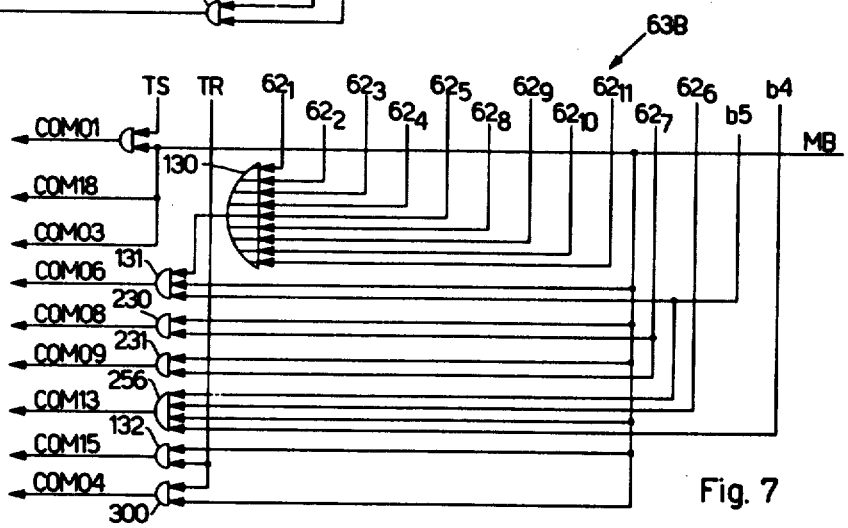
Figure 8:
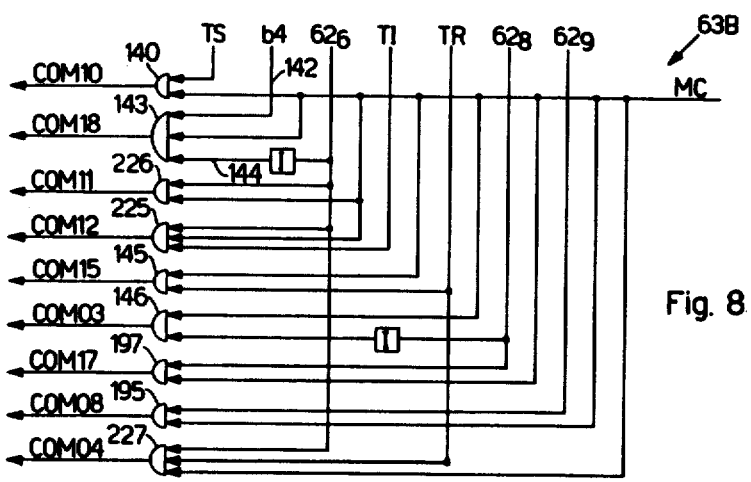

The re-entry jump instruction is then carried out by the central unit 5 in the manner seen hereinbefore and in fact causes the central unit 5 to return to the same conditions in which it was at the time of the interrupt. More precisely, at the end of the re-entry jump instruction there is recorded in the register 41 the address defined by the second character of the instruction itself, that is the same address at which the central unit 5 was at the instant of the interrupt. Moreover, during the state B of the re-entry jump instruction, since the bits $b4$ and $b5$ of the modifier both assume the value 1, the command COM13 is generated by the AND circuit 258 (FIG. 7). This command, acting on a gate circuit 259 (FIG. 2), transfers the bit E from the register 97 to the register 96. In the register 96 there is therefore staticized the bit E which was therein at the moment of the interrupt. The re-entry jump instruction having been completed, return to the state A is effected, which gives rise to the continuation of the interrupted programme.

TYPEWRITER CONTROL UNIT

Figure 14:
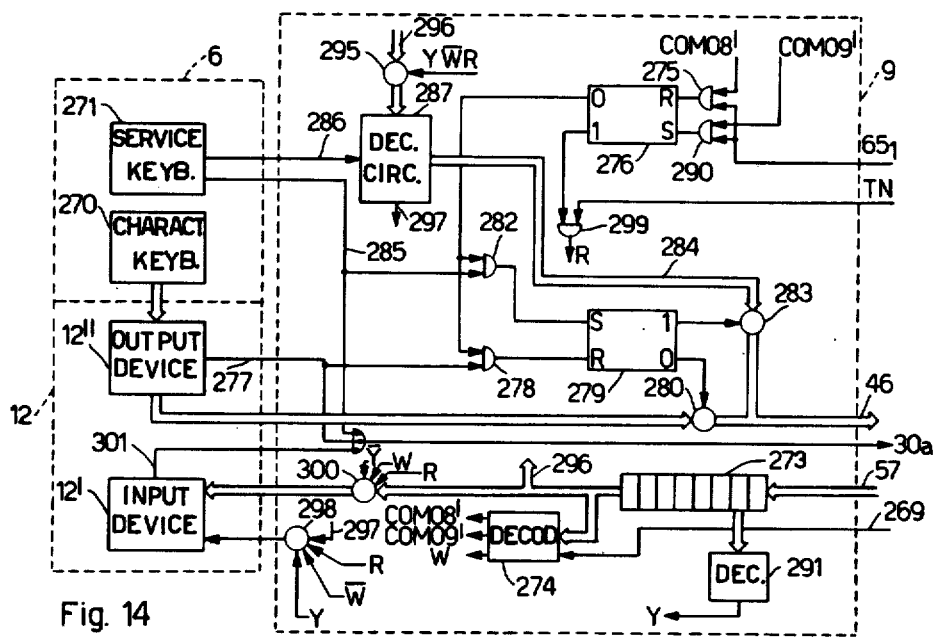
FIG. 14 is a block diagram of a control unit for the input and output devices of the system of FIG. 1.

The controller 9 (FIGS. 1 and 14) of the typewriter 6 is adapted to control the exchange of data and commands between the typewriter 6 and the central unit 5. The input and output device 12 of typewriter 6 comprises an input device 12' for receiving from the controller 9 the codes of the printing characters and the codes of the function characters. These codes are formed by eight bits, six of which are used to define the character, one of which is a shift bit for defining upper case and lower case, while one bit can be used, for example, as a parity bit. The six bits of the character act in known manner on a series of six electromagnets for selecting the character or the function to be effected.

The device 12 moreover comprises an output device 12" adapted to transmit to the control unit 9 the codes of the 7 characters and of the functions entered in known manner on the keyboard 270 and the keyboard 271, respectively. The transmission of the codes takes place through the switching of six switches of any known type which are not known in FIG. 14.

The function conductor $65_1$ connecting the controller 9 to the central unit 5 is activated by the decoding network 65 only when this network selects, in the manner seen hereinbefore, the typewriter 6. The data are moreover exchanged with the central unit 5 through the output channel 46 connected to the store input circuit 47 of the central unit 5 and through the input channel 51 connected to the output register 50 of the central unit 5.

The input channel 51 transfers the data present in the register 50 to an eight-bit register 273 of the controller 9. The operation of the controller 9 is controlled by the central unit 5 through the external instructions COP and CAP for the reception of a command or a writing character from the central unit 5 and through the instruction CDP for the transmission of a character to the central unit 5. More precisely, the controller 9 can be put into a transmitting or receiving state by the central unit 5 by means of the instruction COP. In fact, as has been seen, the instruction COP generates two commands COM08 and COM09 which are sent through a conductor 269 to a decoding circuit 274 of the controller 9. This circuit 274 effects in known manner the decoding of the command received. If this command is the command COM08, the circuit 274 activates the output COM08', if it is the command COM09 it activates the output COM09'. These outputs put the controller 9 in the transmitting condition and the receiving condition, respectively.

If the central unit 5 proposes to receive a character from the control unit 9 by means of the instruction CDP, it sends to the control unit 9 an instruction COP which generates the command COM08. This command, together with the signal present on the conductor $65_2$ which selects the controller 9, activates an AND circuit 275 which acts in such manner on the reset circuit of a flip-flop 276 that it then indicates that the controller 9 is in the transmitting condition.

If the operator actuates a character key on the keyboard 270, the output device 12" activates in known manner, through a conductor 277, an AND circuit 278 enabled in turn by the flip-flop 276. The output signal of the AND circuit 278, acting on the reset circuit of a flip-flop 279, opens a gate circuit 280, so that the character entered on the keyboard 270 is transferred to the output channel 46. The conductor 277 is connected to the input 30a of the register 30 (FIG. 2), and causes in the register 30, in the manner described before, an interrupt in the operation of the central unit 5. The central unit 5 then jumps to the store address identified by the conductor 30a, corresponding to the typewriter 6 and decoded by the circuit 31. In this address there is contained the first character of an instruction CDP, whereby the central unit 5 is arranged to receive the character present on the channel 46.

If the operator actuates a function key of the keyboard 271 (FIG. 14), the keyboard emits a signal on the conductor 285, which causes in the same way as the conductor 277 the transmission of an interrupt signal to the central unit 5. This is therefore prepared to receive the function character which is present on the channel 46. The conductor 285 moreover activates an AND circuit 282 which, acting in turn on the set circuit of the flip-flop 279, opens the gate circuit 283 which places a channel 284 in communication with the output channel 46. The keyboard 271 moreover emits on a conductor 286 a signal corresponding to the function key actuated. This signal acts on a decoding circuit 287, which supplies the code corresponding to the key actuated. This code is formed of eight bits, of which the bits $b4$, $b5$ and $b6$ are always zero to distinguish a function character from a printable character. This code is sent over the channel 284 and through the gate circuit 283 to the output channel 46.

If it is desired to transmit a command character to the control unit 9, the central unit 5 sends thereto on the channel 57 an instruction CAP which generates the comman COM09. This command is decoded by the decoding circuit 274, which then activates the output COM09'. Through an AND circuit 290 this output acts on the set circuit of the flip-flop 276, which puts the control unit 9 into the receiving condition. This condition is identified by an output signal R of an AND circuit 291 enabled at the instant TN by the flip-flop 276. The enabling of the AND circuit 291 at the instant TN is effected since at this instant during the instruction CAP the central unit 5, as has been seen hereinbefore, has already read in the store 42 the character to be sent to the peripheral and has staticized it in the register 50 (FIG. 2) connected to the input channel 57 of the control unit 9.

In the execution of the instruction CAP, the character present on the channel 57 is then transferred by the central unit 5 to the register 273. If this character is a service character, identified as has been said by the zero bits $b4$, $b5$ and $b6$, a decoding circuit 299 for these bits which is connected to the register 273 emits a signal Y, while if this character is a printing character the decoding circuit 274 emits instead a signal W in a manner known per se.

In the first case, a gate circuit 295 is enabled, whereby the character present in the register 273 is sent through a channel 296 to the decoding circuit 287. This circuit supplies at an output 297 a signal which is sent through a gate circuit 298 enabled by the signal Y to the input circuit 12' of the typewriter 6. It is to be noted that the gate circuits 295 and 298 are opened only when the receiving condition obtains (R = 1) and the character is a function character (Y = 1 and W = 0).

If the character present in the register 273 is printable, the signal W enables a gate circuit 300, so that this character is transferred to the input circuit 12' of the typewriter 6. It is to be noted that the gate circuit 300 is opened only when the control unit 9 is in the receiving condition (R = 1) and the character is printable (W = 1 and Y = 0).

What has been said for a single character also applies as regards succeeding characters both being received and being transmitted.

Every time the input circuit 12' has received a character, it emits a signal on a conductor 301, which introduces an interrupt into the central unit 5 through the input 30a, so that the central unit 5 is prepared for sending another character.

On the basis of the contents of the store cell which are identified by the interrupt, the central unit 5 can now send a command or a character through a following instruction. If, for example, the control unit 9 is in the transmitting condition, the central unit 5 can send either an instruction CDP, whereby the transmission continues, or an instruction COP for reception, whereby the control unit 9 is put into the receiving condition. Of course, the character is sent from the central unit 5 by means of a following instruction CAP. It is to be noted that the connecting of the input device 12" and the output device 12" to the register 6 have not been described in details, because it is known in the field of the machines with I/O devices to derive from the character and command signals supplied to the I/O devices, the functions associated to them. For example, if a character is to be printed, the input device 12' is able to selectively position the code bars of the typewriter 6 in order to carry out the printing of the character. In the same manner the other functions can be carried out.

COMMAND KEYBOARD CONTROL UNIT

The command keyboard 8 is used for sending a number of commands to the central unit 5 through the corresponding control unit 11. More precisely, this keyboard comprises a general switch, not shown in the drawings, for the electrical supply of all the units of the printing system. It moreover comprises a start button known per se which enables the operation of the units to be started in such manner as to cause the loading of the group of initial instructions into the store 42 of the central unit 5 in the manner hereinbefore described. These instructions moreover allow the loading into the store 42 of a particular group of instructions called the "loading" instructions which are adapted to load into the store 42 any other operative group of instructions, in the manner which will be explained hereinafter. The keyboard 8 moreover comprises an indicator lamp which is lit by means of a command coming from the central unit 5. To this end, since the exchange of commands between the central unit 5 and the keyboard 8 takes place through the medium of an instruction COP, this acts on the keyboard 8 in the manner described for the control unit 9 of the typewriter 6. More precisely, by means of the decoding circuit 65 (FIG. 2) the instruction COP selects the keyboard 8, which accepts only a particular command expressed by the second character of the instruction COP and formed by eight bits all at level one. This command acts in known manner on the keyboard 8 to produce the lighting of the indicator lamp.

The keyboard 8 in turn is adapted to send only one interrupt signal to the central unit 5 by means of the actuation of the interrupt key connected to the input 30a of the circuit 30 (FIG. 2). The interrupt key then conditions the central unit 5 in the manner seen hereinbefore to carry out a series of instructions associated with the interrupt originating from the keyboard.

MAGNETIC TAPE STORE CONTROL UNIT

The control unit 10 of the tape store 7 controls the reading and writing of addresses, programmes and data in the store 7.

Figure 15:
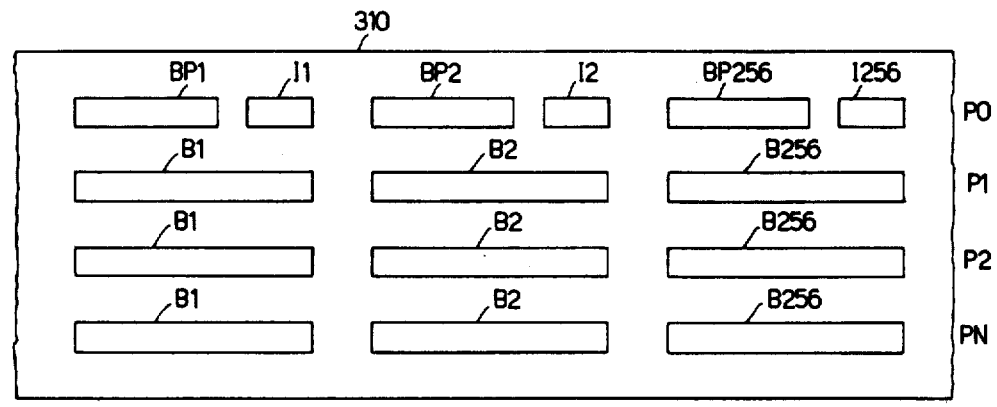
FIG. 15 shows a length of magnetic tape of the system of FIG. 1.

The store 7 is constituted by a magnetic tape 310 (FIG. 15) closed on itself and contained in a cartridge. The cartridge is interchangeable, so that the system may comprise any number of cartridges whatsoever. The tape 310 comprises a series of parallel tracks P1, P2 . . . PN on which the data are recorded serially in blocks B1 . . . B256, each of which corresponds to a line of print. Each block is separated from an adjacent block by a zone, called the erasure zone, in which no recording takes place.

Figure 16:
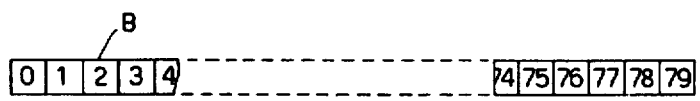
FIG. 16 shows a detail of the tape of FIG. 15.

Each store block has a fixed length and comprises 80 characters each of eight bits. The characters of each block are numbered in progression (FIG. 16) from fixed 0 to 79. The characters from 6 to 78 are used for recording the data relating to a corresponding line of print, while the characters from 0 to 5 are used as function characters. More precisely, the first function character contains a constant which is used by the central unit 5 to select from among the tracks P1 . . . PN the one which contains the block in which the following characters are to be recorded. The address of this block in the limits of the track selected is defined by the second character, while the cartridge itself is identified by the third character. The fourth character indicates the number of characters that each line can contain; this number can be selected by the operator to extend or reduce, in the manner which will be seen hereinafter, the length of a line of print. The fifth character indicates the number of characters actually contained in the line of print. The sixth character indicates the code of the function to be carried out on the line, for example centring, underlining, etc. The 79th character, finally, is a longitudinal parity character relating to the remaining 79 characters.

In addition to the data tracks P1 . . . PN, the tape 310 also contains a track P0 which contains the addressed I1 . . . I256 of the data blocks. Each address block I1 . . . I256 is formed of 25 characters, only one of which is used to contain the address of the data block or of the programme block. Since this character contains eight bits, it is sufficient to define one data block from the remaining 255 in the selected track. The remaining 24 characters of each address block are used a function characters. The first three of these characters in particular may represent two constants used for identifying an address block and a programme block, respectively. In fact, on the track P0, between one address and the next, there is recorded a programme block BP1 . . . BP256 formed of 70 characters in which there are recorded the characters of the operative instructions of the printing system.

Each address block I1 . . . I256 is used to select the blocks of data which geometrically follow it in the direction of advance of the tape. For instance, the data blocks B2 recorded on the tracks P1 . . . PN are selected by the address block I2. To select a data block univocally, the track to which it belongs must therefore be selected first and then, within the track, the block itself must be selected from the remaining 255 blocks.

The control unit 10 is connected through an input channel 51 (FIG. 17) to the register 50 (FIG. 2) of the central unit 5 and through an output channel 46 to the input circuit 47 of the store 42. More particularly, the two channels 51 and 46 are connected through two gate circuits 316 and 317 to a register 318 of the control unit 10. The register 318 can exchange the bits staticized therein with a shift register 319 through two gate circuits 320 and 321. The register 318 moreover transmits the bits to a decoding circuit 325 adapted to generate a plurality of commands in correspondence with the bits received from the register 318. The decoding circuit 325 acts on a timer 326, which generates time signals controlling the operation of the control unit 10.

The decoding circuit 325 can moreover be actuated by means of a signal present on the conductor 327, which is at level 1 when the start button of the keyboard 8 is actuated. The decoding circuit 325 is connected through a gate circuit 328 to a four-place register 329 which is adapted to emit on a conductor 330 a signal which, acting on a reading head of the tape store 7, selects the track corresponding to the bits contained in the register.

The register 319 is moreover connected to another decoding circuit 335, which emits a signal at its output 336 when an address is present in the register 319. The signal present at the output 336 acts in turn on a circuit 337 which, when it is activated, sends an interrupt signal on the input 30b of the circuit 30 (FIG. 2) of the central unit 5.

The register 319 is connected by means of a gate circuit 338 to a signal shaping device 339 which is adapted to supply at an output 340 signals corresponding to the character contained from time to time in the register 319. These signals are used by a writing device of the store 7, this device not being shown in the drawing. Finally, the register 319 is connected to a reading device 342 of known type adapted to read serially the bits recorded on the tape 310 and transmit them to the said register through the conductor 343.

The exchange of the data between the central unit 5 and the control unit 10 takes place by means of the instructions COP, CDP, CAP generated by the central unit 5. The control unit 10 is initially in a rest or inoperative state. This state is expressed symbolically in FIG. 18, which shows diagrammatically the succession of the operations performed by the central unit 5 and by the control unit 10. The operations performed by the control unit 10 are indicated in rectangular blocks, while the logical decisions or alternatives are represented by rhombi. The operations performed by the central unit 5, on the other hand, are indicated by arrows, which symbolically enable gate circuits so as to permit the passage of the control unit 10 from one operative state to another.

Figure 17:
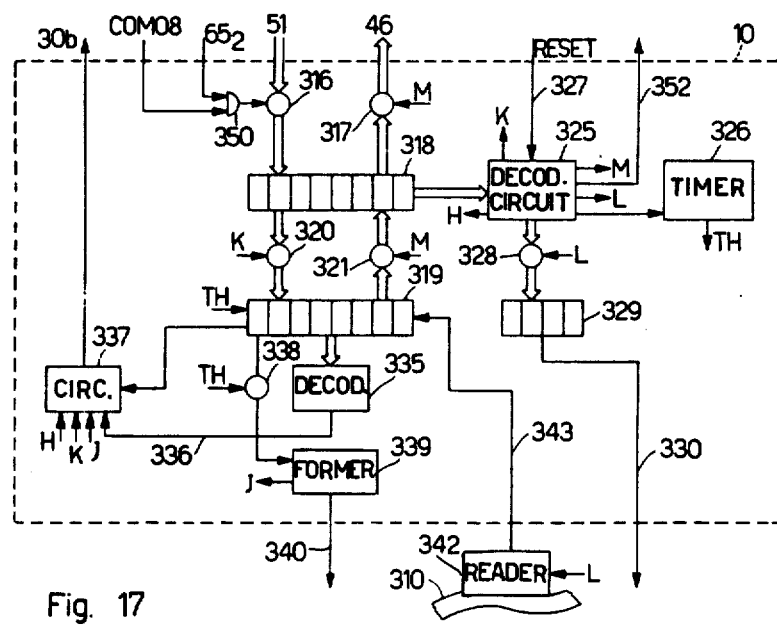
FIG. 17 is a block diagram of the control unit of the device for recording and reading the magnetic tape of the system of FIG. 1.

To write or read information on the tape 310 of the store 7, the central unit 5 sends to the control unit 10 in the manner soon hereinbefore a so-called "selection" instruction COP. Since, if $b6=0$ and $b7=1$ in the first character of the instruction, the peripheral selected is the store 7, these bits, acting on the decoding circuit 65 (FIG. 2) of the central unit 5, cause the activation of the conductor $65_2$ (FIGS. 2 and 17), which activates an input of an AND circuit 350 of the control unit 10 (FIG. 17). The other input of the AND circuit 350 is activated by the command COM08, which is generated by the instruction COP during the state B. In this way, the gate circuit 316 is activated, so that the second character of the instruction present on the channel 51 can be introduced into the register 318. The second character is introduced at the same time into the decoding circuit 325 which, if it recognizes a so-called selection character, emits a signal on a conductor 352, causing the starting of the tape 310. The selection character is identified by the fact that the bits $b5$, $b6$, $b7$ have the value 001.

At the same time, the decoding circuit 325 emits in known manner a signal L, which enables the gate circuit 328 and transfers to the register 329 the first four bits of the character present in the decoding circuit. These bits are used for the selection of a track from among the tracks P1 . . . PN of the tape 310. The register 329 now sends on the conductor 330 a signal which is used in known manner by the store 7 to select the track.

Figure 18:
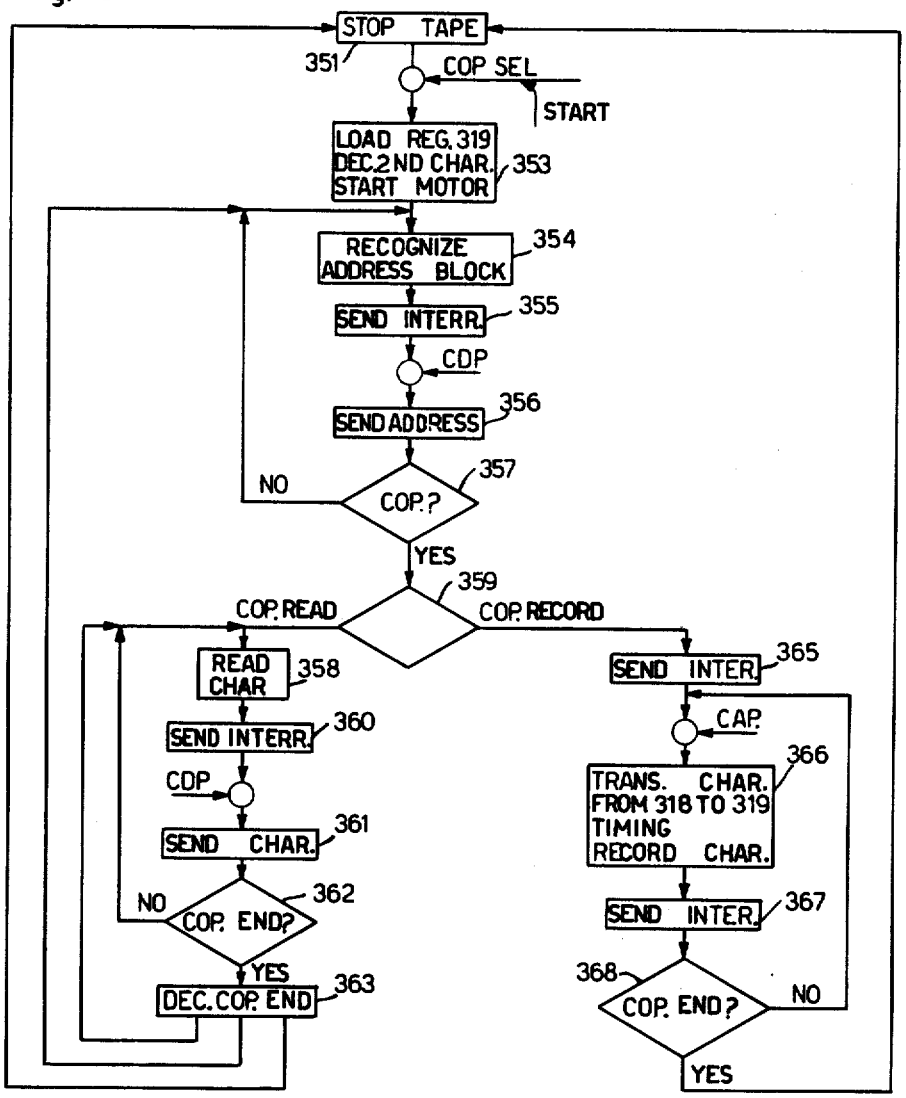
FIG. 18 is a flowchart of the operation of the control unit of FIG. 17.

Moreover, the signal L prearranges the reading circuit 342 in known manner for reading the addresses. The circuit 342 sends serially to the register 319 the bits of the first character of the first address block that is read. These operations are symbolically expressed by the block 353 (FIG. 18).

It is equally possible to put the control unit 10 into the address reading state by actuating the start button of the keyboard 8. This button or key acts on the circuit 325 in such manner as to simulate a selection instruction COP. The circuit 325 then effects the same operations as have been described hereinbefore, whereby the control unit 10 likewise assumes the reading state represented by the block 353. For selecting the address of the block of the tape 310 in which the data are to be read or written the central unit 5 stores in the register 57 of the central unit 5 the address of the block. The way of determining and recording this address in the register 57 will be described in pages 73 and following.

As has been said, the address blocks 11 . . . 1256 of the tape 310 are identified when the first three characters represent the corresponding constant. Therefore, if the decoding circuit 335 (FIG. 17) recognizes that the block read is an address block, it actuates the circuit 337, which causes the sending of an interrupt command on the input 30b of the circuit 30 of the central unit 5 (FIG. 2). These operations are expressed symbolically by the blocks 354 and 355 (FIG. 18). The central unit 5 now carries out the interrupt.

The interrupt now causes the central unit 5 to execute a jump instruction to the cell of the store 42 (FIG. 2) corresponding to the store 7 in which the instruction CDP is recorded. The central unit 5 then sends the instruction CDP on the channel 51 to the register 318 (FIG. 17) of the control unit 10. This instruction is decoded by the circuit 325, which emits a signal H which puts the control unit 10 into the address sending state (block 356 of FIG. 18). The signal M moreover opens the gate circuits 321 and 317 so that the address read is transferred from the register 319 to the register 318 and from here through the channel 46 and the store input circuit 47 (FIG. 2) to a predetermined cell of the core store 42.

The central unit 5 then executes an instruction CDC, by means of which it compares the address received from the control unit 10 with the constant staticized in the register 57 (FIG. 2), which represents the address of the block. If the comparison between the two characters is negative (bit $E = 0$), the central unit 5 does not send any command to the control unit 10 (logical decision 357 of FIG. 18) and the latter therefore sends the next address in the manner seen hereinbefore, the operations described in blocks 354, 355, 356 or FIG. 18 being repeated. When the comparison between the two characters becomes positive (bit $E = 1$), the central unit 5 sends the instruction COP, which may be for reading or writing. Of course, the logical decision 357 is achieved by means of a conditional jump instruction. In fact, if the condition is not verified (bit $E = 0$), the central unit 5 returns, as has been seen, to the state A; if, on the other hand, it is verified (bit $E = 1$), the central unit 5 executes the jump instruction to a store address in which the first character of an instruction COP is recorded.

The type of command (writing or reading) is defined by the second character of the instruction COP that is decoded by the circuit 325. If this character indicates a reading command, the circuit 325 emits the signal L which, actuating the reading device 342, produces the serial reading of the bits of the first character of the selected block, which are transferred to the register 319 (block 358 of FIG. 18). When this register is filled, it actuates the circuit 337, which sends an interrupt signal to the central unit 5 (block 360 of FIG. 18). Through an instruction CDP, the central unit causes the transfer of the character read from the control unit 10 to the store 42 (block 361 of FIG. 18). In this way, all the characters of the selected block are transferred to the store 42.

When the central unit detects that the character read is the last of the selected block, it sends to the control unit 10 a so-called end instruction COP (logical decision 362 of FIG. 18). The decoding of the last character of the block is effected by the central unit 5 by means of an instruction CDC which causes the constant representing the serial number of the character read from time to time to be compared with the constant representing the maximum number of characters in the block. When the comparison is positive (bit $E = 1$), the central unit 5 emits an end instruction COP, by a procedure entirely identical to that used for the emission of an instruction COP for reading.

The decoding circuit 325 (FIG. 17) of the controller 10 decodes the second character of the end instruction COP and emits command signals, not shown in the drawing, which cause in known manner the passage of the controller 10 to a state corresponding to the end instruction COP (block 363 of FIG. 18).

If this character indicates the end of the reading of the block with stopping of the tape, the controller 10 returns to the initial state (FIG. 18). If, although indicating the end of the reading of the block, the reading of the next block is commenced, the controller 10 returns to the state expressed by the block 358. Finally, if the character indicates the end of the reading of the block and at the same time the reading of a block not following the one read is commenced, the controller 10 returns to address reading, that is to the state expressed by the block 354.

In the case where the central unit 5 proposes to record or write data in the selected block, it sends to the control unit 10 an instruction COP for writing (logical decision 359). This instruction is decoded by the circuit 325 (FIG. 17), which consequently activates the circuit 337 by means of a signal H. This last-mentioned circuit sends an interrupt (block 365 of FIG. 18) to the central unit 5, which sends an instruction CAP to the control unit 10 in the manner seen hereinbefore. When this instruction is recognized by the circuit 325 (FIG. 17), it sends a signal K which, opening the gate circuit 320, transfers the character to be recorded or written from the register 318 to the register 319. At the same time, the circuit 325 activates the timer 326 which, through a time signal TH, causes the bits in the shift register 319 to shift to introduce them serially into the writing device 339. These operations are indicated by the block 366 of FIG. 18.

When the whole character has been recorded, the writing device emits in known manner a signal J, which causes the sending of an interrupt by the circuit 337 (block 367). Consequently, the central unit 5 can send in the manner seen hereinbefore an end instruction COP or an instruction CAP (logical decision 368). In the first case, the control unit 10 returns to the inoperative state, in the second case it returns to the state identified by the block 366 of FIG. 18.

INTRODUCTION OF THE INSTRUCTIONS INTO THE CENTRAL UNIT

As has been said, the operation of the automatic printing system is controlled by groups of instructions each relating to a particular processing operation to be carried out on a text. These groups of instructions are recorded on the tape 310 (FIG. 15) in the programme blocks BP1 . . . BP256 located on the track P0. More precisely, the processing operations which can be carried out on a text may be either processing operations on the format of the text or processing operations on the content.

The processing operations on the format enable the characters in a line to be increased or reduced selectively, the so-called justification of the lines to be obtained, that is the alignment of the right-hand margin of the lines, one or more words in a line or one or more lines to be underlined, or one or more words to be centred with respect to the length of the line of print. The processing operations on the content, on the other hand, enable one or more lines to be arased, new lines or paragraphs to be added, or corrections of errors to be made.

Each of the processing operations described is defined by a corresponding group of instructions which, to become operative, must be transferred from the tape store 7 to the core store 42 of the central unit 5 (FIG. 2), which executes them in the sequence in which they are recorded in the store 42.

To transfer a group of instructions from the tape store 7 to the core store 42, the operator actuates the start push button of the keyboard 8. The decoding circuit 325 (FIG. 17) is then actuated in the manner hereinbefore described and puts the control unit 10 of the tape store 7 into the reading state 358 (FIG. 18). The central unit 5 then leaves the inoperative state expressed by the block 380 of FIG. 19.

Figure 19:
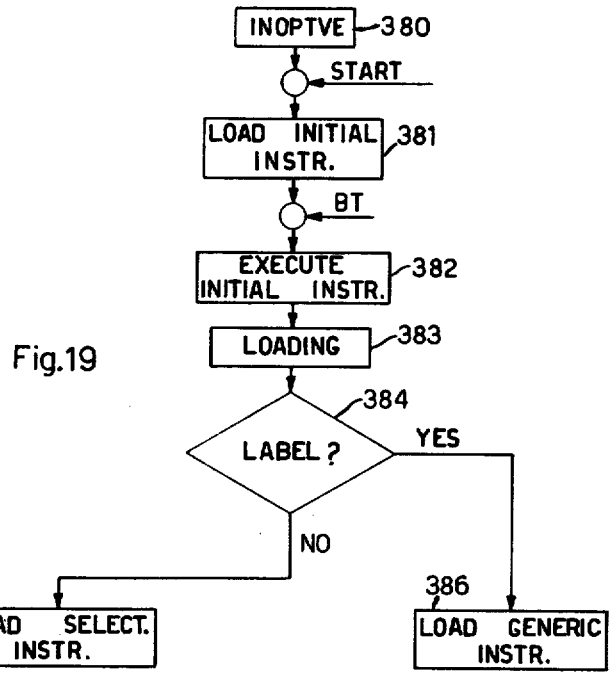
FIGS. 19 and 20 are flowcharts of the loading of instructions in the system of FIG. 1.

The addresses recorded on the track P0 of the store 7 (FIG. 1) are now read and sent through the control unit 10 to the central unit 5. Since each address is preceded by an interrupt, this causes the central unit 5 to execute a jump instruction to a cell of the store 42 (FIG. 2) the address of which is defined by the interrupt itself in the manner seen hereinbefore. In this address there is recorded an instruction CDC by means of which the central unit 5 compares in the circuit 98 (FIG. 13) the address coming from the control unit 10 with the one staticized in the register 57. Since the latter is formed by eight bits all of which are zero, when the control unit 10 sends the address of the first programme block recorded on the tape 310 and identified by eight zero bits to the central unit 5, the transfer of this block from the tape store 7 to the core store 42 takes place. The loading of the initial instructions is expressed symbolically by the block 381 (FIG. 19). The addresses of the cells of the store 42 in which the characters of this block are recorded are supplied by the addressing circuit 45 of the store 42. As has already been seen, the group of instructions recorded in the first block are the initial instructions, which enable the central unit 5 to record succeeding instructions in the manner hereinafter described.

It has been seen that the central unit 5 carries out the recording of the initial instructions during the state A and the staying in this state is defined by the output signal BT of the flip-flop 35 (FIG. 2). When this signal is zero, that is when the group of initial instructions is wholly writtin the the store 42, the control unit 5 turns to the execution of the instructions contained in the group of initial instructions (block 382 of FIG. 19).

At this instant, the central unit 5 (FIG. 2) is still in the state A and in the address decoding network 45 there is recorded the address of the cell following the cell occupied by the last instruction of the group of initial instructions. When the central unit 5 passes into the state B to execute the first instruction of the group of initial instructions, the contents of the cell of the last instruction are transferred to the output register 50 and then, because of the generation of the command COM15 (FIG. 7), to the register 57 (FIG. 2).

The first instruction of the group of initial instructions is an instruction COP by means of which the central unit 5 puts the control unit 10 into the reading state 358 ((FIG. 18). The central unit 5 then compares the addresses supplied by the control unit 10 with the contents of the register 57 (FIG. 2) previously staticized. These contents are the address of a block recorded on the tape 310 contained in the loading instructions, which relates to another group of instructions associated with a particular processing operation carried out on the text. When this address is recognized by the central unit 5, the transfer of the block identified thereby from the tape store 7 to the core store 42 takes place. The operations performed by the central unit 5 for recording the block of the loading instructions are expressed symbolically by the block 382 (FIG. 19) and are the same as are expressed symbolically by the blocks 354, 355 and 356 (FIG. 18) described hereinbefore.

The block of instructions written in this way in the store 42 contains, as has been said, the address of a second block, which is also a block of loading instructions. The writing of this second block in the store 42 then takes place, as described hereinbefore. The central unit 5 is now in the operative state expressed symbolically by the block 383 (FIG. 19). In this state, the group of initial instructions and the two loading programme blocks are in the store 42, being written therein.

The loading blocks permit the writing in the store 42, inter alia, of a particular group of instructions called the "selection" instructions, which enables a particular group of instructions posted on the keyboard 270 (FIG. 14) of the typewriter 6 to be selected from among all the groups of instructions recorded on the track PO of the tape.

After the loading condition expressed by the block 383 (FIG. 19), the central unit 5 is faced with a logical decision expressed symbolically by the block 384. This logical decision or alternative expresses the possibility that the central unit 5 has of loading a group of generic instructions or the group of selection instructions. This logical decision is represented by a conditional jump instruction recorded at the beginning in the first loadng block.

By means of the conditional jump instruction, the central unit 5 can now execute a jump to a cell of the store 42 which contains an instruction COP such as to select, in the manner seen hereinbefore, the address of the progamme block recorded in the track PO (FIG. 15) corresponding to the group of instructions entered by the operator on the keyboard 270, whereby the central unit 5 is disposed in the condition of loading the generic instructions which is indicated by the block 386 (FIG. 19). By means of this jump, the central unit 5 can execute a jump to a cell of the store 42 which contains an instruction COP associated with the group of selection instructions (block 385 of FIG. 19). The central unit 5 will carry out the jump instruction to one cell or the other in dependence upon the fact of the operator having entered or not a particular processing operation on the keyboard 270.

Figure 20:
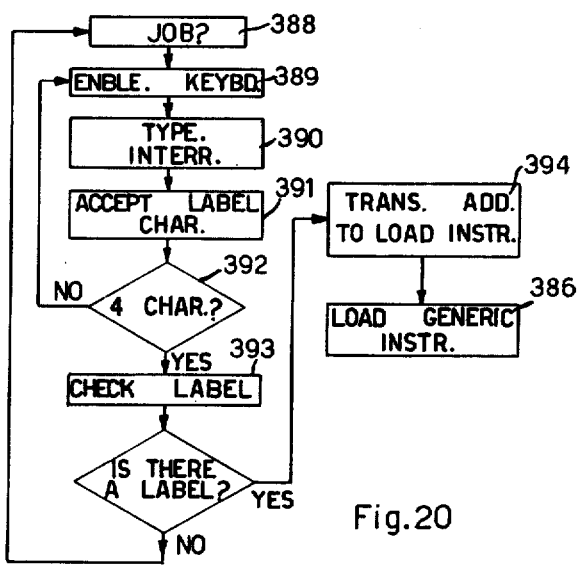

If the operator has not entered any processing operation, the central unit 5 executes a jump instruction to the store cell containing the instruction COP for selection. The address of this cell is represented by the second character of the jump instruction. The first instruction of this group is an instruction COP direct to the control unit 9 of the typewriter 6. By means of this instruction, the central unit 5 puts the control unit 9 into the receiving state and then by means of succeeding instruction CAP sends to the typewriter the label JOB?These operations are represented symbolically by the block 388 (FIG. 20). The control unit 9 then sends to the input device 12' (FIG. 14) the command for printing this label, which therefore appears on the printing sheet. After this, by means of a following instruction COP, the central unit 5 puts the control unit 9 into the transmitting state, represented symbolically by the block 389 (FIG. 20).

The operator then enters on the keyboard (FIG. 14) of the typewriter 6 the label or group of characters which form the desired group of instructions. The control unit 9 introduces an interrupt after each character, as has already been stated in the description of the control unit 9. The state in which the central unit 5 now is is represented by the block 390 (FIG. 20). Thereafter, each character transmitted by the control unit 9 is staticized in a cell of the store 42 (block 391). On acceptance of each character, the central unit 5 has to make a logical decision expressed by the block 392, whereby it checks whether the label has been sent in full. The central unit 5 checks more particularly whether the last character coming from the typewriter 6 is the fourth character of the label or not. As usual, this logical decision is represented by a jump instruction conditioned by the result of the comparison operation made by the instruction CFR. The carrying into effect of this instruction is identical to that for the logical decisions explained hereinbefore.

If the last character received is not the fourth character of the label, the central unit 5 sends to the control unit 9 of the typewriter an instruction COP by means of which it puts the control unit 10 into the transmitting state represented by the block 389. The sending of the following character to the central unit 5 is then obtained, so that the central unit 5 returns to the state expreessed by the block 389. When the fourth character is sent, the central unit 5 checks whether the label sent corresponds to one of the labels recorded on the track PO of the tape 310 (block 393). Of course, the comparison takes place by means of an instruction CFR which is repeated so many times until the selected label is recognized.

If the operator has made a mistake when striking the keys in entering a label, the central unit 5 again commands the control unit 10 by means of an instruction COP to print the label JOB? (block 388), as a result of which the operator re-enters the label.

In the event of the label having been entered correctly, the central unit 5 executes a jump instruction to the cell of the store 42 in which is recorded the address I1 . . . I256 in the store 7 of the first block of the group of instructions entered. The central unit 5 now commands the reading of this cell of the store 42 and, by means of an instruction TRA, transfers the address thereof read therein to the cell of the store 42 corresponding to the second character of the jump instructions of the group of loading instructions. In this way, the central unit 5 can execute the operations expressed by the block 386 (FIG. 19). In the cell defined by this character there is contained the address I1 . . . I256 of the first block of instructions in the store 7 to be transferred to the store 42. These operations are expressed symbolically in the block 394 (FIG. 20). It is therefore clear that, in correspondence with each label entered on the keyboard, the address of the first block of instructions can be varied in accordance with the label entered, so that the corresponding block selected by the label in the store 7 can be transferred to the store 42. After this, the central unit 5 transfers the selected block to the store 42 by means of the operations described with reference to FIG. 19 and represented symbolically by the block 386 (FIGS. 19 and 20).

In conclusion, on the starting of the printing system, there first takes place the transfer to the store 42 of the initial instructions (block 381 of FIG. 19), which retrieve the loading instructions from the tape store 7 (block 383), and finally the last-mentioned instructions "load" the selection instructions into the store 42 (block 385) if no label has been selected by the operator. When these instructions are loaded, there takes place the printing of the label JOB? (block 388 of FIG. 20). Consequently, through the typing of a label, the operator selects a group of operative instructions. The selection instructions select the address of this group from among those assigned to the various groups of operative instructions and supply it to the loading instructions (block 394). Finally, the latter load the selected group of instructions into the store 42 (block) 386), whereby they can be executed by the central unit 5.

RECORDING A TEXT

When it is desired to record a text, the operator inserts a printing sheet over the platen of the typewriter 6 (FIG.1) and actuates the start push button of the keyboard 8. The central unit 5 is thus conditioned so as to write the initial instructions, the loadng instructions and the selection instructions into the store 42 (FIG. 2) in the manner described with reference to FIGS. 19 and 20. After this, the selection instructions control the printing of the label "JOB?" by the typewriter 6. The central unit then sends to the typewriter 6 a command "return to the beginning with line spacing" through an instruction COP, which cause the input device 12' to send to the typewriter 6 the associated command.

The operator then enters on the typewriter a label "REGI" (block 410 of FIG. 21), which conditions the central unit 5 so as to select a group of so-called "recording" instructions (block 411) in the blocks BP1 . . . BP256 of the tape 310 and transfer it to the store 42. The selection of the "recording" instructions has been already described in pages 67 through 72, therefore it is not described in detail. to preset the arrangement of the margins and to control the recording of the text, typed thereafter on the typewriter, in the tape store 7. In fact, the recording instructions supply to the central unit 5 the addresses of the block B1 . . . B256 of the tape 310 (FIG. 14) in each of which the lines of typescript or print are to be recorded.

To this end, each of the tracks, P1 . . . PN of the tape 310 contains a special block called the table block. This table block is in a predetermined position in each track and is accessible, in the manner which will now be described, by the central unit 5 by means of an address kept uncharged throughout the operation of the printing system. By way of example, let it be assumed that the table block of each track P1 . . . PN FIG. 14) is the respective block B1. The table block is formed of 67 eight-bit characters, so that the first 64 characters contain a total of 512 bits. These bits are grouped in pairs, each of which is assigned to a data block B2 . . . B256. More precisely, the first pair of bits of the table block B1 recorded on the track P1 is asssociated with the same block B1, the second pair with the block B1 . . . . .; the 256the pair is associated with the block B256.

Since the two bits of these pairs can assume four configurations, with each of these configurations there is associated an item of information on the corresponding block. More precisely, the significance of these items of information is synthetized in the following Table:

| 1st bit | 2nd bit | Significance |
| --- | --- | --- |
| 0 | 0 | Block free and recordable |
| 1 | 0 | Block occupied and recordable |
| 0 | 1 | Block free but not recordable |
| 1 | 1 | Block not usable |

The first combination indicates that the block is free and recordable and can therefore be occupied by the data. The second combination indicates that the block is occupied but recordable by means of the erasure of the data contained therein. The third combination indicates that the block is free of data, but is not recordable, for example because of a change in the magnetic material of the tape 310 or because of an abrasion. This avoids any line of the text being lost because of being recorded in a spoilt block. The last combination is used to indicate that the block is not recordable in the event of it being desired not to change the contents thereof, as for example in the case of the table block.

After the first 64 characters of a table block there is recorded a group of another three characters which are the same for all the table blocks. The first of these characters indicates a selection instruction COP which, as has been seen, is adapted to select a track P1 . . . PN of the tape 310. This instruction COP, as will be seen, is used to select the track containing the first free and recordable block. The second character of the group of three indicates the address of the first free and recordable block, while the third indicates the label of the tape cartridge to which this block belongs. The first two characters, called the "indicator", are sufficient to indicate the address of the first free and recordable block of the tape, while the third can be used in the event of a plurality of cartridges being used simultaneously and will not be taken into consideration here. Of course, the indicator is updated in the table block after each recording in the manner to be described hereinafter.

Figure 21:
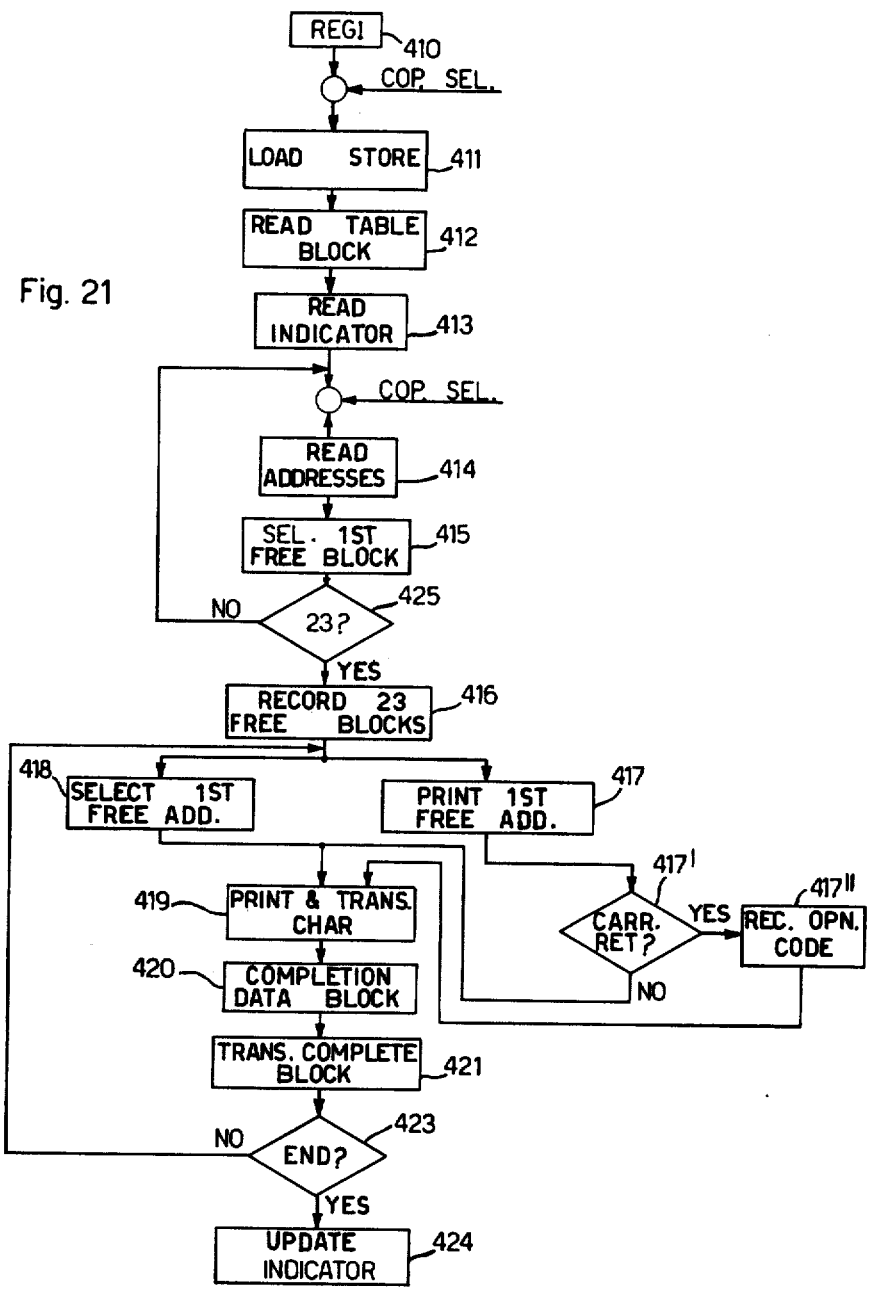
FIG. 21 is a flowchart relating to the recording of a text.

The first of the "recording" instructions is a selection instruction COP direct to the control unit 10 of the tape store, by means of which the track P1 of the tape 310 is selected, putting the control unit 10 in the reading state 358 (FIG. 18), Then, by means of an instruction of SAL at the central unit 5 reads the character stored in the address identified by the SAL instruction. This address has been previously stated by the programmer and defines the address of the table block B1. In this way the address of the table block is read from the memory 42, then it is transferred to the register 57. Then the recording instructions control the search of the block B1 in the manner described with reference to pages 64 and following. When the address corresponding to the table block B1 of the track P1 is recognized, which address as has been said is unchangeable, the recording instructions control the reading of the table block. This condition is represented symbolically by the block 412 (FIG. 21). The table block B1 corresponding to the track P1 is therefore transferred to a zone or second register (RB) of the store 42 by the central unit 5.

A jump instruction contained in the recording instructions then causes the central unit 5 to execute a jump to the cell of the store 42 in which the first character of the indicator has been recorded. This cell is always the same whatever the table block, since the characters which define the indicator have a fixed position in the table block, which, as is known, is recorded serially always in the same zone of the store 42.

Since the first character of the indicator is an instruction COP for selection of the trunk containing the first free and recordable block, the address of this block is moreover recorded in the following cell of the store 42, so that the first free and recordable block of the tape store 7 is identified in this way. This condition is expressed symbolically by the block 413 (FIG. 21).

By means of the selection instruction COP, the control unit 10 of the tape store 7 is put into the address reading state (block 414), similarly to what has been said with reference to FIG. 18. The selection of the free and recordable block indicated by the indicator then takes place (block 415 of FIG. 21) in the manner seen with reference to the said FIG. 18.

Starting from the address of the free block, the central unit 5 then selects a series of 23 free and recordable blocks in the following manner. By means of an instruction TRC, it transfers to a cell of the store 42 the address indicated by the indicator incremented by one unit. This new address defines the data block following the one defined by the indicator. The central unit 5 then checks, on the basis of the contents of the table block B1, whether the data block defined by this address is free and reasonable. In fact, it checks by means of an instruction CDC whether the bits of the table block which correspond to this address both have zero value.

If the block identified by the new address is occupied, the result of the comparison gives bit $E = 0$. The central unit 5 then executes an instruction TRC, by means of which it transfers the address of the occupied block incremented by one unit to another cell of the store 42. The same operations as have been described hereinbefore are then repeated to state whether the block with this last address is free and recordable. If the result of the comparison is positive (bit $E = 1$), the central unit 5 records the new address in the store 42 in two stages. In the first stage the central unit 5 executes a conditional jump instruction to a store cell in which an instruction TRL is recorded. In the second stage, by means of this instruction, it transfers the address following the one indicated by the indicator to the store cell following the last cell occupied by the table block, thus recording the second block of the 23 blocks being searched for. The operations which have just been described are expressed synthetically by the block 416 (FIG. 21).

The operation is repeated for the remaining blocks, which may be disposed on the tape 310 in positions distant from one another. In this way, the central unit 5 selects a group of free and recordable data blocks. The number 23 of such blocks has been chosen since this is usually the average number of lines of writing on a typewritten sheet. It is to be noted that the addresses of these blocks are recorded in predetermined celles of the store 42.

If the number of free and recordable blocks is less than 23, the central unit 5, by means of a following selection instruction COP, passes on to the reading of the table block belonging to the next track, so as always to supply 23 free blocks. To establish whether the blocks free are less or more than 23, the central unit 5 transfers the bits of the table block which correspond to the data blocks following the block defined by the indicator to a cell of the store 42 to check, by means of the execution of an instruction CDC, whether these bits are all zero and are 46 in number. If this is the case (logical decision 425), that is if there are at least 23 free blocks, the central unit 5 performs the operations hereinbefore described with reference to the block 416, otherwise it jumps to the address reading state (block 414) to read the table block of the next track.

After this, the central unit 5 puts the control unit 9 of the typewriter 6 into the receiving state by means of an instruction COP. Then, by a following instruction CAP, it sends to the inupt device 12' (FIG. 14) the address of the first free block stored in the register RB. The input device 12' then commands the typewriter 6 in the manner seen hereinbefore to print this address in the left-hand margin of the sheet under the label REGI (block 417 of FIG. 21). By means of the selection instruction COP recorded in the first character of the indicator, the central unit 5 puts the control unit 10 of the tape store in the state of reception and selection of the free address (block 418). The central unit 5 then sends to the control unit 9 of the typewriter 6, by means of instructions CAP, a group of four space characters so as to cause the carriage to advance by four steps. At this point, the operator can enter, through the kyboard 270 of the typewriter 6, a code corresponding to an operation which the central unit will have to perform in the line of print or writing during the following printing of the text. The operations that the central unit 5 can perform comprise the definition of the right-hand margin of the line, centring and underlining.

To effect the entering of the codes corresponding to these operations, the operator actuates the "return-by-one-step" key of the keyboard 270 (logical decision 417' of FIG. 21) which causes the carriage of the typewriter 6 to go back by one step.

The control unit 9 of the typewriter 6 then sends to the control unit 5, by means of an instruction CDP4, the code for "return by one step"; the central unit 5 in turn recognizes this code by means of the circuit 98 (FIG. 13) of the store input circuit 47, under the control of an instruction CRF. In response, the central unit 5 sends an instruction CDP to the control unit 10, which puts itself in the transmitting state. Since the second character of the instruction CDP is an address of the cell of the store 42 in which the character coming from the control unit 10 is to be recorded, this character will not be recorded in the store cell following the cell in which the address of the line of print had been recorded.

After this, the operator can actuate on the keyboard 270 a key of a group of alphanumeric keys associated with the operations which the central unit 5 is to perform. The control unit 10 then sends the code corresponding to this key to the central unit 5 and the latter records this code in the selected cell of the store 42 (block 417").

More particularly, in order to define the right-hand margin of the line, the operator actuates the capital L key after the "return-by-one-step" key, followed by as many spaces as there are characters of which it is desired that a line of print should be formed. The central unit 5 accepts the printed character L and transfers it to a predetermined cell of the store 42 in the manner seen. The instruction following the instruction CDP by means of which the character L is recorded in this way is a jump instruction to another cell of the store 42 in which an instruction CFR is recorded. By means of this instruction, the central unit 5 compares the character L with the possible command characters of the printing system.

When this character is recognized, the central unit 5 effects by means of another jump instruction the counting of the space characters tapped out following the character L, by means of successive operations controlled by a series of instructions TRC. There is then effected each time the transfer of a constant which expresses the space character incremented by one unit. If a particular value has been chosen for this constant, for example 00000000, at the end of the count the final constant corresponds to the number of characters entered for that line of print.

By a further instruction TRC, the central unit 5 transfers this number to a predetermined cell of the store 42, as a result of which the length of the line remains recorded in the store 42.

If the operator has to enter other commands, for example centring of titles, underlining, etc., he again enters the return by one step and this is followed by actuation of the respective alphanumeric key. In similar manner to that seen hereinbefore, the code corresponding to this alphanumeric character is recorded in a corresponding cell of the store 42 instead of in the cell following that in which the address of the line is recorded.

With the writing of the character L or of the other alphanumeric characters associated with the commands, the carriage recovers the space of the return by one step and is in the beginning-of-line-position.

The operator now enters on the kyboard 270 (FIG. 14) the characters of a line of the text to be recorded, which is then printed on the sheet beside the address of the block in which this line is to be recorded and spaced by four steps. These characters are now transferred serially, in the manner seen hereinbefore, to a first register 42' (FIG. 2) of the store 42 reserved for this transfer (block 419 of FIG. 21.). At the end of the line, the operator actuates the key for carriage return with line spacing, as a result of which the carriage returns to the beginning. Moreover, the relevant code is recognized by the central unit 5 by means of an instruction CDC which, as usual, puts the central unit 5 into a following operative condition by means of a conditional jump instruction.

In this operative condition, the central unit 5 sees to transferring the line recorded in the register 42' (FIG. 2 ) to a second register 42" of the store 42 and to completing the data block therein with the function characters, and to starting the search for the block of the tape 310 in which the completed block is ultimately to be recorded. More precisely, by means of the instructions TRA, the central unit transfers to the first three characters of the block an instructions COP for track selection, the address of the next free block and the label corresponding to the tape 310. In this way each block indicates the next following block, which is to be read by the central unit 5 during the reading state, for example when the test is to be printed by the typewriter 6. Since the three function characters were recorded previously (block 416 of FIG. 21) in predetermined cells of the store 42, the instruction TRA can be used for any data block without changing the second character of the instruction, which defines the address of the cell from which it is necessary to extract the three function characters to be transferred, Since also the date blocks are successively recorded in the same cells of the store 42, the third character of the instruction TRA is also always the same.

By means of another instruction TRA executed thereafter, the central unit 5 then transfers to the fourth cell of the data block the number of printing characters that the block can contain, which has been recorded in the store 42. The central unit 5 then transfers to the fifth cell of each data block, by means of a following instruction TRA, the number of characters actually entered. This number is counted by the central unit 5 in a similar manner to the number of spaces as seen earlier. In this latter case, however, the command for initiating the count is given by the character "carriage return with line spacing". The central unit 5 then transfers to the sixth cell of the block the operation to be carried out on the line (centring), (underlining, etc.). Finally, the central unit 5 calculates in any manner per se the parity character resulting from the whole data block and transfer it to the seventh cell of the block itself. The operations which have just been described are represented in brief in the block 420 (FIG.21).

Simultaneously with the completion of the block which has just been described, the central unit 5, by means of a selection instruction COP, puts the control unit 10 of the typewriter 7 into the state for reading the tape 310 (block 358 of FIG. 18). In this way, the control unit 10 causes the search in the store 7 for the addreess of the block in which is to be recorded the line of print previously entered on the keyboard 270, in the manner seen hereinbefore. This address was indicated by a cell of register BB and the central unit 5 reads this address and puts it in the register 57. At this point begins the search of the address store in the register 57 as previously explained. While the control unit 10 is searching for this address, the operator enters on the keyboard 270 the second line of print, which is transferred in the manner alreadyseen to the register 42' (FIG. 2) of the store 42. Thus, the central unit 5 effects, simultaneously with the completion of the block corresponding to the first line of prinf, the recording in the register 42' of the block corresponding to the second line of print and the search on the tape 310 for the block in which the block recorded in the register 42", and corresponding to the first line of print is to be recorded, effecting from time to time an interrupt of the completion of the data block. In fact, when the control unit 9 of the typewriter 6 or the control unit 10 of the tape store 7 sends a character to the central unit 5, they introduce into the latter an interrupt, as has been seen. The central unit 5 then interrupts the completion in progress on the data block recorded in the register 42" to accept the character coming from one of the two control units 9 and 10. The central unit 5 then resumés the completion in progress.

More particularly, the time that the control unit 10 takes to search on the tape 310 for the block in which the contents of the register 42" of the central unit 5 is to be recorded varies according to the position of the block on the tape. This time may be at the most about equal to the average time that the operator takes to enter the following line on the keyboard 270. It is to be noted that, as has been seen, the control unit 10 effects in succession the reading of the addresses off the blocks recorded on the tape 310 until it recognizes the address received from the central unit 5. The maximum time required for reading the addresses therefore depends on the feed rate of the tape and the length of the tape itself.

When the operator has finished the entering of the second line of print, he again actuates the key for "carriage return with line spacing". Consequently, the central unit 5 performs the transfer of the completed data block corresponding to the first line of print in the register 42" of the store 42 to the tape store 7 and the transfer of the second line of print from the register 42' of the store 42 to the register 42". After this, the central unit 5 returns to the recording state indicated by the blocks 417 and 418 of FIG. 21. The operator can now begine to enter the third line of print, as a result of which the operations hereinbefore seen are repeated.

These operations are indicated symbolically by the blocks 421 (FIG. 21).

When the operator has finally completed the entry of the text, he communicates the end of the text to the central unit 5. To this end, after the printing of the last address, he actuates the return-by-one-step key and thereafter the key for the capital E of the keyboard 270 (logical decision 423). The central unit 5 then recognizes the code associated with this key and, by means of an instruction TRA, consequently transfers the first three characters of the block associated with the last line of print to the cells of the store 42 in which the 65th, 66th and 67th characters of the table block are recorded. It has been explained that the first three characters of back block indicate the address of the following free block, whereby in the 65th, 66th and 67the character of the table block is recorded the address of the next block free characters.

The table block, as has been said, has been recorded in the register RB of the store 42 after the operator has entered the label REGI on the keyboard 270, as a result of which the indicator is updated in this way and again contains the address of the first free and recordable block (block1 424 of FIG. 21), so that when it is desired to record a following text the central unit 5 again supplies in the manner seen hereinbefore the address of this block. The second and third characters of the instruction TRA are always the same, whatever the table block recorded in the store 42.

In fact, since the table blocks are always recorded in the same cells of the store 42, the third character of the instruction TRA, which represents the address to which the contents of the cell indentified by the second character is to be transferred, is always the same and is therefore valid for each table block,. Similarly, the second character of the instruction always remains unchanged, since the addresses of the free blocks are always recorded in the same cells of the store 42.

It is therefore clear that the central unit 5 supplies the address of the first free and recordable block, controls the recording of a text line by line, inserts in each data block the address of the next data block and the code of the type of operation to be performed on the line of print recorded in that block when the line itself is printed and renews the value of the indicator after each recording.

It is to be noted, moreover, that if during the printing of a line the operator notices a typing error, he actuates the return-by-one-step key. The command character associated with this key is recognized by the central unit 5 and the interrupt with which this command is associated causes, as has been seen, the inhibition of the increment of the addresses by the control unit, as a result of which the character thereafter entered is substituted for the character previously recorded in the store 42.

If, finally, the operator proposes to underline one or more words of a line of print, he actuates, after the printing of the address corresponding to this line, the return-by-one- step key and then the key corresponding to the letter S. He then records the test of the line and, when he reaches the word to be underlined, actuates the underlining key in place of the space key. He then records the words or words to be underlinded. At the end of the word, he again actuates the underlining key in place of the space key. The codes corresponding to the underlining key are therefore recorded in the cells of the store 42 in such manner as to identify the beginning and the end of the words to be underlined.

AMENDING A TEXT

The printing system enables the contents of a text to be amended, for example by adding or removing one or more lines.

If the operator wishes to insert one or more lines in the text previously printed, he enters the label REGI on the keyboard 270 of the typewriter 6. This label is recognized by the central unit 5 and causes the transfer of the group of recording instructions from the tape store 7 to the core store 42, in the manner described with reference to FIG. 19. These operations are indicated synthetically by the block 425 (FIG. 22). The line or the group of lines to be inserted in the text is then recorded in the store 7 in a similar manner to the recording of a text as seen hereinbefore (block 424).

To insert the lines now entered at any point whatsoever of the text already recorded, the operator enters the label MODI on the keyboard 270. More precisely, this label produces in the manner seen hereinbefore the transfer in the tape store 7 to the core store 42 of the central unit 5 of a group of instructions called the "modifying" or amendng instructions (block 426).

The modifying instructions serve to modify the sequence of the addresses of the data blocks, so that during the stage of reading and printing (which will be seen hereinafter) they are read from the store 7 in an order different to that in which they have been recorded.

It has been said, in fact, that each data block contains in the first and second characters the address of the following data block. The modifying instructions act on the contents of these characters in such manner as to change the address of the following data block. To achieve this, after entering the label MODI and the return of the carriage of the typewriter 6 to the beginning, the operator actuates on the keyboard 270 an alphanumeric command key, for example the key for the letter "I", and this is followed by the entry of four labels. The first of these labels represents the address printed on the printed sheet during the recording of the text and corresponding to the line of the text from which the operator desires to insert the next text. The first label is entered by the central unit 5 in the register 57 in the same way previously described.

The second label represents the address of the first line of the insertion, this being also printed on the sheet of and it is stored by the central unit 5 in a register RM or fourth register of the memory 42. The third and fourth labels respectively represent the address of the last line of the insetion and the address from which it is desired that the printing of the text previously recorded be resumed, which is generally the address of the line following that from which the new lines are inserted. The four addresses are recorded in the manner seen hereinbefore in corresponding cells of the core store 42.

The central unit 5 now recognizes the command code I entered (block 427). Since this code is in this case the insertion code I, by means of an instruction CFR, and an instruction SAL the central unit executes a jump instruction to a predetermined store cell associated with the code I (block 438). In this cell there is recorded the first instruction of the group of modifying instructions which are associated with the code I. This first instruction is an instruction COP for selection, which puts the control unit 10 of the tape store 7 in the address reading state (block 428). In this way there takes place the selection of the data block corresponding to the first of the four addresses entered, from which it is desired to put in the insertion (block 429 of FIG. 22), that is at the address of the data block.

By means of succeeeding instructions CDP, this first block is transferred to a corresponding group of cells of the core store 42, as has been seen hereinbefore.

By means of an instruction TRA, the central unit 5 now transfers the second address entered, that is the address of the first line of the insertion, to the cell of the store 42 in which is recorded the second character of the data block selected and just transferred to the store 42, which identifies the address of the following data block (block 430 of FIG. 22). Of course, if the address of the first line of the insertion does not belong to the same track P1 ... PN in which the addrsss of the selected block is recorded, the central unit 5 moreover transfers to the first character of this data block an instruction COP for selection of the track to which the address of the first line of the insertion belongs. These transfer operations are shown symbolically in the block 430.

It is to be noted that the cells of the store 42 in which are recorded the addresses following the code I are predetermined, just as the cells in which is recorded the selected block of the first address are also fixed. Because of this, the second and third characters of the instructions TRA which have just been described always have the same configuration inasmuch as these characters refer precisely to the addresses of these cells.

Thereafter, by means of another selection instruction COP, the central unit 5 again puts the control unit 10 of the tape store 7 into the address reading state (block 431). There is therefore selected the date block associated with the third address entered, that is the address of the last line of the insertion (block 432). By means of the same operations as have been described hereinbefore, other instructions TRA control the transfer to the store cell in which the first and second characters of the selected block are recorded, of the fourth address entered after the code I, that is the address from which it is desired that the printing of the old text be resumed.

If the operator wishes to eliminate from the tape 310 a line or a group of lines of writing recorded thereon, he actuates the key E after the label MODI. The operator then enters two labels respectively corresponding to the address of the line preceding and of the line following the group of lines he wishes to eliminate.

The central unit 5 now recognizes the code E in the manner seen hereinbefore and executes a jump instruction to a corresponding store cell which contains the first of the instructions associated with the code E (block 439). This instruction is a selection instruction COP which puts the control unit 10 of the tape store 7 into the address reading state (block 435). There is therefore selected the data block corresponding to the address of the line preceding the initial line of the group of lines to be eliminated. The central unit 5 then transfers to the first and second characters of this block the address corresponding to the line following the last line of the group of lines to be eliminated.

In this way, in the data block corresponding to the line preceding the group to be eliminated there is recorded the address of the data block corresponding to the line following the group. Consequently, when these blocks are retrieved from the tape store 7, the central unit 5 jumps the group of lines which the operator has previously eliminated.

If the operator intends to add at the end of a text a group of lines which have been recorded previously, he enters the label MODI, thereafter actuates the key T, this being followed by the entry of the address of the last line of the text and of the address of the initial line of the group of lines with which he intends to terminate the text itself. The central unit 5 recognizes the code T and goes to the store cell containing the first of the corresponding instructions (block 443). In the manner already seen, the central unit 5 inserts the second address in the first two characters of the data block identified by the first address. This facility afforded by the printing system is particularly useful for terminating, for example, a group of different personalized letters or circulars with a standard formula, which is therefore recorded a single time for all the letters.

It is therefore clear that a text is modified or amended by acting exclusively on the addressing characters of data blocks without changing the positions in which these blocks are recorded on the tape 310. As will be explained hereinafter, these blocks will be retrieved from the tape store 7 and introduced into the central unit and then printed on the typewriter 6 in the sequence desired by the operator. It is to be noted that the sequence of the addresses of the data blocks corresponding to the lines within the group of lines to be inserted or to be added is not changed, so that these lines are printed in the order in which they have been entered previously.

Finally, if the operator intends to replace a line of print by another line previously recorded, he enters the label MODI and thereafter actuates the key S, this being followed by entry of the address of the line of print to be substituted and of the address of the new line of print. The central unit 5 recognizes the code S and executes a jump instruction to the store cell in which is recorded the first of the corresponding instructions (block 444). The first instruction is a selection instruction COP by means of which the central unit 5 selects the track in which the address of the data block corresponding to the line of print to be substituted or replaced is recorded (block 440).

The central unit 5 then transfers this data block to the store 42 by means of successive instructions COP, in the manner seen hereinbefore (block 441). In the same way, the central unit 5 transfers the data block corresponding to the new line of print to the store 42. The central unit 5 now executes a series of instructions TRA by means of which it transfers all the characters of the second block to the cells of the store 42 in which the characters of the first block were recorded. In this way there takes place the substitution of the characters of the line to be substituted by the characters of the new line.

Since the cells of the store 42 in which the two blocks are recorded are fixed, the central unit 5 can use, for carrying out the substitution, one and the same instruction TRA in which the modifier causes each time the incrementing of the address of the two operands by one unit. In this way, it is possible to access in succession all the characters constituting the data block of the new line and at the same time transfer these characters successively to the cells occupied by the characters to be substituted. These operations are shown diagrammatically by the block 442.

By means of the operations described above the operator can therefore process a text according to requirements, provided that the processing operations concern a whole number of lines.

CORRECTION OF WORDS

If the operator, detects wrong words, he can condition the central unit 5 so as to correct these errors. More precisely, the operator actuates the start key of the operative keyboard 8, which, as has been seen, produces the printing of the label JOB?. After this, the operator enters on the keyboard 270 the label FAST, which is recognized by the central unit 5 and consequently causes the loading of a group of so-called "correction" instructions into predetermined cells of the store 42 (block 445 of FIG. 23). Thereafter, the operator enters the label corresponding to the address of the line of print which he desires to correct. This address is recorded in a predetermined store cell in the manner already seen.

The first of the correction instructions is a selection instruction COP which puts the control unit 10 of the tape store 7 into the address reading state (block 446). When the address entered is recognized, the data block identified thereby is transferred to the store 42 (blocks 447 and 448) into predetermined cells thereof in the same way as has been described hereinbefore for the amendment of a text. Thereafter, the central unit 5 prearranges itself for the reading of the data block starting from the sixth character, that is jumping the five function characters of the data block (block 449). This prearrangement is effected by means of a jump instruction to the store cell in which the sixth character of the data block is recorded.

If the first word of the line is correct (logical decision 450), the operator now actuates the interrupt key of the keyboard 8, which causes, as has been said, the reading of the contents of the following store cell (block 451), making the central unit begin the reading of the characters. After the reading of each character, the central unit 5 checks whether this character is a space character, through an instruction CFR, in which the two operands are the space character and the character read (logical decision 452).

If the character read is not a space character, the central unit 5 executes a jump instruction to a cell of the store 42 in which there is recorded an instruction COP direct to the control unit 9 of the typewriter 6. As has been seen, the instruction COP produces the printing of the character read (block 453), so that the first word of the line in which the error has been detected is printed. When the character read is a space character, the central unit 5 sends to the control unit 9 of the typewriter 6 an instruction COP which, acting on the input device 12' (FIG. 14) of the control unit 9, stops the printing in the manner described (block 454).

If the word following that printed is a correct word, the operator again actuates the interrupt key of the keyboard 8, which produces the reading of the cell following that in which the space character is recorded and the central unit 5 returns to the state expressed by the block 451. In this way, the words forming the selected line are printed individually.

When the operator notices that the word following the one printed is the wrong word (logical decision 450), instead of actuating the interrupt key he enters the right word on the keyboard and this is transmitted through the instruction COP to the central unit 5 and thereafter recorded in the cells of the store 42 in which the wrong word was recorded (block 455). If the number of characters forming the right word is larger than that in the wrong word, the operator must enter on the keyboard 270 not only the right word, but also all the other words until the line is completed.

When the last character of the line has been reached (logical decision 456), that is when the last free cell of the dats block has been occupied, the central unit 5 passes over to the recording of the line amended in this way in the tape store 5. To this end, the cell following the one occupied by the last character of the data block contains a selection instruction COP which puts the control unit 10 into the receiving state. Thereafter, the corrected data block is transferred to the store 7 in the same location in which it was recorded previously (block 457), in a similar manner to what was seen in the case of the recording of a text with reference to FIG. 18.

By means of the operations which have just been described, the operator can therefore effect any correction of text, provided that he does not introduce characters in excess with respect to the maximum number of characters recordable in a block.

PRINTING OF A CORRECTED TEXT

Figure 24:
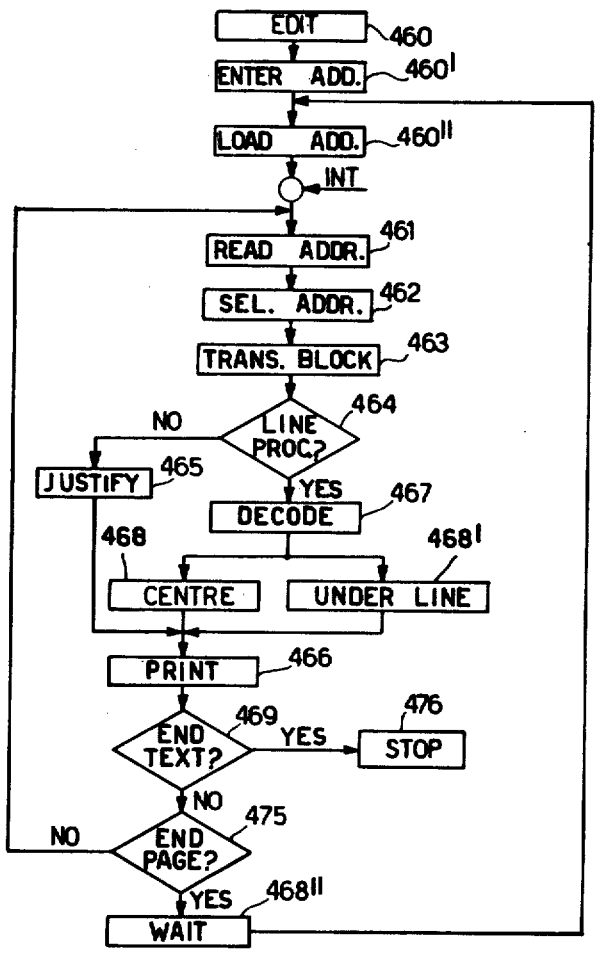
FIG. 24 is a flowchart relating to the printing of a text.

After the operator has made all the amendments or modifications in the contents of the text and has made the relevant corrections of errors, he can command the printing of the processed text in "fair copy". To achieve this, he actuates the start key of the operative keyboard 8, which as has been said produces the printing of the label or inscription JOB?. The operator then enters on the keyboard 270 (FIG. 14) the label EDIT, which is recognized by the central unit 5. Consequently, a group of instructions called the "printing" instructions is transferred from the tape store 7 to the core store 42. These operations are shown diagrammatically by the block 460 (FIG. 24). After the label EDIT, the operator enters on the keyboard 270 the label corresponding to the address of the initial line of the first page of the text to be printed. This operation is represented symbolically by the block 460' (FIG. 24).

The first instruction of the group of printing instructions is an instruction COP direct to the control unit 11 of the operative keyboard 8. This instruction COP has its second character formed by eight bits at level 1 and, as has been seen, causes the lighting of the indicator lamp of the keyboard 8. The operator is thus warned that he must change the printing sheet. He now inserts a fair copy sheet over the platen of the typewriter 6 and actuates the interrupt key. The interrupt so introduced causes the lamp to go out and makes the central unit 5 execute a jump instruction to a store cell associated with the keyboard 8. In this cell there is recorded an instruction COP for selection direct to the control unit 10 of the store 7. The selection instruction COP loads the address entered on the keyboard 270 into a predetermined cell of the store 42 and puts the control unit 10 into the address reading state. When the address recorded in this way in the store 42 is recognized (block 462), the data block identified in this way is transferred from the tape 310 to a predetermined group of cells of the store 42 (block 463).

By means of an instruction CFR, the central unit 5 reads the sixth character of the block transferred to the store 42 which indicates the specific operation to be carried out on the line (logical decision 464). If the sixth character is zero, the central unit 5 carries out the so-called "justification" of the line in the manner which will be described hereinafter (block 465). Thereafter, by means of successive instructions CAP the characters are sent to the control unit 9 of the typewriter 6 (block 466), which, in the manner already seen, attends to the printing of the line itself.

If the sixth character of the block is not zero, the central unit 5 compares this character with the possible characters associated with the various operations to be carried out on the line and recorded in predetermined cells of the store 42, together with the group of "printing" instructions (block 467). If the operation to be carried out is the centring or the underlining of the characters of the line, the central unit 5 carries out these functions (blocks 468 and 468') in a manner which will be described hereinafter. After these processing operations, by means of successive instructions CAP, the characters are sent to the control unit 9 of the typewriter 6 to be printed.

At the end of each line, the central unit 5 checks whether the following block contains the end-of-text character E (block 469). If this character is not recognized, the central unit 5 establishes through the store 42 whether the line printed is the last of the page or not (block 475). If it is not the last line, the central unit repeats the same operations as have been described from the block 461, for the following data block, the address of which is identified by the first three characters of the preceding block, so that the central unit 5 carries out sequentially the printing of all the lines of the recorded page. It is to be noted that the cells of the store 42 in which the first three characters of each block are recorded are always the same, since all the blocks are recorded successively in the same cells occupied by the preceding block. In this way, the operation of addressing each block is always effected with the same instructions in the manner seen with reference to FIG. 18.

On the other hand, when the last line of the page has been printed, the store 42 signals the end-of-page condition to the central unit 5 (logical decision 475). The central unit 5 puts itself into a waiting condition (block 468) and, by means of an instruction COP direct to the control unit 11 of the keyboard 8, causes the indicator lamp to light up again. The operator is thus warned that he must change the sheet. Moreover, the central unit 5 loads the address of the first line of the new page into the store 42 (block 460"). After changing the sheet, the operator again depresses the interrupt key, as a result of which the operations of printing the new page are repeated.

When the central unit 5 finally recognizes the end-of-text character E (logical decision 469), it produces the stopping of the typewriter 6, as a result of which the system returns to the stop or inoperative condition (block 476).

Figure 25:
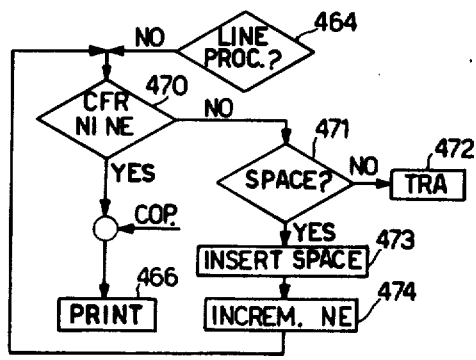
FIG. 25 is a flowchart relating to the justification of a line of text.

For the justification of the lines, it has been said that each data block contains function characters relating to the length of the line of print. More precisely, the fourth character indicates the number of characters that the block can contain, which will be indicated hereinafter as NI, while the fifth character indicates the number NE of characters actually contained in the block. When a data block is transferred to the central unit 5 (block 463 of FIG. 24) and the sixth character of the data block is zero (block 464), the central unit 5 compares, by means of an instruction CFR, the fourth and fifth characters of the block (logical decision 470 of FIG. 25). If these characters are the same or equal, the printing of the block from the seventh character onwards is commanded, as a result of which the function characters are not printed (block 466). This is achieved by means of the instructions COP directed to the control unit 9 of the typewriter 6, which put the latter into the receiving state, and by means of instructions CAP which transfer the characters from the store 42 to the control unit 9 of the typewriter 6. In fact, the second character of the instruction CAP indicates the address in the store 42 corresponding to the seventh character of each block.

If the comparison between the fourth and fifth characters of the block is negative (bit E = 0), the central unit 5 checks starting from the seventh character of the block, by means of an instruction CDC, that the character of the data block is not a single space character (logical decision 471). If this character is not a single space character, that is if it is a printing character or if it is in its turn followed by another space (bit E = 0), the central unit 5 executes a jump instruction to a cell of the store 42 in which there is recorded an instruction TRA, by means of which it transfers the checked character to a predetermined cell of the store 42 (block 472).

If the character is a space character, after the central unit 5 has transferred the space character it executes a jump instruction to a store cell in which another instruction TRA is recorded. By means of this last instruction there takes place the transfer of another space character to the store cell following the cell to which the first space character has been transferred (block 473). There takes place then the transfer of the characters completing the data block to the following cells, as has been seen with reference to the block 472. After completing the transfer of the data, the central unit 5 transfers the function characters to the corresponding cells. In particular, the character NE is transferred incremented by one unit (block 474).

By means of these operations, the central unit 5 has therefore transferred the data block from a first register of the store 42 to a second register of the store 42, but inserting after the first space character a further space character. In this way, the line of print has been extended by one space.

After this, the central unit 5 again compares the characters NI and NE (block 470); if these characters are not equal, it effects the transfer of the block from the second to the first register, inserting a futher space character in the position following the second recognized space character, which is the first single space. The central unit 5 repeats this operation so many times until the character NE is equal to the character NI. When this happens, the line is printed with the right-hand margin aligned (block 466).

If, for example, the capacity of a data block is sixty characters (NI = 60) and fifty-seven characters are contained therein (NE = 57), the central unit 5 performs the justification in three steps, as is indicated in the following Table, in which: ND is the difference between NI and NE, S1 . . . S5 is the number of spaces between respectively the first and the second word of the line, between the second and the third, and so on.

| STEP | NI | NE | ND | S1 | S2 | S3 | S4 | S5 |
|---|---|---|---|---|---|---|---|---|
| 0 | 60 | 57 | 3 | 1 | 1 | 1 | 1 | 1 |
| 1 | 60 | 58 | 2 | 2 | 1 | 1 | 1 | 1 |
| 2 | 60 | 59 | 1 | 2 | 2 | 1 | 1 | 1 |
| 3 | 60 | 60 | 0 | 2 | 2 | 2 | 1 | 1 |

If after inserting a space character, after all the space characters present in the line of print, the difference ND is still different from 0, the central unit 5 increments the terms of comparison with the space between the words, in such manner as now to identify the two consecutive spaces. In this way, it again inserts a space character between the words forming the line, repeating the same operations as have been described with reference to FIG. 25. Therefore, by means of these operations, each line is therefore printed with the right-hand margin aligned on a predetermined position.

If, after adding two spaces between the words, the length of the line is still not reached, for example in the case of the end of a sentence in which the text comes to an end a long way before the end of the line, the process of justification stops.

As has been seen, the end-of-line position can be varied by varying the character NI. By suitably varying the character NI, for example, a space can be left in a text for inserting a figure, or a text can be printed in a plurality of parallel columns and so on.

It has been said that if the sixth character of the block is zero, the central unit 5 compares this character through an instruction CFR with the possible function characters (block 467 of FIG. 24). If the central unit 5 recognizes a centring character, for example, expressed by the letter "C", it compares under the control of suitable instructions, as in the case of justification, the characters NI and NE. If they are different, it effects in similar manner the transfer of the data block from the first to the second register of the store 42, inserting two space characters, one before the seventh character of the data block and the other after the last character occupied by the information. After each transfer, it then increments the character NE by two units. When the difference ND between NI and NE is finally zero, it commands the printing of the contents of the block, which is therefore centered.

If the central unit 5 recognizes the underlining character, expressed by the letter "S", it first commands the printing of the line recorded in the block. Then, by means of an instruction COP, it sends to the control unit 9 of the typewriter 6 a command for carriage return without line spacing, as a result of which the carriage is brought into the beginning-of-line position.

After this, the central unit 5 checks by means of an instruction CDC whether in the cell of the store 42 corresponding to the first part of the line there is recorded an underlining character. If this character is recorded, the central unit 5 commands, by means of an instruction COP sent to the control unit 9 of the typewriter 6, the printing of the underlining character until it recognizes the underlining character recorded at the end of the word to be underlined, by means of successive instructions CDC carried out after the printing of each underlining character.

When the central unit 5 recognizes this last character, it sends space characters in succession to the control unit 9, whereby it moves the carriage until it recognizes a following underlining character. When this happens, the central unit 5 carries out the same operations as have been described before for underlining the following words. Of course, if one underlining character is recorded at the beginning of the block and one at the end, the central unit 5 underlines the whole line corresponding thereto in the manner described. When the carriage arrives at the end of the line, carriage return with line spacing is then automatically commanded in the manner seen hereinbefore.

According to a variant of the invention, the command S, before the recording of a line of print, may be incorporated in the instructions corresponding to the label REGI. In this case, the underlining character is only used to indicate the ends of the words to be underlined and not as a printing character existing by itself. In this case, the printing is effected as seen for the preceding case.

According to another variant of the invention, the underlining character may condition the recording of the characters to be underlined in such manner as to assign to them a code different from that of the characters without underlining, for example by using for this purpose the eighth bit of each character. In this case, during the printing of the fair copy, the central unit 5 decodes these characters in known manner, commanding for each character successively the printing of the underlining symbol, return by one step and then the character. If the underlining symbol is associated with a so-called dead key, that is a printing key which does not command spacing, command of return by one step after each underlining character can be suppressed.

According to a further variant of the invention, the addresses of the lines of print may be formed of two characters instead of four. In this case, the central unit 5 automatically supplies a number which identifies the text to which the line belongs. More precisely, when the operator enters the label "REGI", the central unit 5 commands the printing of a number which identifies the first free block of the tape 310. The following blocks are then numbered progressively until the end of the text to be recorded is reached.

In this way, when the operator intends to select a line of print, he first enters the characters which identify the text and then the two characters which identify the line within the limits of the text.

According to yet another variant of the invention, the various programmes of the printing system can be selected by the operator by acting solely on the command keyboard 8. In this case, neither the label "JOB?", nor the various labels which identify the corresponding programmes (REGI, MODI, etc.) are printed by the typewriter 6.

According to still another variant of the automatic printing system, the function character hereinbefore described, such as, for example, the characters "L" (line length), "S" (underlining), "E" (end of text), etc., can be modified for the purpose of facilitating use by the operator. The various embodiments of the invention now described can be simply obtained by varying the instructions stored in the group of instructions EDIT, whereby the central unit 5 is caused to perform operations controlled by the new group of instructions EDIT.

1st EXAMPLE OF OPERATION

In the following Table A there is given a brief example of the operation of the system, including the most important operations hereinbefore described. More particularly, in Table A there is given the recording of a short text under the control of the group of instructions REGI. In Table B the text is given printed in "fair copy".

After the printing of the label JOB?, which is obtained by means of the actuation of the start key of the keyboard 8, the operator enters on the keyboard 270 of the typewriter the label REGI, which produces automatic printing of the label M4C6 which represents the address supplied by the indicator of the first free and recordable data block.

The carriage then moves forward by four steps and the operator actuates, after the carriage return keys, the key C, to indicate that the line of print entered subsequently is to be centered. After the operator has entered the line of print on the keyboard 270, he actuates the key for carriage return with line spacing, which at the same time causes return of the carriage to the beginning, the printing of the address M4C7 and the subsequent advance of the carriage by four steps.

The operator then enters the other lines of print, which are recorded in the block defined by the addresses N4C7 to N4CC.

In the line M4CD, the operator actuates the return-by-one-step key and the key E to indicate the end of the text.

After this, the operator re-reads the text and notes that in the line N4C8 he has written the word defimitive, instead of definitive. To effect the correction, he again actuates the start key, so that the label JOB? is re-printed and the label FAST is not entered.

When the carriage has returned to the beginning, he actuates the return-by-one-step key four times and then enters the address M4C8 on the keyboard. He then commands

TABLE A

| | |
|---|---|
| JOB? | |
| REGI | |
| M4C6 | GENERALITY OF THE SYSTEM |
| M4C7 | This set of programmes is neither |
| M4C8 | complete nor definitive |
| M4CB | From the operative point of view we are |
| M4CC | interested essentially in the programmes |
| M4CD | E |
| JOB? | |
| FAST | |
| M4C8 | complete nor definitive |
| JOB? | |
| REGI | |
| M5C1 | It is noted in particular that as |
| M5C2 | regards to the other applications |
| M5C3 | we are formulating new programmes |
| JOB? | |
| MODI | IM4C8 M5C1 M5C3 M4CB. |
| JOB? | |
| EDIT | M4C6 | through the interrupt key the beginning of the printing of the first work of the line, then actuates the interrupt key and the second word is printed, and so on. When the word nor which procedes the word definitive has been printed, the operator, instead of actuating the interrupt key, enters the word definitive, which is therefore recorded in place of the wrong word.

If the operator wishes to insert a paragraph in the text which has just been recorded, he actuates the start key, which produces the printing of the label JOB?. He then enters the label REGI, which produces the printing of the address M501. After this, the operator enters the lines of the insertion from M5C1 to M5C3. He then again actuates the interrupt key and, after the label JOB?, enters the label MODI. The carriage therefore carries out return to the beginning with line spacing and the operator enters the letter I followed by the addreses M4C8, M5C1, M4CB. The address M4C8 is the address of the line after which he wishes to insert the new paragraph; M5C1 and M5C3 are the addresses of the first and last lines of the paragraph to be inserted; M4CB is the address of the line from which he wishes to resume the recorded text.

After this, the operator again depresses the interrupt key and, after the printing of the label JOB?, enters the label EDIT followed by the address M4C6 corresponding to the initial line of the text.

Finally, the operator changes the sheet and, again actuating the interrupt key, commands the printing of the "fair copy" text given in Table B.

TABLE B

GENERALITY OF THE SYSTEM

This set of programmes is neither
complete nor definitive
It is noted in particular that as
regards to the other applications
we are formulating new programmes
From the operative point of view we are
interested essentially in the programmes The title has now been printed centred; the other lines have to be justified to a total of 40 characters. In the first line of the text justification is effected by adding seven missing spaces, four of then being distributed in the first two interwords and one each in the remaining three interwords. In the second line, the central unit 5 inserts two additional spaces in the two interwords of the line, after which the justification process stops. In the third line seven additional spaces are inserted, two in the first interwords and one in each of the remaining five interwords; while in the fourth and in the fifth line six of the seven missing spaces are inserted in the first three interwords and one in the fourth interword. The other lines are justified according to the above described process.

In conclusion, by means of the printing system according to the invention, it is possible to amend or modify a text both in content and in format by operating on a first draft of the text in which at the beginning of each line of print there is printed the address of the corresponding data block. These addresses are supplied automatically, so that each line of print or writing is recorded in the data block the address of which is recorded from time to time in the preceding block. It is moreover clear that the operator can access the data blocks by entering on the keyboard 270 of the typewriter 6 labels corresponding to the addresses of the lines of print which he proposes to process. After these operations, the operator can finally command the printing of the text so corrected an unlimited number of times, inasmuch as the text is permanently recorded in the tape store 7.

As has been said, the present invention can be used as an automatic information recording and search system. To achieve this, it is necessary for the operator to select through the typewriter 6 or the command keyboard 8 the groups of instructions relating to automatic searching for information. More particularly, there are four of these groups of instructions and they are used respectively for recording the format of the file, for recording the file, for correction and for searching for documents.

The operation of the system when it is used for searching for documents will now be described in a more detailed manner and finally a second example of operation is given.

RECORDING THE FORMAT OF A FILE (FORM)

When the operator wises to record a file in the store 7, he must first of all define the format of the file, that is the set of key words which define one and the same document in the file. For example, in the case where it is desired to record a file for a buying office, the format of the file could contain the following key words: number of the document, number of the matter, date of the document, date due, firm, material. Of course, the format may vary according to requirements, but must always remain the same for all the doucments recorded in one and the same file.

Figure 26:
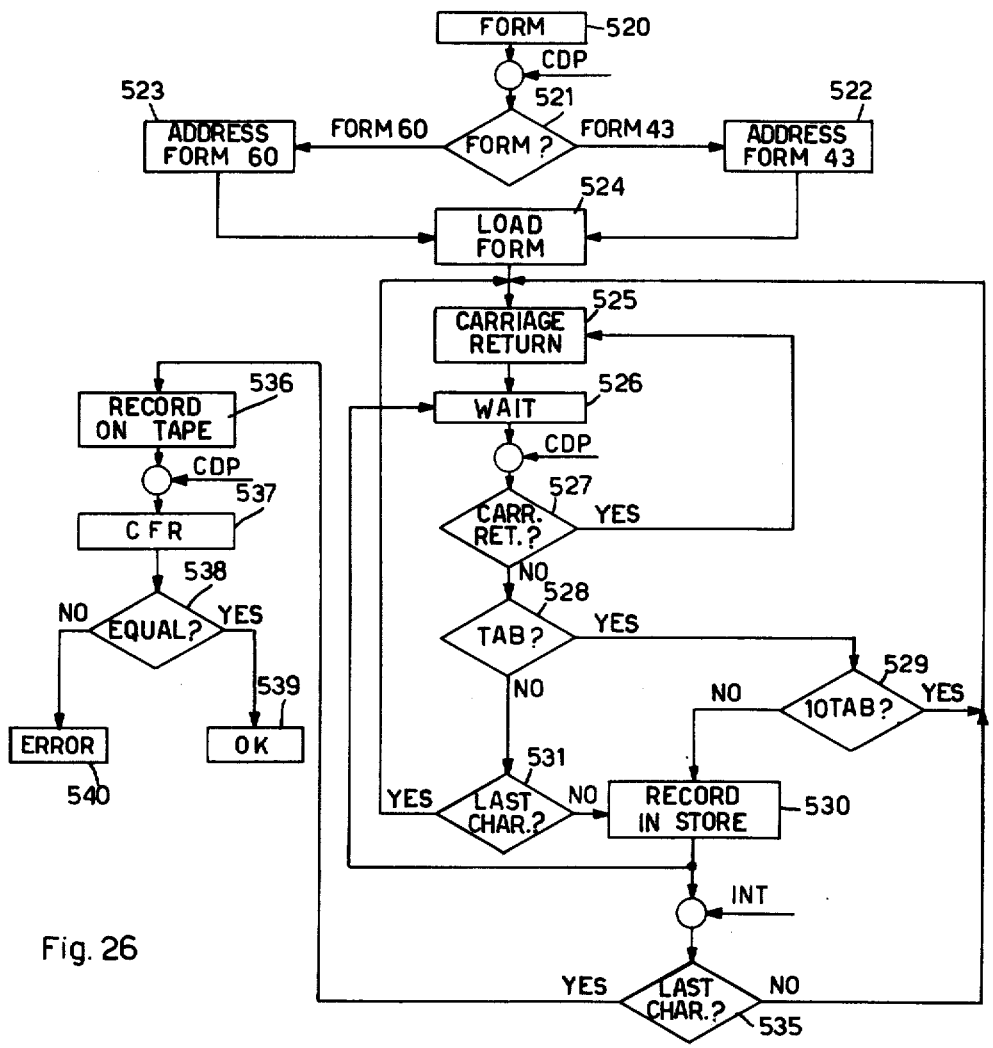
FIG. 26 is a flowchart relating to the recording of the format of a file.

To record the format of the file, the operator enters on the typewriter 6 the label FORM (block 520 of FIG. 26) or depresses the key of the keyboard 8 corresponding to the instructions FORM. The operator can then select the type of format. The system according to the invention provides two types of format: a format composed of 43 characters and a format composed of 60 characters. To select the format of 43 characters, the operator depresses the key of the typewriter 6 corresponding to the digit 1. This digit is transmitted by means of a character-from-peripheral instruction (CDP) to the central unit 5, which is therefore presented with the logical decision 52. Consequently, the central unit 5 generates a code corresponding to the address in the tape store 7 of the first character of the group of instructions FORM relating to the format of 43 characters (block 522). If, on the other hand, the operator proposes to select the format of 60 characters, he depresses the key of the typewriter 6 corresponding to the digit 12, which causes the addressing of the tape store 7 at the first character of the group of instructions FORM relating to the format of 60 characters (block 523). After these operations, the central unit 5 attends to the transfer to the core store 42 of the instructions FORM thus selected in the manner described hereinbefore (block 524). After the loading of the instructions FORM, the central unit 5 commands by means of an instruction COP the return of the carriage of the typewriter 6 (block 525). The system then puts itself into a waiting state (block 526), so that the operator begins to enter the format on the typewriter 6, starting from the first key word of the format itself. Each character entered on the typewriter 6 is recorded in a corresponding cell of the store 42 and is then compared by the central unit 5 with a character associated with the carriage return (logical decision 527) by means of a comparison instruction (CFR). If the character entered is a carriage return character, the central unit 5 returns to the waiting state after carrying out the carriage return. Obviously, the operator enters the carriage return only if he has finished entering the format, at the end of a line of print.

After checking that the character entered is not a carriage return, the central unit 5 checks in the same way that the character is not a tabulation character (logical decision 528). If the character entered is a tabulation character, the central unit 5 still checks that it is not the tenth tabulation character entered for the line of print in process of entry (logical decision 529). This check is made since in the system according to the invention it is possible to enter up to ten key words for each file. In fact, to pass from the first key word to the second key word, the operator acts on the tabulating bar of the typewriter 6. In this way, the carriage moves into the position corresponding to the second key word, so that the operator can enter the characters of the second key word on the keyboard. When the operator reaches the tenth key word, the central unit 5 does not accept any more characters; in fact, if the operator acts again on the tabulating bar, the central unit 5 recognizes that the tabulation character entered is the tenth of the line and returns to the waiting state.

To be able to count the number of tabulations entered by the operator, the central unit 5, consequent upon the check effected by the logical decision 528, increments the contents of a predetermined cell of the store 42. At each tabulation character entered, the central unit 5 checks by means of a comparison-of-constant instruction (CDC) that the contents of this cell do not exceed the number 10.

If the tabulation character is not the tenth, the central unit 5 records it in the store 42 following the other characters previously entered (block 530). If, on the other hand, the tabulation character is the tenth, the central unit 5 carries out a carriage return (block 525) and does not accept any more characters.

If the character entered by the operator is not a tabulation character, the central unit 5 checks in a similar manner to that seen hereinbefore that the character entered is not in excess of the maximum number of characters allowed for the selected file format (logical decision 531). More precisely, if the operator has selected the format with 43 characters, the central unit checks that the character entered is not the 44th, if he has selected the 60-character format it checks that the character is not the 61st.

The operations which have just been described are repeated by the central unit 5 for each character until the operator acts on a push button of the console 8 called the interrupt push button.

This push button, as has been said, produces an interrupt in the working of the system and commands the central unit 5 to carry out a jump instruction (SAL) to a predetermined cell of the store 42 in which the next instuction that the central unit is to execute is recorded. In this case, this instruction is a comparison instruction by means of which the central unit 5 checks, as seen before, that the last character entered is not in excess of the number of characters of the format selected (logical decision 535). In fact, the operator can actuate the interrupt push button both before completing the line of print and after completing it. If the last character entered is not the 44th, the central unit carries out a carriage return (block 525), as a result of which the entire line entered is erased from the store 42. This naturally happens when the operator becomes aware of having made a mistake and wishes to re-write a line that is wrong.

If the last character entered is the 44th, the central unit 5, by means of an instruction COP, puts the control unit 10 of the tape store 7 into the recording state (block 536).

In this state, the control unit 10 of the tape store 7 selects the block O of the first track of the recording tape and stores therein the format recorded in the store 42. After this, the central unit 5 commands the reading of this block and compares the contents thereof with the characters recorded in the store 42 and corresponding to the format entered (block 537). This comparison is made in order to avoid the possibility of there having been any errors during the recording of the format in the store 7.

If the characters read from the store 7 are equal to to those entered (logical decision 538 the central unit 5 commands the typewriter 6 to print the label "OK" (block 539), if the characters are not equal it commands the printing of the label "ERROR" (block 540). In this way, the operator is averted that the format has not been recorded correctly in the tape store 7.

After these operations, the result that is obtained, in conclusion, is that the operator has recorded in the block O of the first track of the tape the format of the file that he intends to record subsequently.

RECORDING A FILE (FILE)

Figure 27:
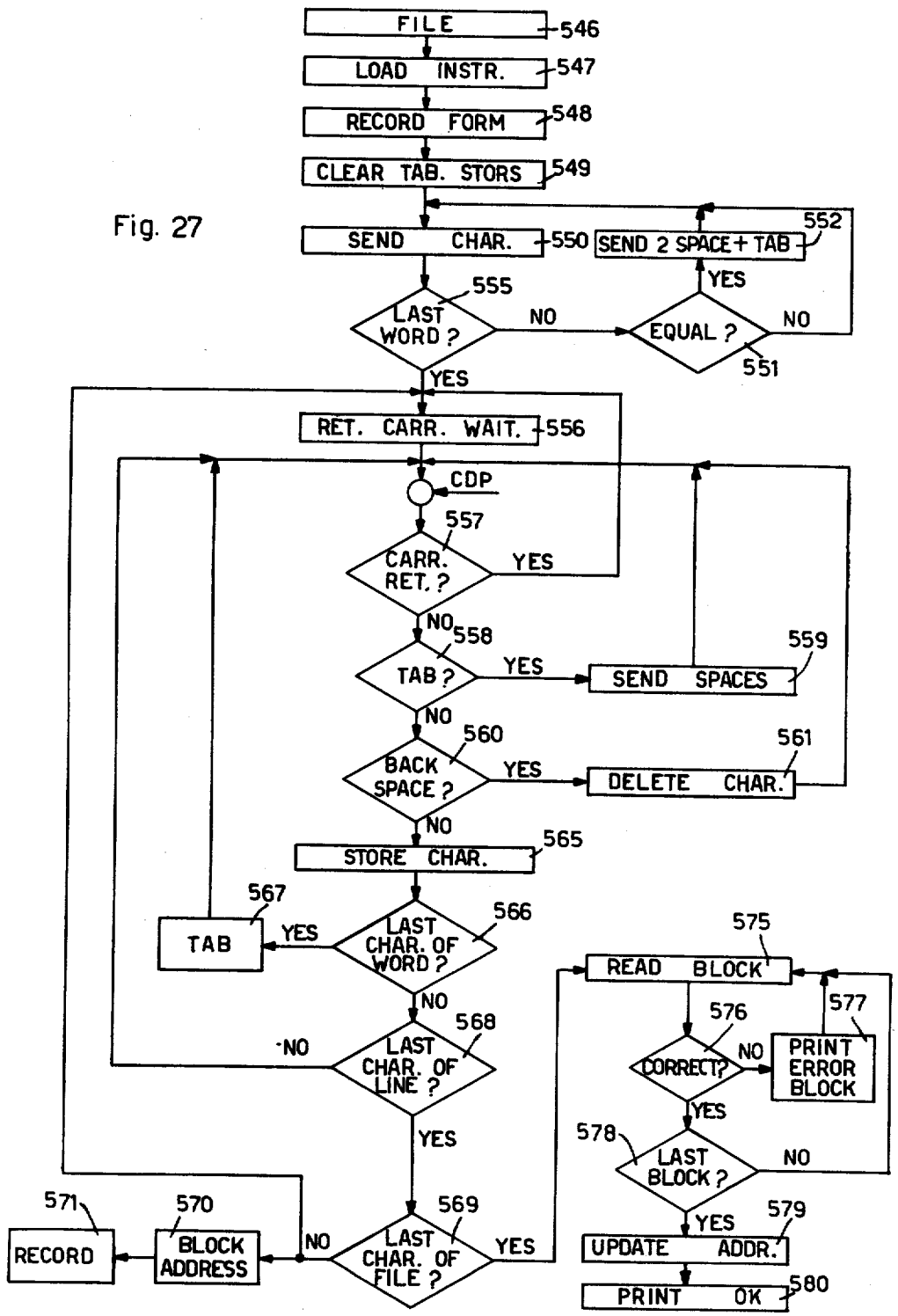
FIG. 27 is a flowchart relating to the recording of a file.

After the operator has recorded the format of the file, he can begin to record the file itself. To do this, he enters the label FILE on the keyboard of the typewriter 6, or depresses the key of the console 8 associated with the recording of the file (block 546 of FIG. 27). As has been said, this causes the transfer of the instructions associated with the label FILE from the tape store 7 to the core store 42 (block 547).

The central unit 5 then executes the first instruction of the group FILE that is recorded in the store 42. This instruction is a selection instruction COP directed to the control unit 10 which commands the reading of the block O of track 1 in which is recorded, as has been said, the format of the file. The format is then transferred to a predetermined register of the store 42 (block 548).

After the format has been transferred to the store 42, the central unit 5 sends an instruction COP to the typewriter 6 by means of which it commands a device not shown in the drawings which is adapted to clear in known manner all the tabulation stops previously selected by the operator (block 549). When all the tabulation stops are cleared and the carriage has returned to the beginning-of-line position, the central unit 5 sends to the typewriter 6, by means of successive character-to-peripheral instructions (CAP), the characters of the format (block 550). At the same time, the central unit 5 compares, by means of instructions CFR, the number of characters sent with the number of characters of which the first key word is formed (logical decision 551). When equality occurs (positive comparison), that is when the first key word has been printed, the central unit 5 commands the sending of two spaces and thereafter commands, by means of an instruction COP, a device for setting the tabulation stops of the typewriter 6 (block 552). After this, the central unit 5 begins to print the second key word, then the third and so on as far as the last key word.

When the central unit 5 has commanded the printing of the last key word of the format (logical decision 555), it sends a carriage return command and puts itself into a waiting state (block 556). In this way there is obtained the printing of the entire format and also the setting of the tabulation stops appertaining to the format itself.

At this point, the operator can begin to record the key words of the file, entering the individual characters on the keyboard of the typewriter 6. From time to time the characters are transmitted by means of instructions CDP to the central unit 5, which carries out a series of checks on them. As usual, these checks are carried out by means of instructions CFR, that is by comparing the individual characters entered with characters contained in the group of instructions FILE and recorded in predetermined cells of the store 42.

The central unit 5 therefore checks whether the character entered is a carriage return character (logical decision 557); if the comparison is positive, it returns to the state expressed by the block 556. The central unit 5 then checks whether the character entered is a tabulation character (block 558), which has been entered by the operator if he has used only a part of the characters assigned to the key word. More precisely, if the key word in process of entry is, for example, "firm name", that is it is composed of nine characters, the operator enters in correspondence with this key word the word "OLIVETTI", using only eight of the nine characters of the key word. In this case, after the letter "I", the operator acts on the tabulating bar, thus sending a tabultion character to the central unit 5. In this case, the central unit 5 introduces into the cell of the store 42 following the cell occupied by the letter "I" a space character. Of course, if the operator had entered a word of five characters, the central unit 5 would have introduced four spaces. To do this, the central unit 5 compares each character entered with the tabulation character; when the comparison is positive, the central unit 5 sends as many spaces as there are characters missing for completion of the word following the tabulation character entered by the operator (block 59).

Finally, the central unit 5 checks whether the character entered is a "return-by-one-step" character (logical decision 560); if the comparison is positive, it reduces by one unit the address of the cell of the store 42 in which the following character entered by the operator is to be recorded, so that it is possible to correct a character entered wrongly (block 561).

If the character entered by the operator is different from "carriage return", "Tabulation" and "return by one step", it is recorded in a particular cell of the store 42 (block 565). The central unit 5 then checks whether the character entered is the last character of the key word (logical decision 566); if the comparison is positive, the central unit 5 sends a tabulation code to the typewriter 6 (block 567), so that the carriage moves into correspondence with the beginning of the next key word. In this way, the operator cannot introduce extra characters with respect to the number of characters forming a key word.

The central unit 5 then checks that the character entered is not the last character of the line (logical decision 568). If the comparison is negative, the central unit 5 returns to the waiting state, if the check is positive and the operator does not communicate, in the manner described hereinafter, the fact that the character is the last of the file (logical decision 569), the central unit 5 sends a selection command to the tape store 7 by means of a selection instruction COP (block 570). The controller 10 selects the first free block and records therein the line entered (block 571).

It is to be noted that while the recording of the entered line is carrying out the central unit 5 returns to the state expressed by the block 556, so that the operator can enter the next line of print. The simultaneousness of the two operations is achieved by means of alternate interrupts by the tape store 7 and by the typewriter 6.

In brief, every time the operator enters a new character, an interrupt is sent automatically to the central unit 5, so that the recording of the previously entered line in the store 7 is interrupted. The central unit 5 can therefore accept the new character entered. The same operations are repeated for the following lines, which are therefore each recorded in a corresponding data block. The addressing of the data blocks is effected by recording in each block the address of the next data block, in the manner described hereinbefore.

When the operator has finished the recording of the file, he actuates a predetermined key of the typewriter 6, for example the key corresponding to the symbol "!". The central unit 5 then sends a selection instruction COP, which puts the controller 10 of the tape store 7 in the data block reading state (block 575). During the reading of each block, the central unit 5 carries out the parity check on the characters of the block and compares the parity obtained in this way with the parity character recorded in the block (logical decision 576). This last character had already been recorded in the block by the control unit 5 on the transfer of the entire block from the core store 42 to the tape store 7. If the comparason is negative, this signifies that a recording error has been committed and the central unit 5 then commands the printing of the entire block (block 577), so that the operator can obtain sight of the error and consequently make the changes in the manner which will be described hereinafter.

If the comparison is positive, the central unit checks that the block read is not the last of the file (logical decision 578), checking that there is not recorded therein the character corresponding to the symbol " ".

If the check is negative, the central unit passes over to reading the next block, if the check is positive the central unit 5 sends to the controller 10 an instruction COP for selection of the block 0 of track 1.

When this block has been selected, the central unit 5 transfers thereto the address of the last block of the store 7 occupied by the lines corresponding to the file previously recorded (block 579). After this, the central unit 5 commands the printing of the label "OK" (block 580). In this way, the operator is informed visually that the recording of the whole file has been effected correctly.

AMENDING A FILE (COIR)

Figure 28:
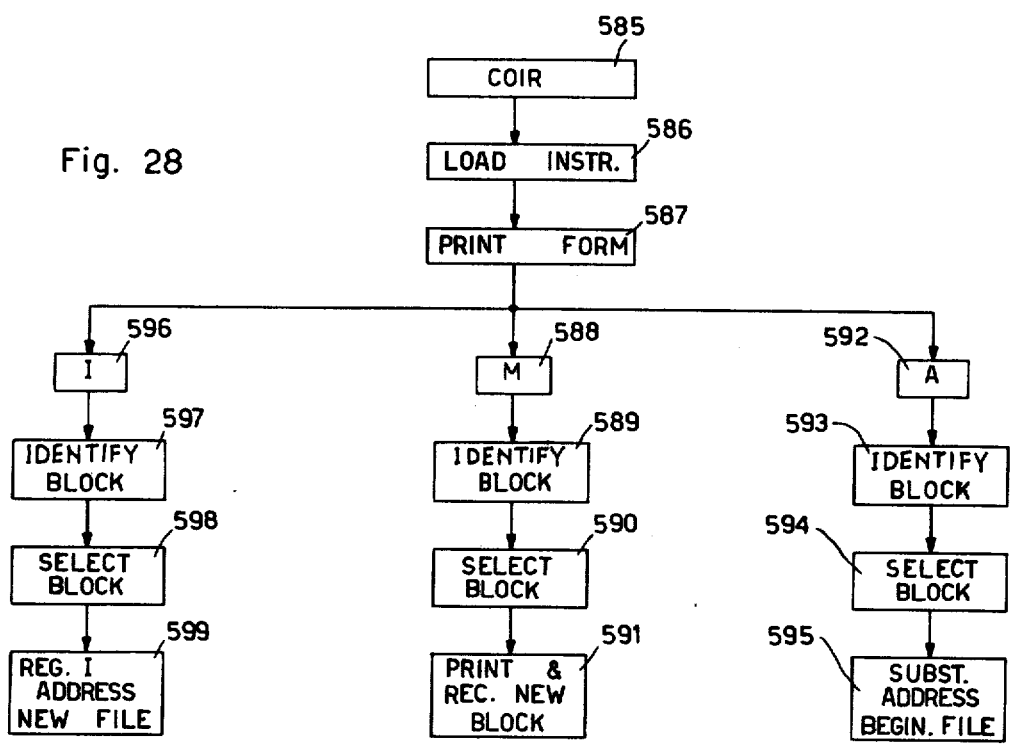
FIG. 28 is a flowchart relating to the amendment of the file.

After the operator has recorded the file, he carries out a check of the file itself, re-reading the sheets previously printed. If he detects an error which has escaped him during the recording stage, he inserts a fresh printing sheet in the typewriter 6 and enters the label COIR or actuates the push button of the console 8 associated with the instructions COIR (block 585 of FIG. 28), causing the transfer of the instructions COIR from the tape store 7 to the core store 42 (block 586). The central unit 5 then begins the execution of the instructions COIR; the first instruction is a selection instruction COP directed to the control unit 10 of the store 7. By means of this instruction, there is selected the block 0 of the track 1, which contains, as has been said, the format of the file. The format is thus transferred to the core store 42 and printed on the printing sheet (block 587) and at the same time the tabulation stops are set again in the manner hereinbefore described. If the operator intends to substitute a line that is wrong by a new line, he enters the letter M on the keyboard of the typewriter (block 588 of FIG. 28); he then enters on the keyboard in its wrong form the line to be corrected, which is thus recorded in a register of the store 42. When the operator has finished printing the line of writing or print, the central unit 5 begins to read the block following the block 0 of the track 1, comparing it at the same time with the block entered by the operator. The blocks recorded on the tape are read and compared in succession in this way until the central unit detects equality between the block entered and the block recorded (block 590). At this point, the central unit 5 commands the stopping of the tape and informs the operator that he can enter a new line of print, for example by lighting a lamp. The operator then enters the new line in the correct form and this is recorded in this way in the place of the line that is wrong (block 591).

If the operator wishes to erase all the documents from the beginning of the file as far as a certain serial number, he enters the letter "A" (block 592) and thereafter enters all the key words relating to the first document he intends to retain (block 593). The central unit 5 then commands the selection of the block corresponding to the document entered (block 594) and stores the address of this block in the store 42. As has been said, in each data block there is also recorded the address of the following data block; therefore, if this address is altered, it is possible to initiate the reading of the file from the block identified by the new address. After this, the central unit 5 commands the selection of the block 0 of track 1 and transfers thereto the address relating to the block which the operator has entered in the place of the one recorded previously (block 595). In this way, during the successive searches only the documents following the one selected by the operator will be taken into consideration.

If the operator intends to eliminate all the documents following a certain document as far as the end of the file, he enters the letter "I" (block 596) and thereafter enters the key words relating to the last document he intends to retain (block 597). The central unit 5 then selects the data block corresponding to the document entered (block 598) and records the address associated therewith in the store 42. After this, the central unit 5 selects the block 0 of track 1, which, as has been said, contains the address of the last block of the file. After this, it inserts in place of the address of the last block of the file the new address selected by the operator (block 599). In this way, during the succeeding searches, only the addresses between the beginning of the file and the new end-of-file address entered by the operator will be taken into consideration.

SEARCHING FOR DOCUMENTS (LOOK)

When the operator desires to search for a document from the file previously recorded, he can use, to identify the document itself, all the key words under which the document had been inserted in the file; in this case, the printing system will supply, in the manner to be described hereinafter, the reference number of the document sought. However, if the operator does not remember exactly all the key words relating to the document, he can communicate to the system only some key words and consequently the system will supply the particulars of all those documents in the file which correspond to the key words communicated. Moreover, the operator could be uncertain regarding a key word; for example, if the key word is "date of issue," the operator could be uncertain whether the month in which the document was issued is the month of May or June. In this case, the operator can insert a plurality of alternatives for each key word up to a maximum of three alternatives. Naturally, the number of documents supplied by the system at the end of the search will be so much smaller the more accurate the items of information furnished by the operator concerning the document to be searched for have been.

Figure 29:
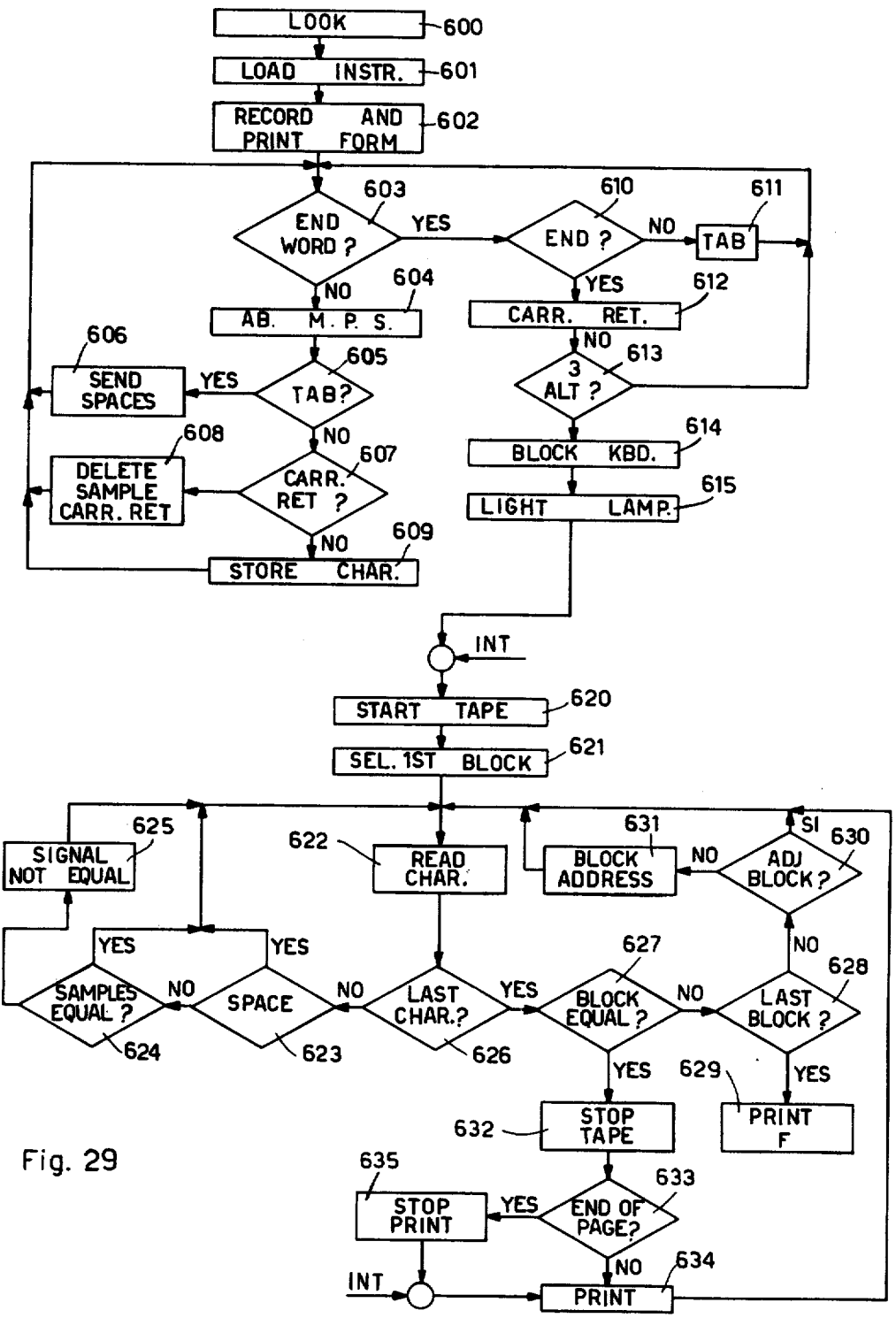
FIG. 29 is a flowchart relating to the search for a document.

At the beginning of the search, the operator inserts in the tape store 7 the reel for the file in which he presumes the document to be searched for is recorded. He then enters the label LOOK on the typewriter 6, or actuates the button of the keyboard 8 associated with the instructions LOOK (block 600 of FIG. 29), causing the transfer of the instructions FORM from the tape store 7 to the core store 42. When all the instructions are recorded in the store 42 (block 601), the central unit 5 begins to execute the first of these instructions. The first instruction is a selection instruction COP directed to the controller 10 of the tape store 7. This instruction produces the selection of the block of track 1 in which there is recorded, as has been said, the format of the file. When the block O has been selected, the central unit 5 commands the transfer of the format to the core store 42; it then commands, as has been said with reference to the instructions FILE, the clearing of the tabulation stops existing on the typewriter 6, and also the setting of the tabulation stops relating to the format recorded in the store 42. After this, the central unit 5 commands the printing of the format (block 602) and thereafter the return of the carriage.

At this point, the operator begins to introduce the key words relating to the document or documents that he wishes to search for; after the entry of each character, the central unit 5 checks whether it is the last character of the key word, effecting the comparison of the number of characters entered with the number of characters of which the corresponding key word of the format recorded in the store 42 is composed (logical decision 603). If the character is not the last of the key word, the central unit 5 enables the keyboard of the typewriter 6, as a result of which the operator can enter the following character (block 604).

The central unit 5 then carries out a series of checks on the character entered by means of successive instructions CFR. If first checks that the character entered is not a tabulation character (logical decision 605). The entry of a tabulation character by the operator may occur in two cases: when he enters a key word in which the number of characters is less than the number of characters of which the corresponding key word of the format is composed, or when he does not intend to use that key word for the search. This last case obviously presents itself when the operator does not remember the information relating to the key word in process of entry; for example, if the key word is "date of issue", the operator might not remember the date on which the document to be searched for was issued.

When the central unit 5 recognizes a tabulation character, it sends to the typewriter 6 as many spaces as there are characters wanting for completion of the key word (block 606), recording at the same time in the store 42 an equal number of space characters.

After this, the central unit 5 checks whether the character entered is a carriage return character (logical decision 607); if the check is positive, it commands simultaneously the return of the carriage of the typewriter 6 and the erasure of all the characters previously entered and recorded in the store 42 (block 608). In this way, the operator can erase a complete line of print if he realizes that he has made an error of entry. If the central unit 5 recognizes that the character entered is neither a tabulation character nor a carriage return character, it records it in a particular register of the store 42 (block 609).

When the central unit 5 recognizes that the character entered is the last character of a key word (logical decision 603), it checks that the key word previously entered is not the last of the format (logical decision 610). This is naturally achieved by means of successive instructions CFR, by means of which the central unit 5 compares the line of print entered with the line of the format recorded in the store 42. If the key word entered is not the last, the central unit 5 sends a tabulation character (block 611) to the typewriter 6, as a result of which the carriage moves into correspondence with the next key word. When the carriage is located at the line end, the central unit 5 automatically sends a carriage return command (block 612).

At this point, the key words corresponding to the document to be seached for are located recorded in a register of the store 42 indicated generally by the reference R' and not shown in the drawings. The addresses of the cells of the register R' are predetermined, so that the characters recorded in it can be placed at the disposal of the central unit 5 during the search stage, as will be seen hereinafter.

The operator moreover has the possibility of introducing key words alternative to those previously entered (logical decision 613), up to a maximum of three. To do this, in the following line, the operator re-enters the key words for which he does not wish to put an alternative, while he enters the new key words where he has the intention of putting the alternative. Thus, if, for example, the operator does not remember the date of issue of the document sought, he enters under the key word "date of issue" the date alternative to the date entered in the preceding line. The same operations are performed if the operator desires to enter a third alternative.

Similarly to what has been said hereinbefore, the alternative key words are recorded in two more registers R" and R"' of the store 42, to be then placed at the disposal of the central unit 5 during the search operations.

After this, the central unit 5 commands the locking of the keyboard of the typewriter 6 (block 614) an the lighting of a lamp located on the console 8 (block 615). At this point, there comes to an end the stage of entry of the key words, which are thus located recorded in predetermined registers (R', R" and R"') of the store 42 of the central unit 5.

When the operator wishes to command the beginning of the search, he depresses the interrupt button of the console 8, which produces the starting of the tape (block 620). It is to be noted that at this instant the tape is positioned with the block 0 of the track 1 in correspondence with the reading head, so that the central unit 5 commands the reading of the address of the first block of the file (block 621) which, as has been said, is recorded in the block 0 of track 1.

After this, the central unit 5 begins the reading of the characters of the block selected in this way (block 622), transferring them to a register of the store 42 indicated generally by the reference M and not shown in the drawings. The central unit 5 then checks that the characters entered by the operator and recorded in the register R' are not space characters (logical decision 623). If the character entered by the operator is a space, the central unit 5 considers as positive the comparison with the corresponding character recorded in the register M of the store 42. In fact, if the operator has not used all the characters of the key word or has not used the key word at all, the central unit 5 operates as if the operator had entered a key word entirely identical to the corresponding key word of the file. This is necessary since the comparison must be effected only on the key words actually entered by the operator.

If the character is not a space character, the central unit 5 compares it with the corresponding character of the register M (logical decision 624); if the comparison is positive, the central unit goes on to comparison of the following character, if the comparison is negative the central unit 5 records in a cell of the store 42 a character which signals dissimilarity (block 625), then continuing the comparison of the following charcter. When the last character of the block is reached (logical decision 626), the central unit 5 records in a cell of the store 42 whether the block of the file is equal or not to the block recorded in the register and entered by the operator. It is to be noted that if the operator has entered three alternatives during the stage of entry of the search, the central unit 5 compares each block of the file, that is the contents of the register M, first with the first block entered by the operator and recorded in the register R', then with the second register R'' and finally with the third register R'''. In this way, the comparison is considered positive if the block of the file is recognized as equal to at least one of the three entered by the operator.

If the block of the file is not equal to one of those entered by the operator, the central unit checks whether the end of the file has been reached (logical decision 628). If the check is positive, the printing of the letter "F" is commanded, as a result of which the operator is informed that the document sought is not recorded in the cartridge inserted in the store 7 and can therefore replace it by another. If the comparison is positive, the central unit 5 commands the reading of the address of the next block (logical decision 630). If this block is the one adjacent that read previously, the central unit 5 returns to the state expressed by the block 622 and begins to read the characters without stopping the tape; if the block is not adjacent the one read, the central unit 5 commands the selection of the block to be read (block 631), consequently positioning the tape with this block in correspondence with the reading head.

These operations are repeated until the central unit 5 recognizes a block of the file equal to one of those entered by the operator and recorded in the register R', R'' or R''' of the store 42. At this point, the stopping of the tape is commanded (block 632). The central unit 5 then checks that the end of the printing sheet has not been reached comparing the number of printed lines with the maximum number of printable lines. This comparison is effected by means of an instruction OFR in which the first operand is the number of printed lines and the second operand is the maximum number of printable lines (logical decision 633). If the comparison is negative, the central unit 5 commands the printing of the block of the file, as a result of which the operator can read all the key words of the document sought (block 634). After this, the central unit 5 returns to the state expresses by the block 622, continuing the reading of the following blocks. If the comparison is positive, the central unit 5 commands the stopping of the printing (block 635), so that the operator can replace the printing sheet. After this, the operator depresses the interrupt button, which causes the resumption of the interrupted printing on the new sheet. When all the documents corresponding to the key words entered have been printed, the central unit 5 commands the printing of the label "END", so that the operator is averted of the end of the search.

2nd EXAMPLE OF OPERATION

There will now be described an example of operation of the system when it is used for automatic information search.

When the operator desires to record a new file, he inserts a printing sheet in the typewriter 6 and a cartridge of magnetic tape in the store 7. He then clears all the tabulation stops and enters the label FORM on the keyboard or alternatively depresses the key of the console 8 corresponding to the instructions FORM. To select the type of format, the operator then depresses the key corresponding to the digit 1 or 2, according to whether he intends to select the format of 43 or 50 characters, respectively. After this, the system is reading to record the format of the new file in the block 0 of track 1.

To do this, the operator enters through the keyboard of the typewriter 6 a line of print containing the key words of the file, that is:

FORM

N DOC NMATT DOC DUE DATE BODY MATERL SUPPLD

The key word N DOC (number of the document), formed of five characters, identifies the serial number with which the document is to be recorded in the file; the key work NMATT (number of the matter), also formed of five characters, identifies the number of the matter to which the document belongs; the key word DATA DOC (date of the document), formed of seven characters, identifies the date of issue of the document; the key word DUE DATE (due date), formed of eight characters (including the space) identifies the due date of the document; the key word BODY (body), formed of four characters, identifies the body which has issued the document; and finally the key word MATERL SUPPLD (material supplied), formed of thirteen characters, identifies the subject of the document, for example the supply of material to which the document relates.

In this way, the operator has recorded the format of the file which, as has been seen, is composed of seven key words, each comprising a predetermined number of characters.

When the operator intends to record the file, he enters the label FILE on the typewriter or depresses the key of the console 8 associated with the instructions FILE. This produces the automatic printing of the format of the file and the simultaneous recording of the format in the store 42 of the central unit 5. After this, the operator enters the first key word of the first document (see TABLE I); since in this case there are five characters used, the central unit 5 automatically commands tabulation, so that the carriage moves into correspondence with the next key word. If, on the other hand, the operator should not have used the five characters fully, he will have had to actuate the tabulating bar manually. The same operations are repeated for the other key words of the first document. The operator then commands return of the carriage and enters all the key words of the second document and so on up to the end of the file. When he has completed the file, the operator depresses the key corresponding to the symbol "!", as a result of which the central unit 5 carries out the parity check on all the recorded blocks; if the recording has been effected correctly printing of the lable "OK" takes place.

It can be noticed from TABLE IA that the operator has not used the key word "due date" for document N. CO2 and that the operator has not fully used the characters of the key word "MATERL SUPPLD" for all the documents.

The operator then actuates the carriage return key, putting the system into a waiting state. In this condition, the date entered by the operator are recorded in the registers R' and R".

To start the search off, the operator depresses the interrupt key of the console 8, the central unit 5 then begins to read the file and to compare the key words of the individual blocks read from the store 7 and transferred one at a time to the register M with the key words entered by the operator and recorded in the registers R' and R" of the store 42. When the key words of a block prove to be equal to the corresponding key words entered by the operator, the central unit 5 commands the printing of the entire block. Similarly,

TABLE IA

| FILE N DOC | NMATT | DATE DOC | DUE DATE | BODY | MATERL SUPPLD |
|---|---|---|---|---|---|
| 00001 | 00051 | 01-03-71 | 01-03-72 | B041 | STEEL |
| 00002 | 00051 | 03-11-70 |  | B041 | PACKAGING |
| 00003 | 000101 | 14-04-71 | 01-11-72 | B041 | INSTRUMENTS |
| 00004 | 000110 | 11-05-70 | 11-11-71 | C004 | STATIONERY |
| ! |  |  |  |  |  |
| OK |  |  |  |  |  |

After the operator has recorded the file, he re-reads the key words entered on the typewritten sheets to check the accuracy of what he has recorded. If he notices any error, he enters the label COIR and carries out the corrections in the manner seen hereinbefore. After this, the operator removes the cartridge from the tape store and notes on the cartridge itself the first and last documents in the recorded file, so as to be able to recognize thereafter what documents are recorded in that cartridge.

Of course, if a single cartridge is not sufficient to record the whole file, the operator introduces another cartridge into the store 7 and repeats the same operations as have been described before.

When the operator has to search for a document, he inserts a printing sheet in the typewriter 6 and, in the store 7, the cartridge in which he presumes the document to be searched for is recorded. He then enters the label LOOK or depresses the key of the console 8 associated with the instructions LOOK. This produces the printing of the format of the file (see TABLE IIA).

all the blocks of the file are compared and when the whole file has been read the central unit 5 commands the printing of the label "END".

As can be observed in TABLE IIA, there are two documents which coincide with the key words entered, so that the operator can recognize the one sought by him only after having sight thereof.

Of course, if the operator had supplied more precise indications concerning the document to be searched for and such as to identify the document itself univocally, the system would have supplied only the document sought as the result of the search.

It is therefore clear that each document is classifiable by means of a plurality of key words or groups of characters and that through the medium of the typewriter or the input unit 6 it is possible to record in the block 0 of track 1 of the tape a plurality of labels, or combinations of characters, to define the format of the file selectively.

The information search system can moreover be used to automate the sending of the correspondence of an

TABLE IIA

| N DOC | NMATT | DATE DOC | DUE DATE | BODY | MATERL SUPPLD |
|---|---|---|---|---|---|
|  |  | 03-71 |  | B041 |  |
|  |  | 04-71 |  | R041 |  |
| 0 001 | 00051 | 01-03-71 | 01-03-72 | B041 | STEEL |
| 0 003 | 00101 | 14-04-71 | 01-11-72 | BO41 | INSTRUMENTS |
| END |  |  |  |  |  |

Let it be assumed that the operator knows exactly only the body which has issued the document and that he is uncertain whether the document was issued in the month of March or in the month of April. In correspondence with the key word DATE DOC the operator enters "03-71", taking care to leave three spaces after the beginning of the key word to indicate that the digits 03 refer to the month, and in correspondence with the key word BODY he enters the label "BO41". He then depresses the carriage return key and, acting on the tabulating bar, again comes into correspondence with the key word "DATE DOC" to enter the date "04-71" and then comes into correspondence with the key word BODY and re-enters the label B041.

office. In fact, the need to send a certain number of like letters to certain addresses arises very frequently. This occurs, for example, when it is intended to start a promotional campaign by sending letters to certain categories of users. To achieve this, the operator records a file in which the users are identified by suitable key words, such as, for example, "type of customer", "due date of reply", etc. Thereafter, using the groups of instructions described hereinbefore, the operator records a standard letter in a particular block of the tape store 7.

When the operator intends to select a group of addresses, he enters in the manner seen hereinbefore the key words which identify this group and then selects the block of the store 7 in which the first line of the letter to be printed is recorded, in the manner seen hereinbefore.

After this, the system searches for the addressees on the basis of the key words entered by the operator and transfers them to the store 42 and thereafter also transfers to the store 42 the letter to be printed, on the basis of the address entered by the operator.

After this, the operator introduces a first printing sheet into the typewriter 6 and commands the printing of the first letter, which will therefore contain the first address selected. The printing of the first letter having been completed, the operator introduces a fresh printing sheet into the typewriter 6, thereafter commands the printing of the second letter and so on until the list of addressees has been exhausted. In this way, it is possible to conduct the sending of correspondence in an entirely automatic manner, a considerable saving of time being obtained.

The format of the file can moreover be recorded in a different manner to that described, for example by effecting suitable encoding of the key words. The list of addressees can in fact be recorded by associating with each customer a particular combination of letters in which each letter represents a key word. In this case, the selection of the addressees is effected by commanding a search for all those addressees to whom one and the same letter has been assigned.

It is understood that modifications, substitutions or additions may be made in the system according to the invention without departing from the scope of the invention; for example, instead of all the operative programmes of the system being recorded on the tape 310, they may be recorded in a static read-only store (RCM). This store may be of any known type, for example produced by integrated circuit technology, and may be included in the central unit 5. This can naturally be done to render times of access of the programmes shorter and, consequently, to render the execution of the required services faster.

SECOND EMBODIMENT

Figure 30:
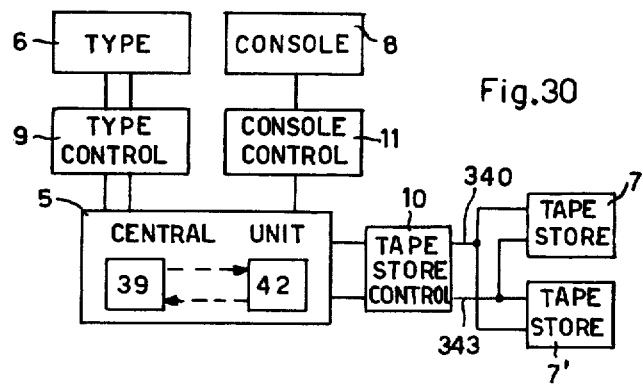
FIG. 30 is a block diagram of a second embodiment of a system according to the invention.

According to another embodiment, the unit 5 can be connected to two magnetic-tape stores 7 and 7' (FIG. 30). The tape stores 7 and 7' are of the same type as and equivalent to the tape store hereinbefore described. Consequently, the control unit 10 differs from the corresponding control unit hereinbefore described only in the fact that its output channel 340 and input channel 343 are connected to both the tape stores 7 and 7' instead of to one only. From the operative point of view, this does not entail any differences with respect to the working described hereinbefore since the control unit 10 is not connected simultaneously to the two stores 7 and 7', but either to one or to the other. To achieve this, each of the two stores 7 and 7' is identified by an address whereby, when the central unit 5 recognizes the address of the store 7, connection is effected with the store 7; on the other hand, when it recognizes the address of the store 7', connected is effected with the store 7'.

When the operator wishes to record a text or a certain number of paragraphs, he puts a cartridge into the tape store 7 and through the medium of the command keyboard 8 selects the zone of the tape on which the text is to be recorded. As has been seen, the central unit 5 automatically supplies the addresses of the blocks in which the lines of print or writing entered by the operator by means of the keyboard of the typewriter 6 are recorded and automatically connects the tape store 7 to the keyboard of the typewriter 6. In this way the operator can note the addresses corresponding to the various paragraphs in a copy-book so as then to be able to command the reading of the paragraphs themselves when he wishes them to be printed. The operator can moreover successively record a list of addresses of the addressees to whom he intends to send the letters. In this way, the operator prepares a file in which there are recorded both the standard paragraphs and the addresses of the addressees.

Figure 31:
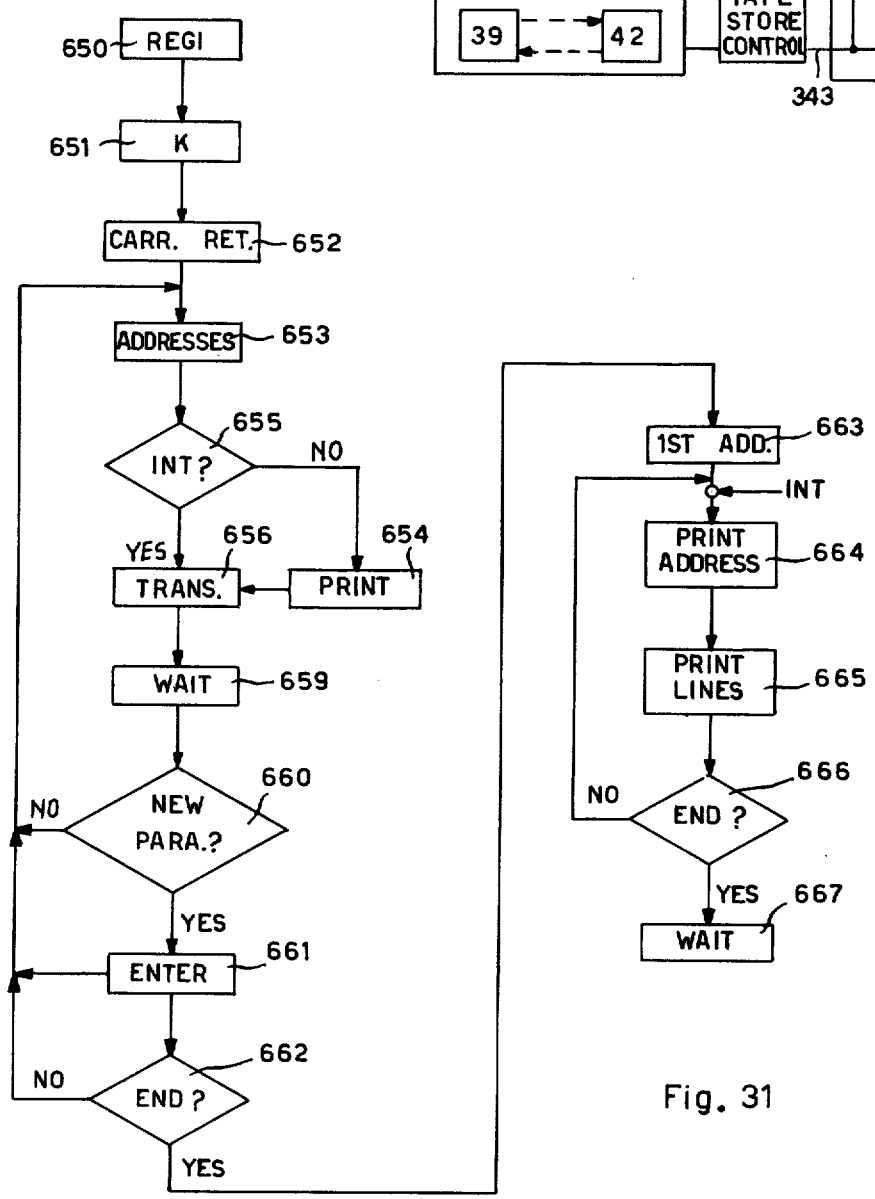
FIG. 31 is a flow chart of the functions of FIG. 30.

When the operator desires to print a series of like letters to a plurality of addressees, he introduces the cartridge previously recorded into the tape store 7' and a fresh cartridge into the tape store 7. Then, through the medium of the function keyboard 8 and the typewriter 6, he selects in succession the paragraphs he intends to put into the letter in the manner hereinafter described. He introduces a sheet of paper into the typewriter 6 and enters the label REGI through the keyboard of the typewriter 6 (block 650 of (FIG. 31). As has been seen, this causes the transfer of the recording instructions to the core store 42 and the simultaneous return of the carriage with line spacing. The operator then actuates the key corresponding to the letter K (block 651), the central unit 5 recognizes the corresponding code and performs a jump instruction (SAL) to a cell of the store 42 in which the first of the instructions associated with the command K is recorded.

The first of these instructions is an instruction COP directed to the typewriter 6, which generates a carriage-return with line-spacing code (block 652). After this, the operator can enter the initial and final addresses of the first paragraph he intends to put into the letter (block 653). The central unit 5 then transfers the paragraph selected in this way from the store 7' to the core store 42; simultaneously, the paragraph is printed by the typewriter 6 (block 654). If the operator does not desire the printing of the paragraph, he depresses the interrupt key of the command keyboard 8 (logical decision 655); this conditions the central unit 5 not to send the characters read from the tape to the typewriter 6. Simultaneously with the printing of the paragraph there takes place the transfer of the same from the core store 42 to the tape store 7 (block 656) in the following manner: the central unit 5 transfers the first line from the store 7' to the store 42. When the whole of the line has been transferred, it initiates the printing of the line and at the same time transfers it to the store 7. Simultaneously with the printing of the first line, the central unit 5 transfers the second line from the store 7' to the store 42. Synchronism between the various operations is obtained through the mechanism of the interrupts which has already been explained hereinbefore.

After the transfer of the selected paragraph has been finished, the central unit 5 puts itself into a waiting state (block 659). The operator now has two possibilities (logical decision 660): either to select the transfer of another paragraph from the tape store 7' to the store 7, or to enter a new paragraph; in the first case, the same operations as have been described hereinbefore are repeated, that is a return is made to block 653, in the second case the central unit 5 sees to the connection of the store 7 with the typewriter 6 and to the recording in the store 7 of the paragraph entered by the operator on the keyboard of the typewriter 6 (block 661). This paragraph is recorded following the paragraph read previously from the store 7' and transferred to the store 7. In this way, the operator can record in the store 7 the complete text of the letter he intends to print by extracting the permanent paragraphs from the store 7' and entering the new paragraphs directly on the keyboard of the typewriter 6.

When the operator has completed the entry of the text (logical decision 662), he enters on the keyboard of the typewriter 6 the address in the store 7' in which is recorded the name and place of residence of the first addressee to whom the letter is to be sent (block 663), taking this address from the copy-book in which he has previously recorded it. Consequently, the central unit 5 selects the address entered in this way and puts itself into a waiting state. The operator then changes the printing sheet and depresses the interrupt key of the function keyboard 8. As has been seen, this produces the printing of the name and address of the first addressee (block 664). When the central unit 5 recognizes the end of the address, it goes on to read the first line of the letter recorded in the store 7 (block 665) in the following manner. A code is recorded at the end of each address; when the central unit 5 recognizes this code, it executes a jump instruction (SAL) to a predetermined cell of the store 42. In this cell there is recorded a selection instruction COP directed to the tape store 7. This instruction COP produces connection between the central unit 5 and the tape store 7. When this connection has taken lace, the central unit 5, through the same selection instruction COP, selects the address in the store 7 in which is recorded the first line of the standard letter to be printed. When this line has been selected, the central unit 5, by means of successive instructions CDP, commands the transfer of the characters of the line to the store 42 and simultaneous printing by the typewriter 6. The same operations are executed for the following lines.

Simultaneously with the printing of the letter, the central unit 5 commands the selection of the address of the second addressee in the tape store 7'; the simultaneousness of the two operations is obtained through the medium of the mechanism of the interrupts. Because of this, when the printing of the standard letter by the typewriter 6 has been finished, the address of the second addressee has already been selected and is ready to be read by the central unit 5. When the central unit 5 recognizes the end code of the standard letter, it stops the printing, so that the operator can introduce a second sheet of paper into the typewriter 6. When the operator again depresses the interrupt key, the central unit 5 commands, in the manner described hereinbefore, the printing of the second address and simultaneously acts on the store 7 so that the first line of the letter to be printed is positioned in correspondence with the reading head for the magnetic tape, as a result of which, after the printing of the address, the central unit 5 commands the printing of the letter in the manner seen hereinbefore. The same operations are then repeated for the other addresses until the list is exhausted. When the central unit 5 recognizes the last address (logical decision 666), it returns to the waiting state (block 667).

It is clear from what has been said that the use of the two tape stores 7 and 7' renders the printing of the documents faster: in fact, in this way, all the paragraphs of the text, both those which are fixed and those which are variable, are recorded in succession in the store 7 and, consequently, the loss of time due to searching for the individual paragraphs is eliminated.

Moreover, in the case of the repetitive printing of a letter addressed to a plurality of addressees, the system according to the invention has the advantage that while an address is being printed the text of the letter is automatically brought into the reading position, and vice versa, increasing in this way the printing speed.

A further advantage of the system having two tape stores consists in the fact that it is possible to reproduce the recording made on one cartridge on other cartridges. This is particularly useful in offices in which a plurality of printing systems which use like cartridges at the same time are installed. To achieve this, the operator actuates the key K without specifying any address. As seen hereinbefore, this causes the transfer of the contents of the cartridge inserted in the store 7' to the cartridge inserted in the store 7.

What is claimed is:

1. A system for automatically recording and searching information comprising:

input means for developing character codes corresponding to desired characters to be entered into the system in character lines and including means for developing format label codes and tabulation character codes each corresponding to selected points along each character line;

printing means associated with said input means for printing characters in character lines;

storage means associated with said input means for storing entered information in a recording medium and having means defining a plurality of data storage blocks each having a capacity to store a given number of character codes corresonding to one line of characters and including means for reading out each of the storage blocks for applying data therein to the printing means; and control means associated with said input means for controlling the operation of said storage means and said printing means, said control means comprising means receptive of the tabulation codes and the format label codes from the input means for defining an information format comprising at least two sections of the character line, each section for one different class of information to be entered by said input means with each class of information corresponding in position in the character line to its associated section and wherein each section has a starting point in the character line corresponding to one tabulation code and has a selectable fixed length corresponding to the length of one format label code, means for effecting storage of the tabulation and label codes in a predetermined storage block and means responsive to the codes to the information format stored in said predetermined storage block for controlling said storage unit to effect the storage of entered information of said two classes of information in the corresponding sections in each of the remaining storage blocks corresponding to the sections of the character line.

2. A system according to claim 1, wherein said control means further comprises means for controlling said storage means to read said tabulation character codes in said predetermined block and means for controlling said printing means to print the entered information of each class read from its corresponding sections of each block in accordance with said predetermined format.

3. A system according to claim 2, wherein said tabulation character codes are recorded at the end of each section in each block.

4. A system according to claim 2, wherein said storage means has means defining an address for each block, and wherein said control means further comprises means defining a zone in each block for the recording therein of the address code of the following block to be read, means for developing an end-of-recording character code, means for effecting the storage of the end-of-recording character code in the last storage block of a selected series of storage blocks, means responsive to said end-of-recording character code for effecting the reading of the address of the first block of said series and the address of said last block and means for effecting the storage of said addresses into said predetermined block.

5. A system according to claim 4, wherein said input means comprises means for effecting the selective modification of at least one of the address codes of said first block and of said last block, whereby the beginning and the end of said series of blocks may be changed.

6. A system for automatically recording and searching information comprising:
input means for developing character codes corresonding to desired characters to be entered into the system in character lines and including means for developing format label codes and tabulation character codes each corresponding to selected points along each character line;
printing means associated with said input means for printing characters in character lines;
storage means associated with said input means for storing the information on a recording medium and having means defining a plurality of data storage blocks each having a capacity to store a given number of character codes corresponding to one line of characters and including means for reading out each of the storage blocks for applying data therein to the printing means; and control means associated with said input means for controlling the operation of said printing means and said storage means, said control means comprising means receptive of the tabulation codes and the format label codes from the input means for defining an information format comprising at least two sections of the character line, each section for one different class of information to be entered by said input means with each class of information corresponding in position in the character line to its associated section and each section having a starting point in the character line corresponding to one tabulation code and each having a selectively fixed length, corresponding to the length of one format label code, means for effecting storage of the tabulation and label codes in a predetermined storage block, means responsive to the codes stored in said predetermined storage block for controlling said storage unit to effect storage of entered information of said two classes of information in the corresponding sections in each of the remaining storage blocks corresponding to the sections of the character line, a first storage register having sections thereof corresponding to the section of said format, means connected to said storage register and responsive to entered character codes for loading into said register a group of character codes of one class of information in the section thereof corresponding to the section for said one class of information, said group of character codes corresponding to information to be searched for, a second storage register receptive of information read from the storage blocks and comparison means for comparing said group of character codes in said first storage register with the groups of character codes in said second storage register corresponding to the information recorded in the sections of each block corresponding to said one class of information and for generating a signal when the character codes stored in the two registers are equal.

7. A system according to claim 6, wherein said control means further comprises means connected to said printing means and responsive to said signal for enabling said printing means to print the information stored in the block indicated by the presence of said signal.

8. A system for automatically recording and searching information comprising:
input means for developing character codes corresponding to desired characters to be entered into the system in character lines and including means for developing format label codes and tabulation character codes each corresponding to selected points along each character line;
printing means associated with said input for printing characters in character lines;
storage means associated with said input means for storing entered character codes on a recording medium and having means defining a plurality of data-storage blocks each having a capacity to store one line of characters and including means for reading out each of the storage blocks for applying data therein to the printing means; and
control means associated with said input means for controlling the operation of said printing means and said storage means, said control means comprising means receptive of the tabulation codes and the format label codes from the input means for defining an information format comprising at least two sections of the character line, each for one different class of information to be entered by said input means with each class of information corresponding in position in the character line to its associated section and each section having a starting point in the character line corresponding to one tabulation code and each section having a selectable fixed length corresponding to the length of one format label code, means for effecting storage of the tabulation and label codes in a predetermined storage bock, means responsive to the codes stored in said predetermined storage block for controlling said storage unit to effect storage of entered information of said two classes of information in the corresponding sections in each of the remaining storage blocks corresponding to the sections of the character line, a plurality of storage registers each having sections thereof corresponding to the sections of said information format, means connected to said storage registers and responsive to the information entered by said input means for loading into at least one of said registers at least one different group of character codes of each class of information in the section thereof corresponding to the section for that class of information in said information format, the groups of character codes corresponding to information to be searched for and comparison means receptive of the information stored in said registers and information read from the storage blocks for comparing the group of character codes stored in each of said registers with the information recorded in the corresponding sections of each block and for generating a signal when the groups of character codes stored in any one of the registers are equal to the information recorded in the corresponding sections of the block.

9. A system according to claim 8, wherein said control means further comprises means connected to said printing means and responsive to said signal for effecting said printing means to print the information stored in the block indicated by the presence of said signal.

* * * * *